(12) United States Patent
Kabasawa

(10) Patent No.: US 6,944,871 B2
(45) Date of Patent: Sep. 13, 2005

(54) DISC DEVICE FOR RECEIVING EITHER CARTRIDGE OR MEDIUM WITHOUT A CARTRIDGE

(75) Inventor: Hidetoshi Kabasawa, Saitama-Ken (JP)

(73) Assignee: TEAC Corporation, Tokyo (JP)

( * ) Notice: Subject to any disclaimer, the term of this patent is extended or adjusted under 35 U.S.C. 154(b) by 70 days.

(21) Appl. No.: 10/254,896

(22) Filed: Sep. 24, 2002

(65) Prior Publication Data

US 2003/0058773 A1 Mar. 27, 2003

(30) Foreign Application Priority Data

Sep. 26, 2001 (JP) .......................................... 2001-295017
Sep. 26, 2001 (JP) .......................................... 2001-295018

(51) Int. Cl.[7] ........................... G11B 33/02; G11B 17/04
(52) U.S. Cl. ....................................... 720/647; 720/627
(58) Field of Search .............................. 720/647, 627, 720/656, 641, 646, 628, 631, 620, 622, 623, 600, 617, 619; 369/75.1, 77.2, 77.1, 77.11, 77.21, 75.11; 361/685; D14/368, 441, 442, 134, 136, 199, 257, 260, 261; 360/99.06, 99.07, 97.01, 88

(56) References Cited

U.S. PATENT DOCUMENTS

| | | | | |
|---|---|---|---|---|
| 5,737,293 A | | 4/1998 | Kawamura et al. ....... 369/77.11 |
| 6,141,310 A | * | 10/2000 | Tanaka et al. ............. 369/75.2 |
| 6,314,073 B2 | * | 11/2001 | Horie ......................... 369/77.2 |
| 6,504,808 B2 | * | 1/2003 | Wada et al. ............... 369/75.2 |

* cited by examiner

*Primary Examiner*—Julie Anne Watko
(74) *Attorney, Agent, or Firm*—J.C. Patents

(57) ABSTRACT

A disc device, in which the recording medium can be inserted/ejected by a way of slot-in type no matter which type or shape the recording medium is. When the operator ejects the disc cartridge after it has been loaded in the disc device, by raising the holder, installed with the disc cartridge, the disc holder of the disc lever, supported by the carrier unit, will be in contact with the tip protrusion of the rotating member and will press upward the tip protrusion of the rotating member. Then, by the sliding member moving upward, the engaging portion, engaged to the acentric pins of the doors, will press the acentric pins upward and open the doors. Therefore, the disc cartridge can be ejected from the insertion hole without being obstructed.

4 Claims, 36 Drawing Sheets

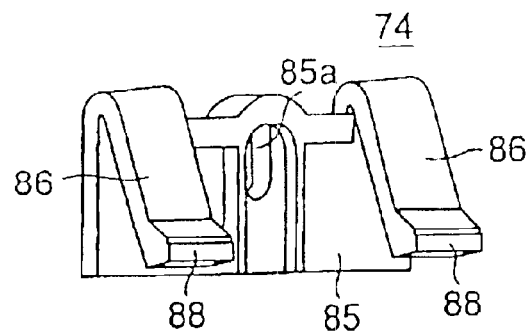
FIG. 6A
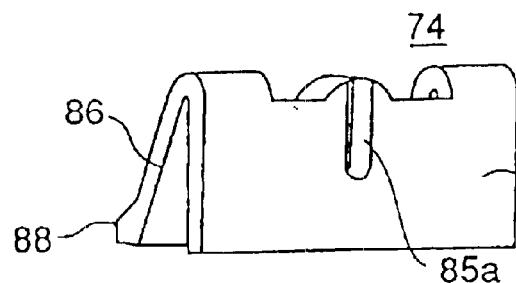
FIG. 6B
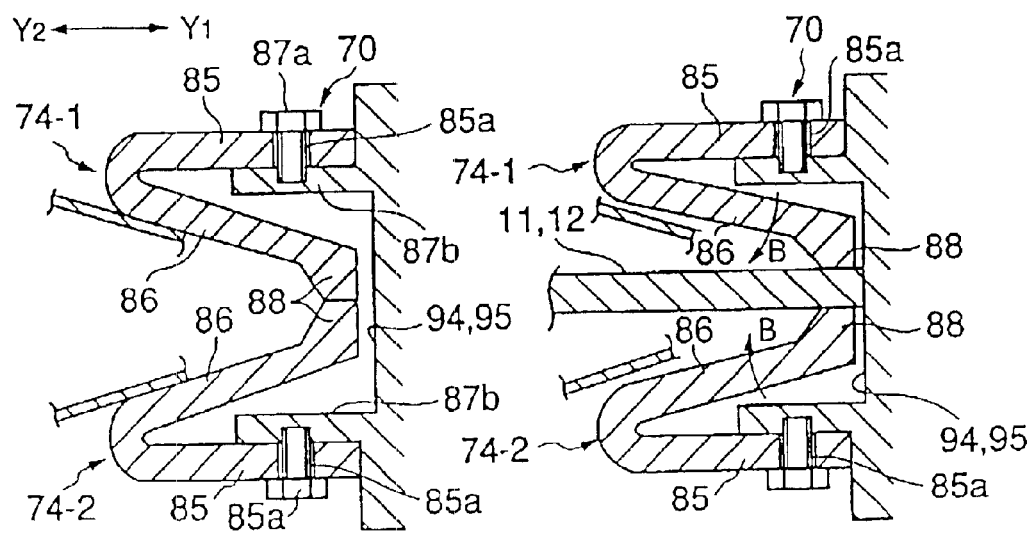
FIG. 7A
FIG. 7B

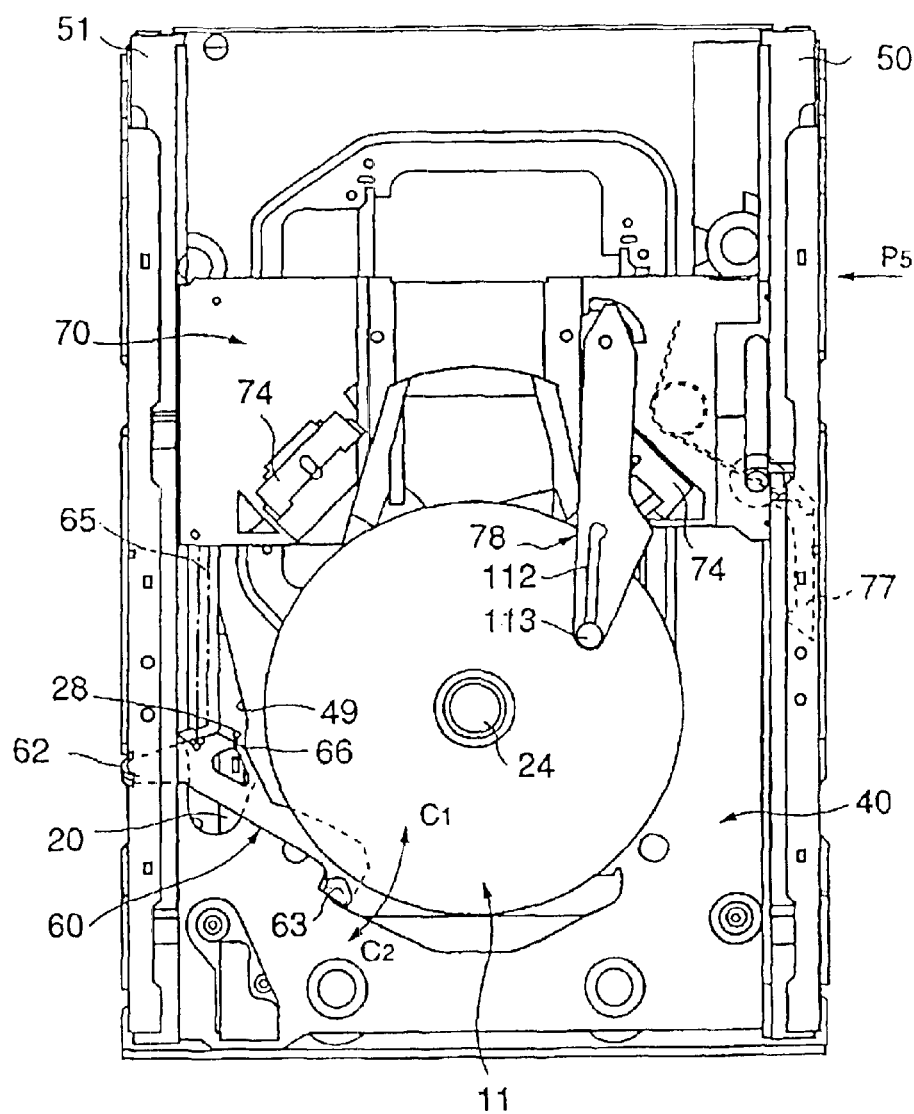
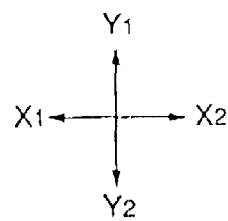
FIG. 34

_DISC DEVICE FOR RECEIVING EITHER CARTRIDGE OR MEDIUM WITHOUT A CARTRIDGE_

CROSS-REFERENCE TO RELATED APPLICATION

This application claims the priority benefit of Japanese application serial no. 2001-295017 and 2001-295018, all filed on Sep. 26, 2001.

BACKGROUND OF THE INVENTION

1. Field of the Invention

This invention relates to a disc device. More specifically, the invention relates to a disc device in which a disc recording medium or a cartridge receiving a disc recording medium is capable of being selectively inserted/ejected.

2. Description of Related Art

Disc devices which receive record media and perform recording and reproducing vary in structure due to the inserted recording medium types. Generally speaking, disc devices can be divided into 2 types, slot-in type and cartridge inserting type. The disc device of slot-in type can be directly inserted into by a disc recording medium. The disc device of cartridge inserting type can be inserted into by a cartridge, within which a disc recording medium is loaded.

In the slot-in type of disc device, when a disc is inserted into the slender insertion hole on the front bezel, a roller pair installed inside the disc device is in contact with the upper and lower surfaces of the disc to rotate the disc. Therefore, when a disc is manually inserted into the insertion hole, the roller pair will rotate and will be pulled to a predetermined loading position inside the disc device.

In the cartridge inserting type of disc device, when a cartridge is inserted into the insertion hole on the front bezel, the cartridge is pulled inside the disc device by the cartridge transporting mechanism installed inside the disc device. Therefore, when a disc is manually inserted into the insertion hole, the transporting mechanism is driven and transported to a predetermined loading position inside the disc device.

In the cartridge inserting type of disc device for inserting a cartridge receiving a disc recording medium, a well-known structure is disclosed in Japanese Laid-Open no. 8-138302 for instance. In the conventional disc device disclosed in the Publication, the door is opened by pressing the inserting side of the cartridge when inserting the cartridge into the insertion hole. At the same time, the cartridge is inserted into the holder disposed on an inner side of the insertion hole. The holder where the cartridge is inserted moves downward, and the disc inside the cartridge is clamped on the turntable. To record or to reproduce information is performed by a pick up head.

As described above, because the holder descends to the loading position, it is necessary to prevent other recording medium from being inserted into the insertion hole. Therefore, in the disc device of the Publication as described above, a slider capable of sliding and a cartridge-double-inserting preventing member (shutter member) are installed on the holder to prevent double inserting of a cartridge.

Therefore, in the conventional disc device, by inserting the cartridge the holder descends to the loading position as the slider slides, and the cartridge-double-inserting preventing member descends at the same time to close the insertion hole from inside. Therefore, when the cartridge is loaded inside the disc device, the other cartridge will be prevented from being inserted into the insertion hole since the cartridge-double-inserting preventing member has closed the insertion hole.

However, in the conventional disc device, the recording medium that can be used is limited to either slot-in type or cartridge inserting type. For example, a cartridge cannot be used in the disc device of disc slot-in type, while a disc cannot be used in the disc device of cartridge inserting type. In the conventional disc device, users have to check which type the disc device is in order to choose the right recording medium, causing inconvenience.

Additionally, in the disc device, where a loading device of tray type is installed, the disc and the cartridge are loaded onto the tray, thus the tray is bigger than the cartridge, and the tray needs a relatively larger space for sliding, and it is difficult to make the disc device slimmer.

To prepare different disc devices according to the types of recording media causes inconvenience to users, so a disc device capable of using any kind of recording media is desired. However, a recording medium without a cartridge and a cartridge for receiving a recording medium are very different not only in shape, but also in width, depth and thickness. Therefore, it is necessary to develop a loading device capable of inserting and ejecting a recording medium and a cartridge. In particular, it is also difficult to open or close the door for shuttering the insertion hole according to the cartridge inserting/ejecting operation.

Furthermore, in the conventional disc device described in the above Publication, before inserting a cartridge, the cartridge-double-inserting preventing member retrocedes above the holder. Therefore, a space above the holder is needed for the cartridge-double-inserting preventing member to retrocede into, so that the disc device cannot be made slimmer.

Furthermore, in the conventional disc device described in the above Publication, the cartridge-double-inserting preventing member moves together with the up and down of the holder in the same direction. Even though the height of the cartridge-double-inserting preventing member is minimized, slimming the disc device is still limited.

SUMMARY OF THE INVENTION

Accordingly, it is an object of the invention to provide a disc device to solve the aforementioned issues.

According to the object above, the present invention provides a disc device that has the following features. When a cartridge is ejected by the operation of the transporting mechanism, the door is moved to an open position before the cartridge is transported in an ejecting direction. The inserting/ejecting operation can be smoothly done not only for a disc recording medium but also for a cartridge.

The disc device of the present invention has a disc holding unit, rotating to a disc holding position, supporting the circumference of the disc recording medium, inserted through the opening. When the disc holding unit is pressed to a retroceding position by inserting a cartridge, the door is moved to the open position through the disc holding unit. Therefore, it is no need to set a cartridge detecting switch, and the door can be opened or closed with respect to the existence or nonexistence of the cartridge.

In the disc device of the present invention, when inserting a disc recording medium through a slit formed in the door, the disc holding unit will support the circumference of the disc recording medium and rotate at the same time. The disc holding unit allows for the disc recording medium to be ejected from the slit of the door when the door is kept at a shuttered position by an ejecting operation. The inserting/ejecting can be smoothly done not only for a disc recording medium but also for a cartridge.

Additionally, in the disc device of the present invention, the shuttering unit is supports reversing the moving direction of the holder, and the crossing portion crosses between the entrance of the holder and the insertion hole. When the holder is at the first position of inserting/ejecting recording medium, the crossing portion separates from the insertion hole. When the holder moves toward the second position of loading the recording medium, the crossing portion will move together with the holder to a position opposite to the insertion hole to prevent other recording medium from being inserted. Therefore, the shuttering unit can be moveably disposed within the height range of the holder, and then the disc device can be made slimmer.

Furthermore, the shuttering unit of the present invention has a wrist pair, a crossing portion and an engaging portion. The wrist pair are rotatably supported opposite to the two side faces of the holder. The crossing portion crosses between the tip ends of the wrist pair. The engaging portion is set on the other sides of the wrist pair and is engaged to the holder. The shuttering unit rotates as the holder moves toward the second position. In this way, the crossing portion will move to a position opposite to the insertion hole to prevent other recording medium from being inserted. Therefore, the shuttering unit can be moveably disposed within the height range of the holder, and then the disc device can be made slimmer.

BRIEF DESCRIPTION OF THE DRAWINGS

While the specification concludes with claims particularly pointing out and distinctly claiming the subject matter which is regarded as the invention, the objects and features of the invention and further objects, features and advantages thereof will be better understood from the following description taken in connection with the accompanying drawings in which:

FIG. 6A and 6B are perspective views showing the clip disc arranged on the carrier unit;

FIG. 7A and 7B are diagrams showing the operation of the clip disc;

FIG. 26A~26E are views showing the structures of the recording medium double-inserting preventing member, wherein FIG. 26A is a plan view, FIG. 26B is a front view, FIG. 26C is a left side view, 26D is a left side view under retroceding condition and FIG. 26E is right side view;

FIG. 34 is a view showing the condition of recording/reproducing the 8 cm disc according to one embodiment of the present invention;

DESCRIPTION OF THE PREFERRED EMBODIMENT

Figure 1:
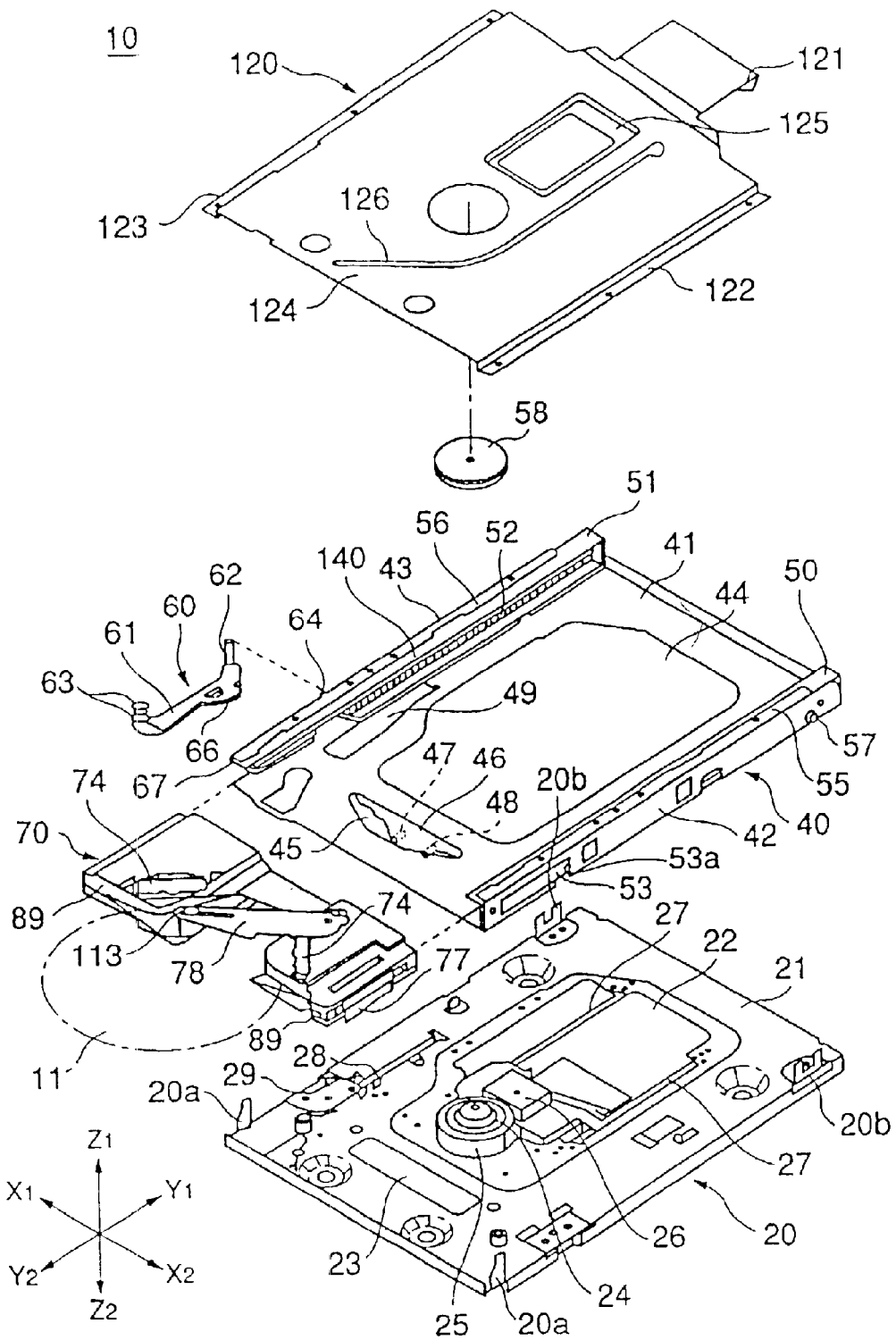
FIG. 1 is an explosive view showing the disc device according to one embodiment of the present invention.
Figure 2:
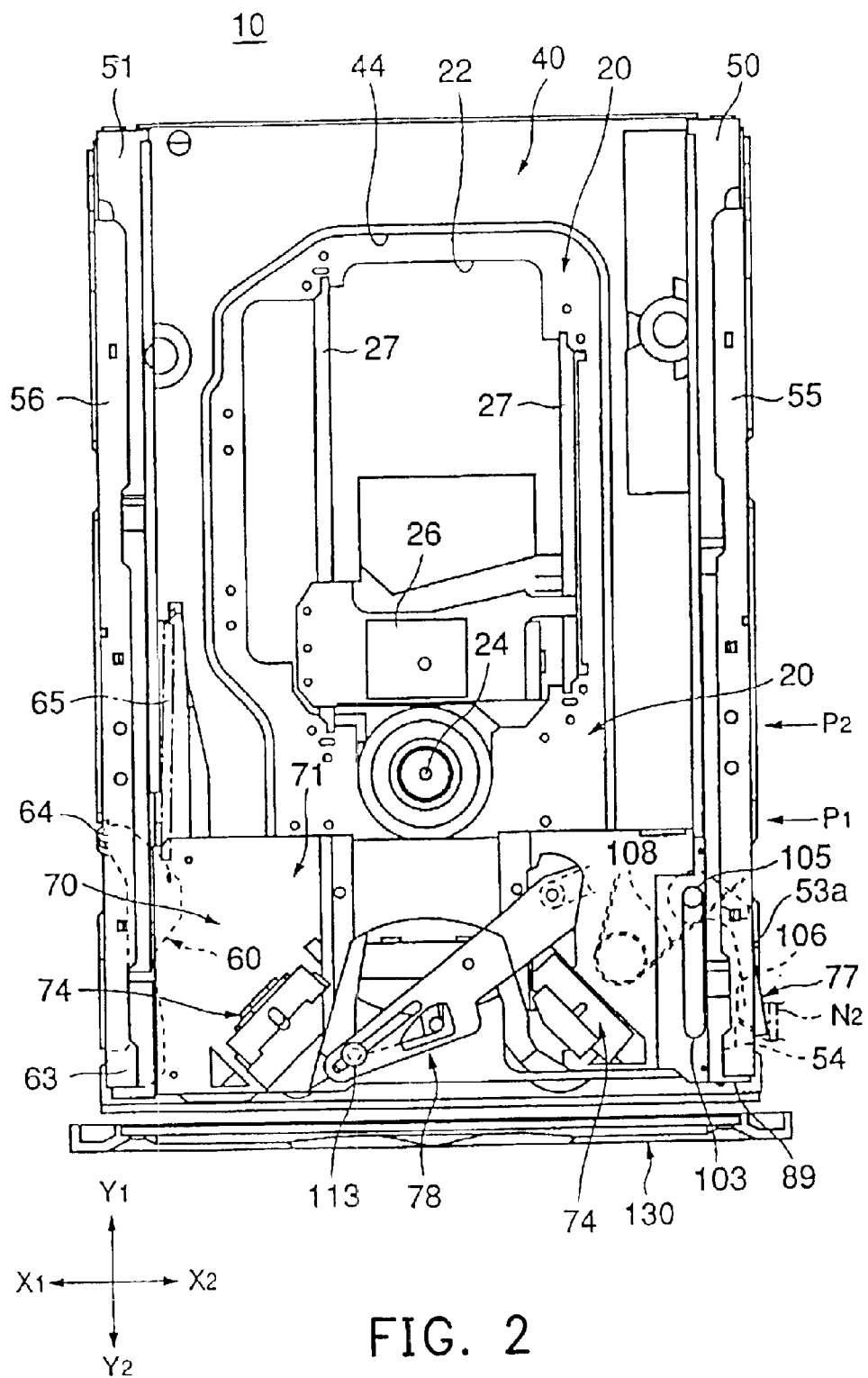
FIG. 2 is a plan view showing the disc device according to one embodiment of the present invention.
Figure 3:
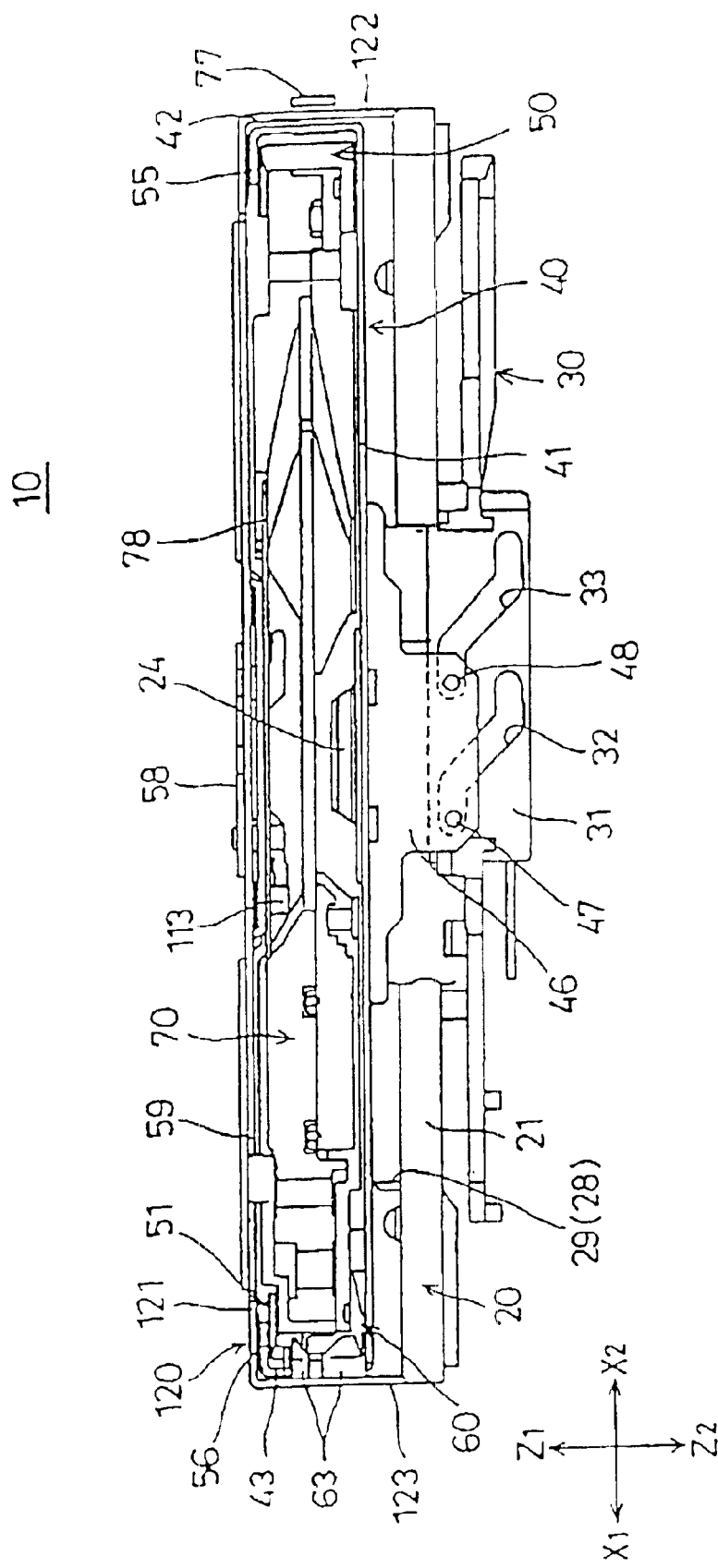
FIG. 3 is a front view showing the disc device according to one embodiment of the present invention.
Figure 4:
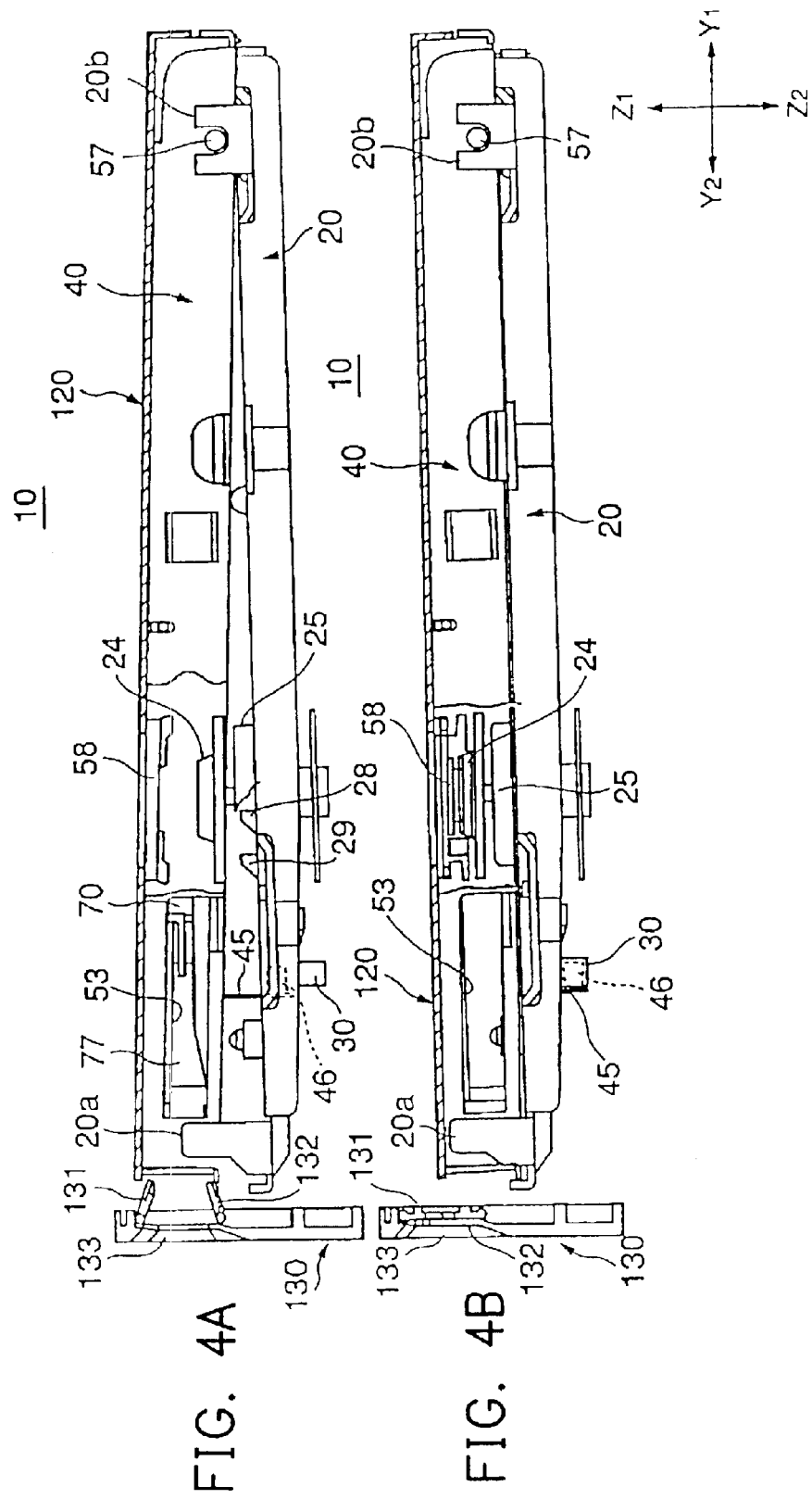
FIG. 4A and 4B are side views showing the disc device according to one embodiment of the present invention for explaining the operation of the holder.

The embodiments are described as follows accompanied with the attached drawings. FIGS. 1 to 4A, 4B shows the disc device 10 according to one embodiment of the present invention. FIG. 1 is an explosive view of the disc device 10, FIG. 2 is a plan view of the disc device 10, FIG. 3 is a front view of the disc device 10 and FIGS. 4A, 4B are side views of the disc device 10.

In this embodiment, the disc device 10 is a compatible disc device where the CD, CD-R, CD-RW, CD-ROM, DVD-ROM, DVD-RAM etc. with a diameter of 8 cm, (8 cm disc 11, hereinafter, referring to FIGS. 12 to 14), CD, CD-R, CD-RW, CD-ROM, DVD-ROM, DVD-RAM etc. with a diameter of 12 cm, (12 cm disc 12, hereinafter, referring to FIGS. 15 to 17) and the disc cartridge 13 (referring to FIGS. 18 and 19), receiving the DVD-RAM 14 (DVD), can perform a reproducing and/or a recording process.

The disc device 10 is carried with a loading device of slot-in/compatible type, where the disc 11, 12 or the disc cartridge 13 are inserted from the same insertion hole (opening) 133 (referring to FIGS. 4A and 4B).

The 8 cm disc 11 and the 12 cm disc 12 are equivalent to the disc medium described in the claims. The discs 11, 12 are directly loaded into the disc device 10 without being received in the disc cartridge 13. The disc cartridge 13 receiving the DVD-RAM 14 (DVD) therein is equivalent to the cartridge described in the claims.

The disc device 10 substantially comprises a base 20, a holder 40, a carrier unit 70 and a base cover 120.

A turntable 24, a pick up 26, a first disc lever driving cam 28, a second disc lever driving cam 29 etc. are arranged on the mainbase body 21 of the base 20. A holding portion 20a stands on the front end of left and right sides of the base 20 in order to be in contact with the left and right sides of the front end of the holder 40, and to support the front end of the holder 40. A bearing 20b stands on the rear end of the left and right sides of the base 20 for being in contact with the left and right sides of the rear end of the holder 40 to support the rear end of the holder 40, and for bearing a shaft 57 protruding from the left and right sides of the rear end of the holder 40.

The mainbase body 21 is a plate-shaped base plate, and a first opening 22 and a second opening 23 are formed thereon. Two guide shafts 27 are arranged across the first opening 22 and extend in the Y1, Y2 directions. The guide shafts 27 are separately arranged in a predetermined distance.

Two sides of the pick up 26 are guided by the guide shafts 27, so that the pick up 26 can be moved in the Y1, Y2 directions (the radial directions of each disc 11, 12, 14) by a pick up driving mechanism (not shown). The pick up 26 irradiates a laser beam on each disc 11, 12 or 14 in a loaded state that is transported to the position of performing reproducing and/or recording (reproducing/recording position, hereinafter), and then receives the reflecting beam. In this way, the pick up 26 can reproduce and/or record each disc 11, 12 or 14.

The turntable 24 is rotated with a predetermined rotation number by a disc motor 25 arranged on the mainbase body 21. When each disc 11, 12, 14 is transported to the reproducing/recording position, the turntable 24 engages with each center hole 11a, 12a, 14a of each disc 11, 12, 14 by moving the holder 40 in a way described below. Then the turntable 24 clamps each disc 11, 12 or 14 with a damper 58. Therefore, each disc 11, 12, 14 is rotated with a predetermined rotation number by the disc motor 25.

A holder driving slider 30 (referring to FIG. 3) is arranged under the second opening 23 of the mainbase body 21. The holder driving slider 30 can move along the X1, X2 directions by a sliding motor, not shown. A cam plate 31 is arranged on a predetermined position of the holder driving slider 30 and extends along a top-and-down direction (Z1, Z2 directions).

A tilted cam pair 32, 33 formed by long holes, are set on the cam plate 31. Each tilted cam 32, 33 as shown in FIG. 3, is formed in a Z shape in front view. Therefore, as the holder driving slider 30 is moved in the X1, X2 directions by the sliding motor, each tilted cam 32, 33 is accordingly moved along the X1, X2 directions.

The first and second disc lever driving cams 28, 29 protrude from the mainbase body 21 in the Z1 direction (see FIGS. 1, 3 and 4A). The first and second disc lever driving cams 28, 29 are formed at positions corresponding to the installation position of the disc lever 60, which is described later. Furthermore, the disc lever 60 is arranged in a way functioning as a cartridge insertion detecting device.

The holder 40 is arranged on the base 20. A right rail 50, a left rail 51, a base cover 120, the disc lever 60 and a carrier unit (transporting mechanism) 70 are arranged on the holder 40. The holder 40 is constructed on the base 20 (referring to FIGS. 4A and 4B) in a way capable of swinging centered on a rotatioal shaft 57, which is described in detail as below.

The holder 40 is integrally formed by a bottom plate 41, a right wall 42 and a left wall 43 by bending a metal plate. A first opening 44, a second opening 45 and a third opening 49 are formed on the bottom plate 41.

The first opening 44 covers the installation position of the turntable 24 disposed on the base 20 and the moving position of the pick up 26. Therefore, the turntable 24 loads each disc 11, 12 or 14 through the first opening 44. Additionally, the laser beam is irradiated and received between the pick up 26 and each disc 11, 12 or 14 through the first opening 44.

A hanging portion 46 is installed on the fringe of the second opening 45. The hanging portion 46 hangs downward from the bottom plate 41. A driven pin pair 47, 48 is arranged on the hanging portion 46 so as to protrude forward.

Under the condition that the holder 40 is installed onto the base 20, the hanging portion 46 protrudes downward from the second opening 45 to the base 20. As shown in FIG. 3, the driven pins 47, 48 are arranged on the hanging portion 46 and engaged with the tilted cams 32, 33 of the cam plate 31 installed on the holder driving slider 30.

Therefore, in the disc device 10, when the sliding motor drives from the condition of FIG. 3 (the same as FIG. 4A) and the holder driving slider 30 moves in the X1 direction, the driven pin 47 relatively moves downward in the tilted cam 32, and the driven pin 48 will relatively move downward in the tilted cam 33. In this way, the holder 40 with a hanging portion 46 installed in the front side thereof will swing counterclockwise as in FIG. 4B centered on the rotational shaft 57 protruding from the two sides of the rear end of the holder 40. When the driven pins 47, 48 arrive at the lower end of the tilted cams 32, 33, shown in FIG. 4B, the front end of the holder 40 inclines downward to be in contact with the base 20.

When the sliding motor drives from the condition of FIG. 4B (the condition is called the down-motion position of the holder 40, hereinafter), and the holder driving slider 30 moves in the X2 direction, each driven pin 47, 48 moves upward in each tilted cam 32, 33. In this way, the holder 40 swings clockwise as in FIGS. 4A and 4B centered on the rotational shaft 57. When the driven pins 47, 48 arrive at the upper end of the tilted cams 32, 33, shown in FIGS. 3 and 4A, the holder 40 is under the condition of separating from the base 20 (the condition is called the up-motion position of the holder 40, hereinafter).

The third opening 49 is formed on a position opposite to the first and second disc lever driving cams 28, 29 that are arranged on the base 20. Therefore, when the holder 40 moves to the down-motion position, the first and second disc lever driving cams 28, 29 protrude from the upper portion of the bottom plate 41 through the third opening 49.

A right wall 42 and a left wall 43 are respectively formed at the right side and the left side of the bottom plate 41 with the structure as described above. Each edge 55, 56 is formed on the upper portion of each wall 42, 43 by perpendicularly bending the walls 42, 43 inward within a predetermined range. Therefore, the two sides of the holder 40, as shown in FIG. 3, are substantially formed in a C shape in front view.

The rails 50, 51 are respectively arranged on the walls 42, 43 with edges 55, 56. Specifically, the right rail 50 is fixed on the right wall 42, and the left rail 51 is fixed on the left wall 43. Each rail 50, 51 is formed by resin and extends along the two walls 42, 43 of the holder 40 in the directions Y1, Y2 respectively.

As shown in FIG. 3, the cross-sectional view of each rail 50, 51 is substantially a C shape. The carrier unit 70 (to be described as follows) is guided by the rails 50, 51 to move in the directions Y1, Y2. A lock gear 52 is formed within the moving range of the carrier unit 70 on the inner wall of the left rail 51.

A cartridge lever retroceding opening 53 is formed on the right rail 50. The cartridge lever retroceding opening 53 covers the right wall 42 and penetrates in the X1, X2 directions. A disc lever opening 67 is formed on the left rail 51. The disc lever opening 67 covers the left wall 43 and penetrates in the X1, X2 directions. Furthermore, the rails 50, 51 are firm fixed on the holder 40 such that the rails 50, 51 will not be displaced with respect to the holder 40.

As shown in FIG. 1, the disc lever 60 comprises: a lever body 61, a rotational shaft 62, a disc holder 63 and an engaging portion 66. The rotational shaft 62 stands on the end of the lever body 61 extending along the Y1 direction in FIG. 1. The rotational shaft 62 is held by the bearing 64 formed on the left wall 43 of the holder 40. As described above, because the disc lever opening 67 is formed on the left rail 51 and the left wall 43, the disc lever 60 rotates freely centered on the rotational shaft 62 within the disc lever opening 67.

Additionally, the lever body 61 is a plate shape, and is carried on the bottom plate 41 when the holder 40 is under the condition being loaded. The lever body 61 slides on the bottom plate 41 by rotating the disc lever 60. The engaging portion 66 is formed on a predetermined position of the lever body 61. When the holder 40 moves to the down-motion position, the engaging portion 66 is selectively engaged to the first or second disc lever driving cam 28, 29 installed on the base 20.

The disc holder 63 is formed by an upper claw and a lower claw as a claw pair. The disc holder 63 is installed on the standing portion of the end extending in the Y2 direction in FIG. 1 of the lever body 61. When the 8 cm disc 11 or the 12 cm disc 12 is inserted and transported to the inside of the disc device 10, the disc holder 63 engages with and supports each rear portion in the inserting direction of each disc 11, 12.

The disc lever 60 is connected to the disc lever actuating spring 65, shown in FIG. 2. The end of disc lever actuating spring 65 extending in the Y1 direction is connected to the holder 40, and the other end extending in the Y2 direction is connected to the disc lever 60. In the plan view, the disc lever 60 is rotationally actuated counterclockwise centered on the rotational shaft 62 by the disc lever actuating spring 65.

The base cover 120 is installed on the upper portion of the holder 40 by screwing the two sides of the base cover 120 onto the edges 55, 56. The damper 58 is disposed on the central portion of the base cover 120. The installation position of the damper 58 corresponds to the installation position of the turntable installed on the base 20.

Referring to FIG. 4A, when the holder 40 is at the up-motion position (the first position), the damper 58 separates from the turntable 24, and each disc 11, 12 and disc cartridge 13 can be received by the holder 40. Following each disc 11, 12 and the cartridge 13 being transported into the holder 40, and when the holder 40 moves to the down-motion position (the second position) as shown in FIG. 4B, the damper 58 approaches the turntable 24.

Referring to FIGS. 4A and 4B, the insertion hole 133 is opened on the front bezel 130 for inserting the discs 11, 12 and the cartridge 13. The insertion hole 133 is blocked by two divided doors (open/close unit) 131, 132 in the up-and-down direction (referring to FIG. 4B), before the cartridge 13 has been inserted. When inserting the cartridge 13, the doors 131, 132 rotate inward (referring to FIG. 4A).

The disc 11, 12 or the cartridge 13 inserted into the insertion hole 133 is transported to the inside of the disc device 10 by the carrier unit 70. When finishing transporting, each disc 11, 12, 14 is clamped between the damper 58 and the turntable 24. A magnet is installed on the damper 58, and a yoke for clamping is installed on the turntable 24. Therefore, each disc 11, 12, 14 can be firmly clamped between the damper 58 and the turntable 24 by the magnetic force of the magnet.

The carrier unit 70 is described in detail as follows. The carrier unit 70 supports each disc 11, 12 and the cartridge 13, and the carrier unit 70 is installed on the holder 40 in a way capable of moving in the Y1, Y2 directions. Under the condition of supporting the disc 11, 12 or the cartridge 13, the carrier unit 70 transports each disc 11, 12 or the cartridge 13 in an inserting direction by the carrier unit 70 moving in the Y1 direction. Additionally, the carrier unit 70 transports each disc 11, 12 or the cartridge 13 in an ejecting direction by the carrier unit 70 moving in the Y2 direction.

Figure 5:
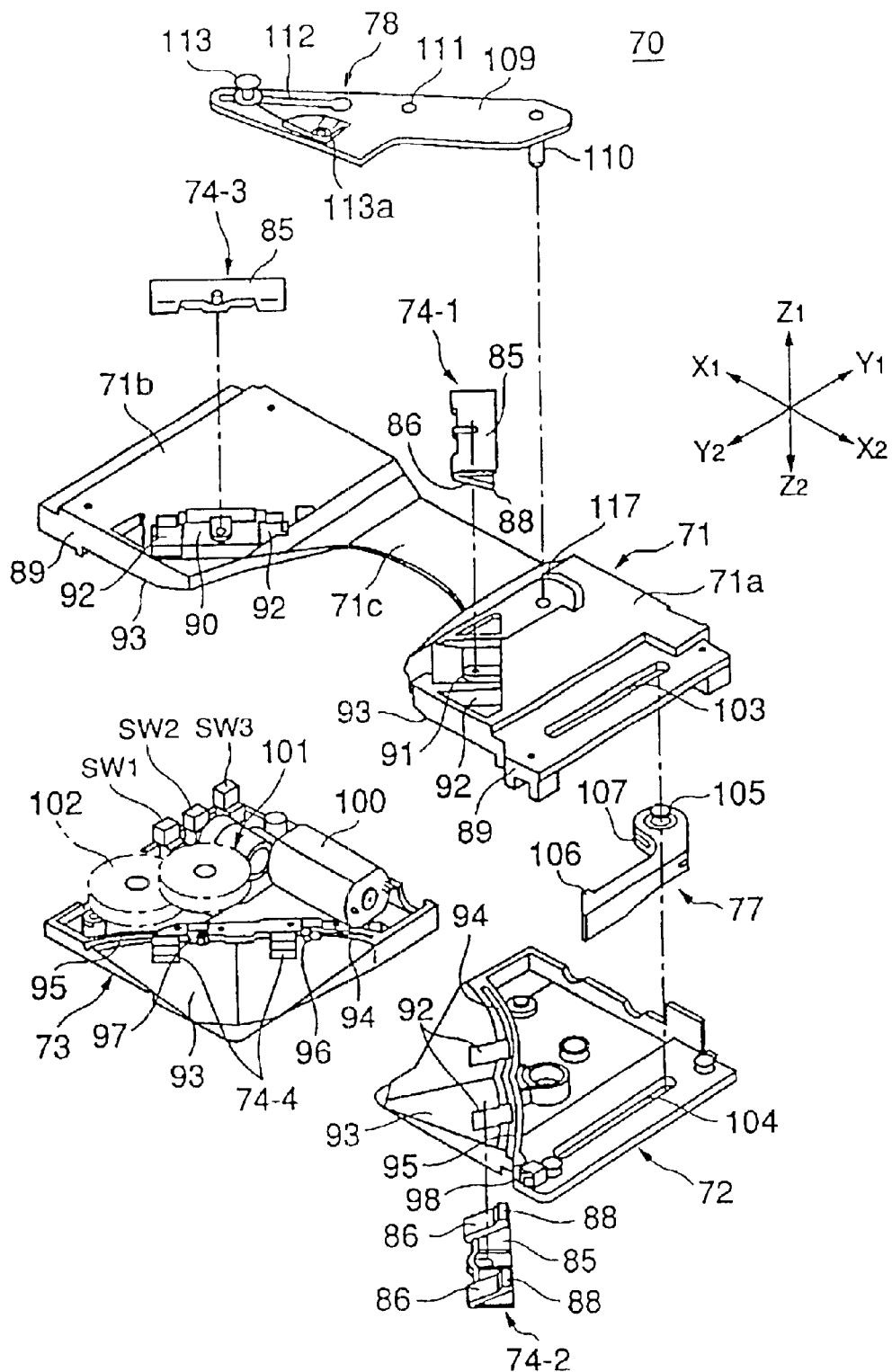
FIG. 5 is an explosive view showing the carrier unit of the disc device according to one embodiment of the present invention.

Referring to FIG. 5, the carrier unit 70 comprises an upper half portion 71, a right lower half portion 72, a left lower portion 73, clip discs 74 (74-1~74-4), a cartridge lever 77 and a shutter lever 78.

Each half body 71~73 is formed by resin, and is together constructed into the carrier body. The right portion 71a and the left portion 71b of the upper half portion 71 are connected to each other by the connection portion 71c. An assembling recess 91 is formed on the right portion 71a for installing the first clip disc 74-1. An assembling recess 90 is formed on the left portion 71b for installing the third clip disc 74-3.

A cartridge lever guide groove 103 is formed on the right side of the right portion 71a and is extended in the Y1, Y2 directions. A shaft 105 of the cartridge lever 77 is moveably engaged to the cartridge lever guide groove 103. The cartridge lever 77 is used during the transportation of the disc cartridge 13, and its detailed description is as follows.

A shaft hole 117 is formed on the right portion 71a, and the shutter lever 78 is installed in the shaft hole 117. When the disc cartridge 13 is inserted into the disc device 10, the shutter lever 78 can open/close the shutter 15 set on the disc cartridge 13.

A shaft 110, protruding downward from the vicinity of one end of the lever body 109 with a plate shape, is formed on the shutter lever 78. The shaft 110 is installed on the upper half portion 71 by the shaft 10 being rotatably penetrated through the shaft hole 117.

In addition, a long hole 112, extending along the longitudinal direction of the lever body 109, is formed in the vicinity of the other end of the lever body 109, and a shutter driving pin 113 is movably assembled in the long hole 112. As shown in FIG. 3, the shutter driving pin 113 is protruded downward from the lever body 109 for engaging with the shutter (not shown) installed on the disc cartridge 13.

The shutter driving pin 113 is arranged to be able to slide with a low sliding friction with respect to the long hole 112 so as to decrease the loading for opening/closing the shutter of the disc cartridge 13. Furthermore, the shutter driving pin 113 is slidably inserted into the long hole 112 of the shutter lever 78, and the upper end of the shutter driving pin 113 is slidably inserted into the slit 126 formed on the base cover 120. The shutter (not shown) of the cartridge 13 can rotate to open/close by sliding the shutter driving pin 113 in the slit 126. Furthermore, when loading the disc, because the resilient force of the shutter recovering spring does not act, the shutter driving pin 113 moves in the ejecting direction by a recovering torsion spring 113a with a weaker resilient force.

The shutter driving pin 113 is also engaged with a slit 126 formed on the base cover 120. The shutter driving pin 113 moves under being engaged with the slit 126. Accordingly, when the disc cartridge 13 is inserted to or ejected from the disc device 10, the shutter (not shown) is opened and closed because the shutter driving pin 113 is restrictively moved within the positions of the long hole 112 and the slit 126 as the shutter lever 78 is rotated.

Next, referring to FIGS. 6A, 6B and 7A, 7B, the first to the fourth clip disc 74-1~74-4 assembled on the carrier unit 70 are described as follows.

In the embodiment of the present invention, the four clip discs 74-1~74-4 are assembled, but they are the same structure. Therefore, in the following description, all of the four clip discs 74-1~74-4 are termed clip discs 74 if no specified situation is pointed out.

Referring to FIGS. 6A, 6B and 7A, 7B, the clip disc 74 is made of resilient resin material and consists of a pair of tongue pieces 86. A through hole 85a for screwing a screw 87a therethrough is formed on a fixing portion 85 of each clip disc 74. The screws 87a are screwed through the through holes 85 such that the screws 87a are screwed onto the supporters 87b that protrude from the right portion 71a, the left portion 71b, the right lower half portion 72 and the left lower half portion 73. Thereby, each clip disc 74 is fixed on the carrier unit 70.

The tongue pieces 86 are tilted and extended in front of the fixing portion 85 by bending and folding two side portions of the fixing portion 85. Therefore, the clip disc 74 is substantially a V shape from its side view. Furthermore, a touch portion 88 is protruded from a front end of each tongue piece 86.

As shown in FIG. 5, the first clip disc 74-1 is installed on the assembling recess 91 from the top of the right portion 71a. At this time, the tongue pieces 86 of the first clip disc 74-1 are located at a lower position. In addition, an opening 92 is formed on a position of the assembling recess 91, which faces the tongue piece 86, thereby the tongue piece 86 is protruded to the disc facing surface 93 through the opening 92.

The second clip disc 74-2 is installed on the assembling recess (not shown) formed on the right lower half portion 72 from the bottom. At this time, the tongue pieces 86 of the second clip disc 74-2 are located at an upper position. In addition, an opening 92 is formed on a position of the assembling recess, which faces the tongue piece 86, thereby the tongue piece 86 is protruded to the disc facing surface 93 through the opening 92.

At this time, the assembling positions of the first clip disc 74-1 and the second clip disc 74-2 are set in an opposite manner. More specifically, referring to FIG. 7A, the first clip disc 74-1 and the second clip disc 74-2 are arranged such that the corresponding tongue pieces 86 resist each other, and the contact portions 88 formed on the front ends of the tongue pieces 86 utilize the actuating force of the tongue pieces 86 to contact each other. At this time, the contact portions 88 of tongue pieces 86 contact by means of gradually approaching to the insertion direction (the arrow direction of Y1) of the disc 11, 12.

According to the structure above, when the 8 cm disc 11 or the 12 cm disc 12 is inserted to the carrier unit 70, the disc 11 or 12 is inserted between the first clip disc 74-1 and the second clip disc 74-2. Referring to FIG. 7B, the right front end in the insertion direction of the discs 11, 12 is clamped between the touch portion 88 of the first clip disc 74-1 and the touch portion 88 of the second clip disc 74-2. Thereby, the discs 11, 12 can be held by the first clip disc 74-1 and the second clip disc 74-2.

The third clip disc 74-3 is installed on the assembling recess 90 from the top of the left portion 71b. At this time, the tongue pieces 86 of the third clip disc 74-3 are located at a lower position. In addition, an opening 92 is formed on a position of the assembling recess 90, which faces the tongue piece 86, thereby the tongue piece 86 is protruded to the disc facing surface 93 through the opening 92.

Additionally, the forth clip disc 74-4 is disposed opposite to the third clip disc 74-3. Same as the first and second clip discs 74-1, 74-2, the tongue pieces 86 of the third clip disc 74-3 are arranged against the tongue pieces 86 of the forth clip disc 74-4. In this way, touch portions 88 formed on the front ends of the tongue pieces 86 are in contact with each other with a resilient force of the tongue pieces 86.

According to the structure above, when the 8 cm disc 11 or the 12 cm disc 12 is inserted to the carrier unit 70, the disc 11 or 12 is inserted between the third clip disc 74-3 and the fourth clip disc 74-4. Then, as shown in FIG. 7B, the left front end in the insertion direction of the discs 11, 12 is clamped between the touch portion 88 of the third clip disc 74-3 and the touch portion 88 of the fourth clip disc 74-4. Thereby, the discs 11, 12 can be held by the third clip disc 74-3 and the fourth clip disc 74-4.

In this way, the left and right tips of the 8 cm disc 11 or the 12 cm disc 12 are clamped by the first and second clip discs 74-1, 74-2 and the third and the forth clip discs 74-3, 74-4.

On the other hand, referring to FIG. 5, the right lower half portion 72 is assembled under the right portion 71a forming the upper half portion 71. A cartridge lever guide groove 104, extending in the arrow directions of Y1 and Y2, is formed in vicinity of the right side of the right lower half portion 72. A shaft 105 (not shown) located under the cartridge lever 77 is movably engaged with the cartridge lever guide groove 104.

Accordingly, the shaft 105 protruded above and below the cartridge lever 77 is movably and rotatably engaged with the cartridge lever guide grooves 103, 104 under the condition that the right lower half portion 72 is fixed onto the upper half portion 71. Namely, the cartridge lever 77 is capable of moving along the insertion/remove directions (the arrow directions of Y1 and Y2 in FIG. 5) of each disc 11, 12 or 14 with spaces enclosed by the cartridge lever guide grooves 103, 104, and the cartridge lever 77 is capable of rotating centered on the shaft 105.

A cartridge lever actuating spring 108 is installed on the cartridge lever 77. One end of the cartridge lever actuating spring 108 is connected to a spring hook 107 formed on the cartridge lever 77, and the other end is connected to a predetermined position of the right lower half portion 72. Therefore, the cartridge lever 77 is actuated to rotate clockwise with respect to FIG. 2 centered on the shaft 105.

Furthermore, a disc facing surface 93 is formed on the right lower half portion 72, and an 8 cm-disc curve wall 94 and a 12 cm-disc curve wall 95 are provided in a standing manner on the outer circumference of the disc facing surface 93. The 8 cm-disc curve wall 94 has a curvature radius of 4 cm, and the 12 cm-disc curve wall 95 has a curvature radius of 6 cm.

When the 8 cm disc 11 is inserted to the carrier unit 70, a front end in the insertion direction of the 8 cm disc 11 is in contact with the curve wall 94 for the 8 cm disc, and additionally a front end in the insertion direction of the 12 cm disc 12 is in contact with the 12 cm-disc curve wall 95 when the 12 cm disc 12 is loaded into the carrier unit 70. As described above, the disc curve walls 94, 95 have curvature radii respectively corresponding to the radii of the loaded discs 11, 12, and the 8 cm-disc curve wall 94 with a small curvature radius is arranged in the arrow direction of Y1 with respect to the 12 cm-disc curve wall 95 with a large curvature radius.

More over, the 8 cm-disc curve wall 94 and the 12 cm-disc curve wall 95 with configurations mentioned above are also installed on the right portion 71a, the left portion 71b and the left lower half portion 73 (disc curve walls 94, 95 formed on the right portion 71a and the left portion 71b are not shown in FIG. 5).

Accordingly, the 8 cm disc 11 is in contact with the 8 cm-disc curve wall 94 when the 8 cm disc 11 is inserted to the carrier unit 70. Referring to FIGS. 7A, 7B and 10A, 10B, as the 8 cm disc 11 is just pushed to contact with the 8 cm-disc curve wall 94, the position of the 8 cm disc 11 with respect to the carrier unit 70 can be determined because the shape of the 8 cm-disc curve wall 94 corresponds to the outer circumference of the 8 cm disc 11.

Similarly, when the 12 cm disc 12 is inserted to the carrier unit 70, the 12 cm disc 12 is in contact with the 12 cm-disc curve wall 95 rather than the 8 cm-disc curve wall 94. Accordingly, as the 12 cm disc 12 is just pushed to contact with the 12 cm-disc curve wall 95, the position of the 12 cm disc 12 with respect to the carrier unit 70 can be determined.

Figures 8A, 8B:
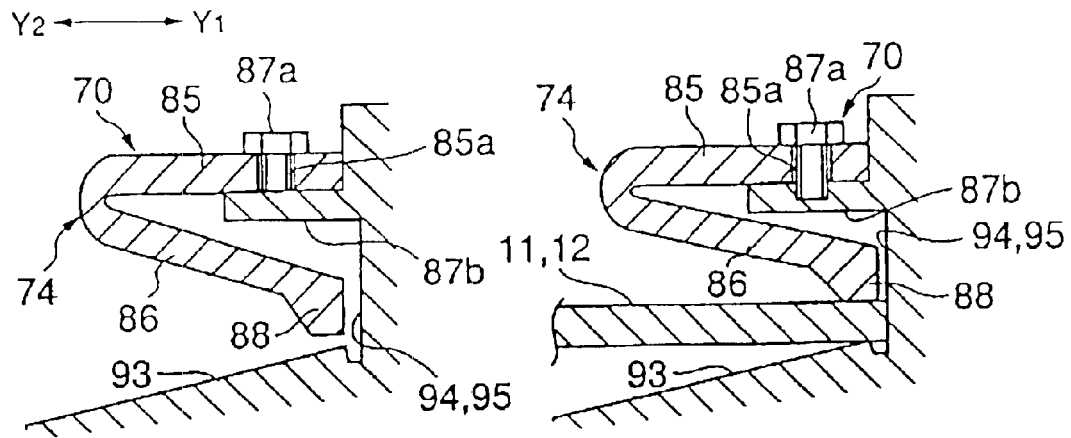
FIG. 8A and 8B are diagrams showing the operation of the clip disc.
Figures 9A, 9B:
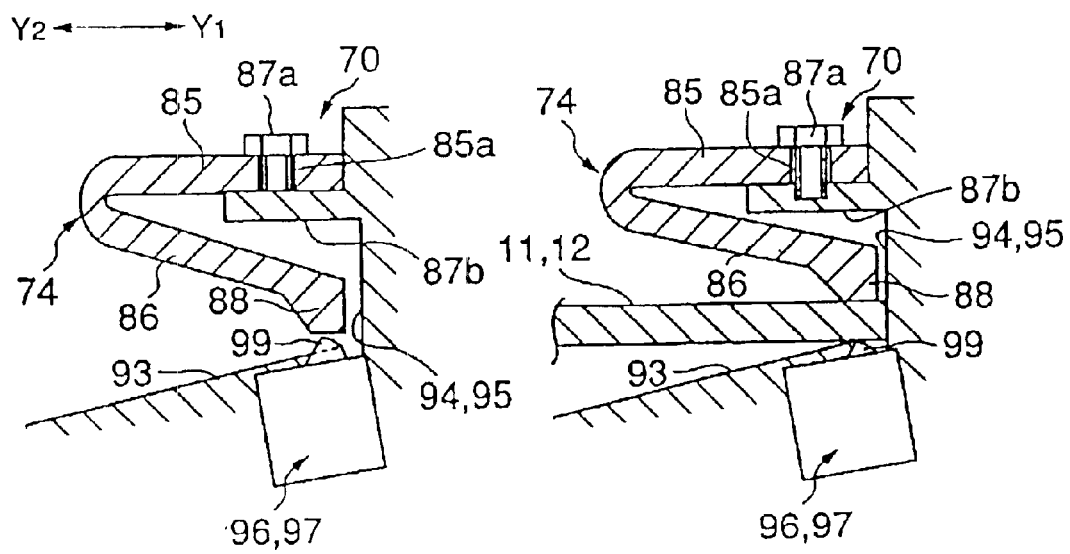
FIG. 9A and 9B are diagrams showing the operation of the clip disc.

Referring to FIGS. 8A, 8B, the disc facing surface 93 is a tilt surface tilted from the disc curve walls 94, 95 toward the arrow direction of Y2 in FIG. 5. Therefore, each of the discs 11 and 12 is guided by the disc facing surface 93 and pushed to contact with the disc curve walls 94, 95 when the discs 11 and 12 are loaded into the carrier unit 70. Accordingly, the position determination process of the discs 11 and 12 with respect to the carrier unit 70 can be easily determined.

Figure 10A:
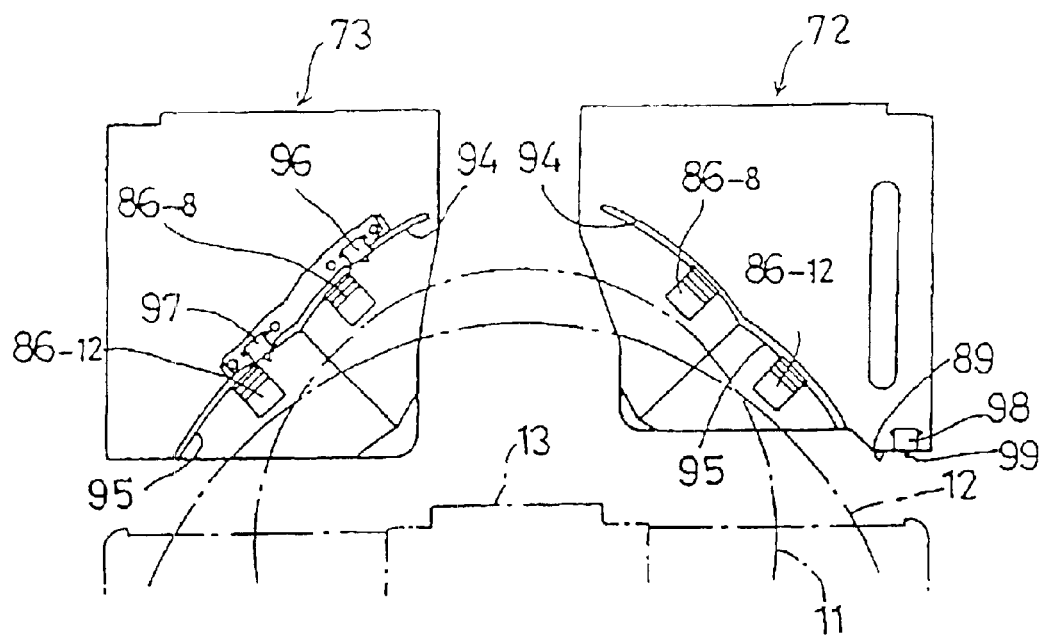
FIG. 10A and 10B are diagrams showing the disc detecting switch and the disc curve wall.
Figure 10B:
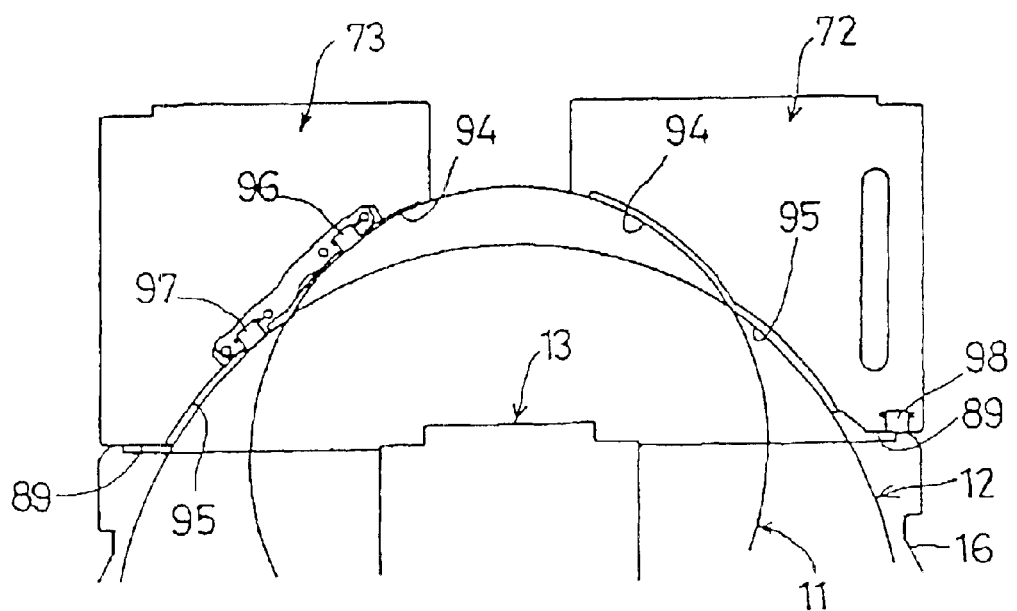

Furthermore, referring to FIG. 10B, a front end portion of the disc cartridge 13 is in contact with a front surface 89 of the carrier unit 70 when the disc cartridge 13 is inserted into the device 10. Therefore, due to the contact, the position determination of the disc cartridge 13 with respect to the carrier unit 70 can be made. In addition, a disc cartridge detecting switch 98 is installed on the right lower half portion 72, and has a contact portion 99 protruded from the front surface 89 of the carrier unit 70 (referring to FIGS. 10A, 10B). Therefore, the inserting process until the disc cartridge 13 is in contact with carrier unit 70 can be detected by the output of the disc cartridge detecting switch 98.

Referring to FIG. 5, a loading motor 100 and a gear group 101 are installed on the left lower half portion 73. The loading motor 100 drives the gear group 101 by meshing to the gear group 101. In addition, a gear 102 located at the outmost portion of the gear group 101 protrudes outward from the left lower half portion 73. The gear 102 is meshed to the lock gear 52 formed on the left rail 51 assembled on the holder 40 in the status wherein the carrier unit 70 is assembled to the holder 40.

Accordingly, by means of the loading motor 100 being driven and the gear 102 meshed to the lock gear 52 being rotated via the gear group 101, the carrier unit 70 is moved in the arrow direction of Y1 (the insertion direction) or in the arrow direction of Y2 (the ejecting direction) within the holder 40. Additionally, as the carrier unit 70 holds the disc 11, 12 or the disc cartridge 13 and the loading motor 100 is driven, the disc 11, 12 or the disc cartridge 13 together with the carrier unit 70 are transported in the arrow direction of Y1 (the insertion direction) or in the arrow direction of Y2 (the ejecting direction).

As described above, the 8 cm-disc curve wall 94 and the 12 cm-disc curve wall 95 are also installed on the left lower half portion 73. As shown in FIGS. 9A, 9B and 10A, 10B, an 8 cm-disc detecting switch 96 and a 12 cm-disc detecting switch 97 are respectively installed on the 8 cm-disc curve wall 94 and the 12 cm-disc curve wall 95.

The 8 cm-disc detecting switch 96 outputs a signal in response to the 8 cm disc 11 being inserted to a predetermined loaded position (the position in contact with the 8 cm-disc curve wall 94) in the carrier unit 70, and the 12 cm-disc detecting switch 97 also outputs a signal when the 12 cm disc 12 is inserted to a predetermined loaded position (the position in contact with the 12 cm-disc curve wall 95) in the carrier unit 70. Therefore, from the output signal out of the disc detecting switches 96, 97, the control device can detect that each of the discs 11 and 12 is loaded to the corresponding predetermined loaded position in the carrier unit 70.

Figure 11A:
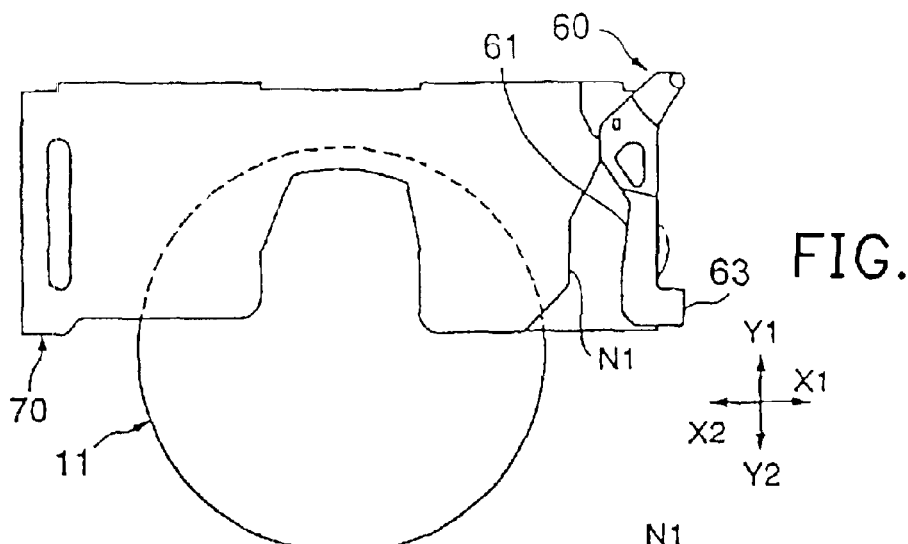
FIG. 11A~11C are diagrams showing the operations of the disc lever.
Figure 11B:
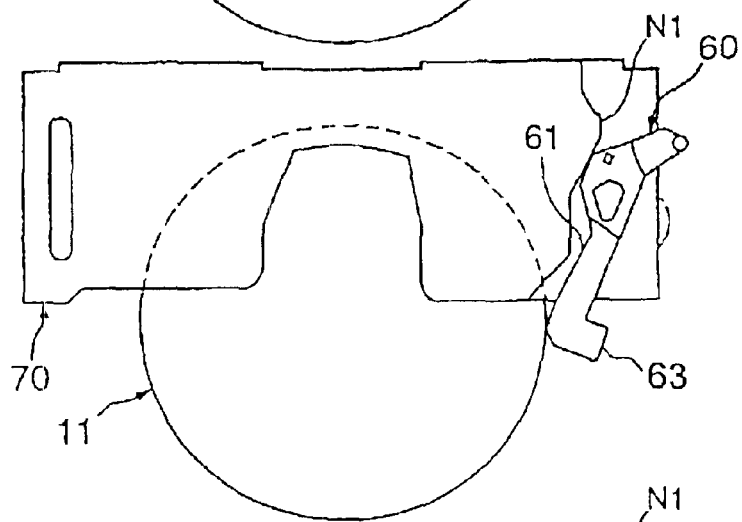
Figure 11C:
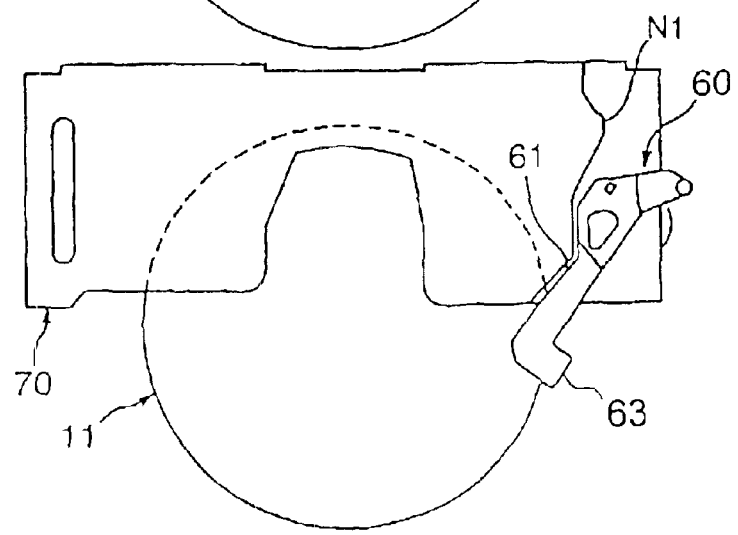

Referring to FIGS. 11A to 11C, the operation of the cartridge lever 60 is described during which the carrier unit 70 moves from the eject position P1 (the stop position of the rear end of the carrier unit 70 after the ejection operation, referring to FIG. 2) to the 8L start position P2 (the loading start position of the rear end of the carrier unit 70 when the 8 cm disc is inserted, referring to FIG. 2).

FIGS. 11A to 11C show the bottom view of the carrier unit 70 and the disc lever 60 viewed from inside, wherein FIG. 11A shows a status wherein the carrier unit 70 is at the eject position P1, FIG. 11B shows a status wherein the carrier unit 70 is between the eject position P1 and the 8L start position P2, and FIG. 11C shows a status wherein the carrier unit 70 is at the 8L start position P2.

The graded cam N1 formed inside the carrier unit 70 moves in the arrow Y1 direction due to the fact that the carrier unit 70 moves from the eject position P1 to the 8L start position P2. Thereby, as shown in FIGS. 11A to 11C, the disc lever 60 slides in contact with the graded cam N1 formed inside the carrier unit 70 by the actuating force of the disc lever actuating spring 65, and then is rotated counter-clockwise. Then, the disc holder 63 formed on the disc lever 60 is engaged with the rear portion in the insertion direction of the 8 cm disc 11.

The disc lever 60 presses the rear portion of the 8 cm disc 11 in the disc insertion direction by the actuating force of the disc lever actuating spring 65 when the lever body 61 is separated from the graded cam N1.

Accordingly, the front portion in the insertion direction of the 8 cm disc 11 is held by the clip discs 74-1~74-4 and the rear portion in the insertion direction of the 8 cm disc 11 is held by the disc lever 60. In the embodiment of the invention described above, even if the 8 cm disc 11 is not enfolded in a cartridge, the 8 cm disc 11 can be prevented from detaching from the carrier unit 70 and can be stably transported because both the front and the rear portions in the insertion direction are held.

In addition, the lever body 61 adjusts a rotational operation time by the graded cam N1 formed inside the carrier unit 70. The disc holder 63 is in contact with the rear portion in the insertion direction of the 8 cm disc 11 after the maximum diameter portion of the 8 cm disc 11 (the maximum distance portion with respect to the arrow X1, X2 directions, i.e., the center position) passes in the arrow Y1 direction, and thereby the disc insertion loading can be reduced.

On the other hand, the cartridge lever 77 is actuated by the cartridge actuating spring 108 and the shaft 105 moves in the arrow Y2 direction within the cartridge lever guide grooves 103, 104 due to the fact that the carrier unit 70 moves from the eject position P1 to the 8L start position P2. The cartridge lever 77 relatively moves in the arrow Y2 direction with respect to the carrier unit 70.

However, the fixing claw 106 of the cartridge lever 77 is maintained in a status that is in contact with the cartridge lever retroceding cam 54, and therefore the position of the cartridge lever 77 is not changed with respect to the holder 40.

The front bezel 130 of the disc device 10 and the doors 131, 132 around the insertion hole 133 will be explained as follows.

Figure 12:
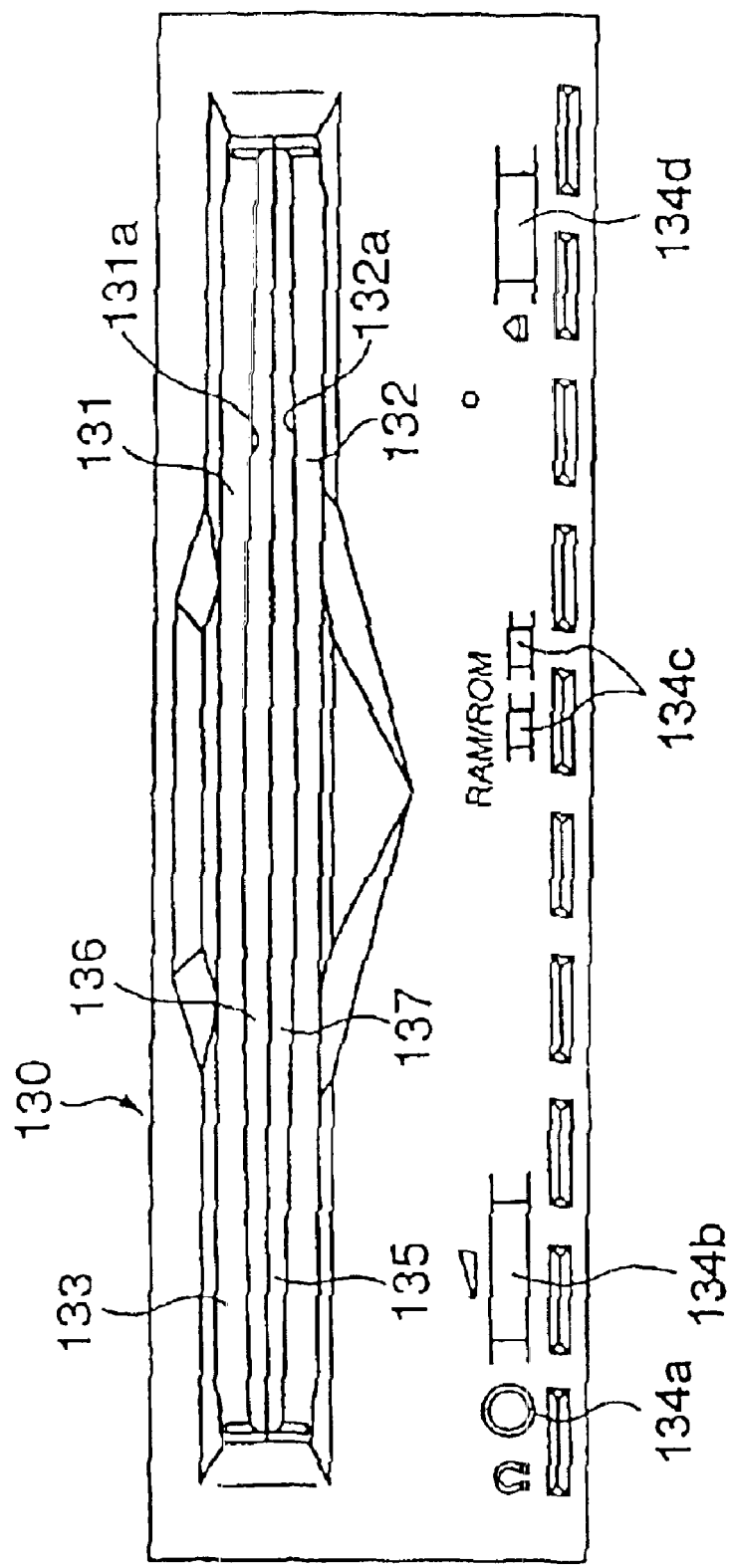
FIG. 12 is a front view showing the front bezel.

Referring to FIG. 12, an earphone microphone jack 134a, a volume switch 134b, an LED (Light-Emitting Diode) 134c, an ejecting button 134d and the insertion hole 133 are set on the front bezel 130. The height and width of the insertion hole 133 is formed for passing the disc cartridge 13. Two doors 131, 132 are formed on the upper and lower portions of the insertion hole 133 and block the insertion hole 133 before the disc cartridge 13 has been inserted.

Two ends of the doors 131, 132 are rotatably supported. When inserting/ejecting the disc cartridge 13, the door 131 rotates upward and the door 132 rotates downward. Furthermore, when inserting the disc cartridge 13, the doors 131 and 132 are pressed by the disc cartridge 13 and are rotated inward (toward inside of the disc device 10). When ejecting the disc cartridge 13, the doors 131, 132 are opened by an open/close mechanism (not shown).

Concaves 131a and 132a are respectively formed on the doors 131, 132 at the central portion of the insertion hole 133. When the doors 131 and 132 are at a shuttered position, the concaves 131a and 132a are facing and connected to each other to form a slit (clearance) 135, connecting the inside and the outside of the disc device 10. The slit 135 is an opening for inserting the disc 11 or 12.

Figure 13:
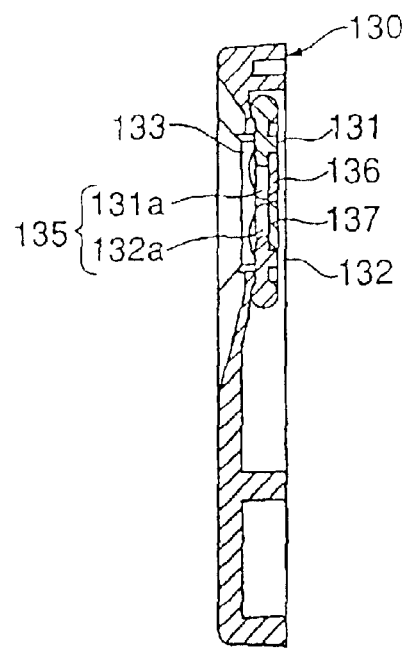
FIG. 13 is a cross-sectional view showing the front bezel.

Referring to FIG. 13, elastomers 136, 137 are adhered onto the concaves 131a, 132a inside the doors 131, 132. The elastomers 136, 137, for example, can be formed with resilient material such as felt. The elastomers 136, 137 can be deformed and bent inward by inserting the disc 11, 12 and can be bent outward by ejecting the disc 11 or 12. Additionally, the elastomer 136, 137 can be formed with some resilient material except for felt (gum for instance).

Figure 14:
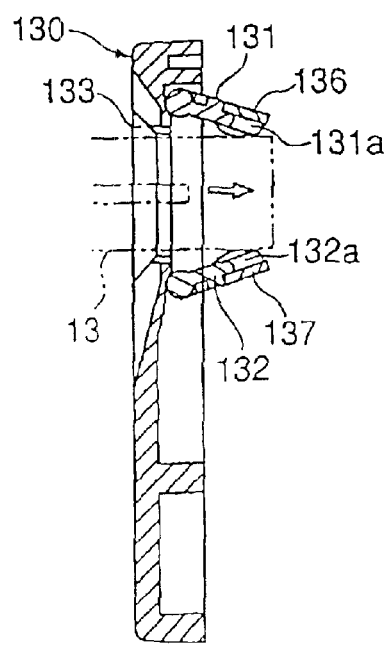
FIG. 14 is a cross-sectional view showing the doors 131, 132 being opened by inserting the disc cartridge 13.

Referring to FIG. 14, when inserting the disc cartridge 13, the doors 131, 132 will rotate in the opening direction to allow the disc cartridge 13 to be inserted. Then the disc cartridge 13 is guided into the insertion hole 133 and passes the central region of the insertion hole 133. Therefore, the disc cartridge 13 can be smoothly inserted and can be firmly latched by the cartridge lever 77 of the carrier unit 70. Then the disc cartridge 13 can be transported into the disc device 10.

Figure 15:
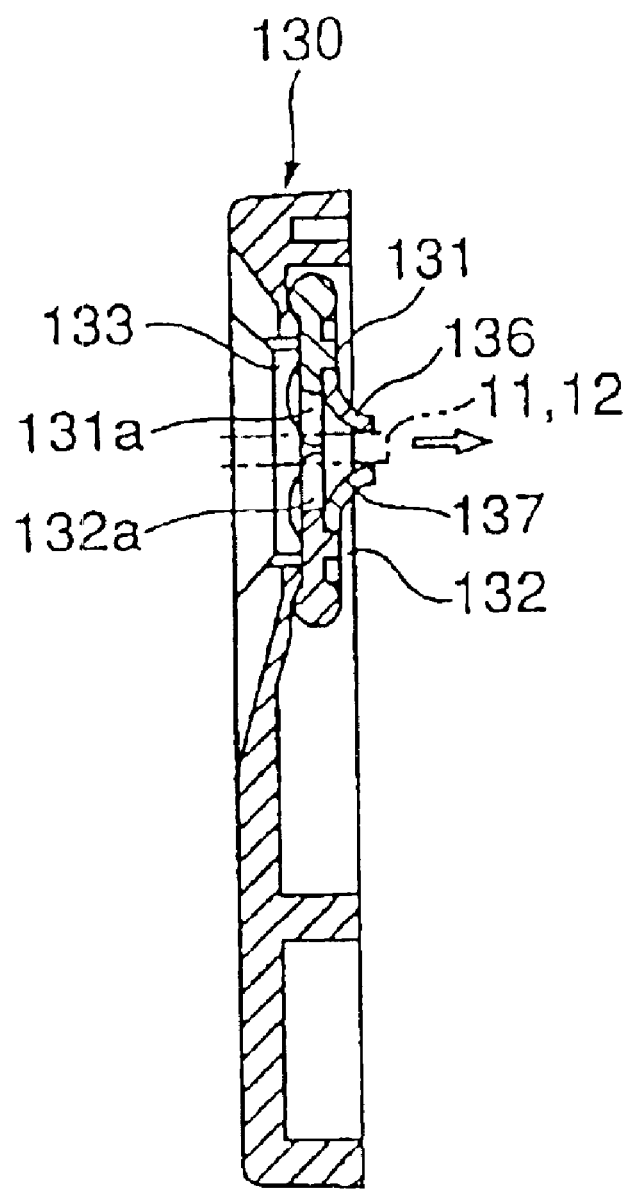
FIG. 15 is a cross-sectional view showing the disc 11, 12 being inserted into the slit 135.

Referring to FIG. 15, when inserting the disc 11 or 12 through the slit 135, formed between the doors 131, 132, the elastomers 136, 137 will be pressed to the circumference of the disc 11 or 12 and will rotate inward. Then the disc 11 or 12 will be clamped by the deformed elastomers 136, 137 and will be inserted into the disc device 10 at the same time. Therefore, the disc 11 or 12 can pass the central region of the insertion hole 133 when the disc 11 or 12 is guided by the elastomers 136, 137 at the same time.

Therefore, the discs 11 12 or the cartridge 13 is inserted through the central region of the insertion hole 133, and the disc 11 or 12 can be supported and transported inside the disc device 10 by the clip discs 74-1~74-4 of the carrier unit 70.

Though two doors 131, 132 are used in this embodiment, the door can also be formed by one member to open/close the insertion hole 133.

The door open/close driving mechanism 140 for driving the doors 131, 132 to open or close the insertion hole 133 will be explained as follows.

Figure 16:
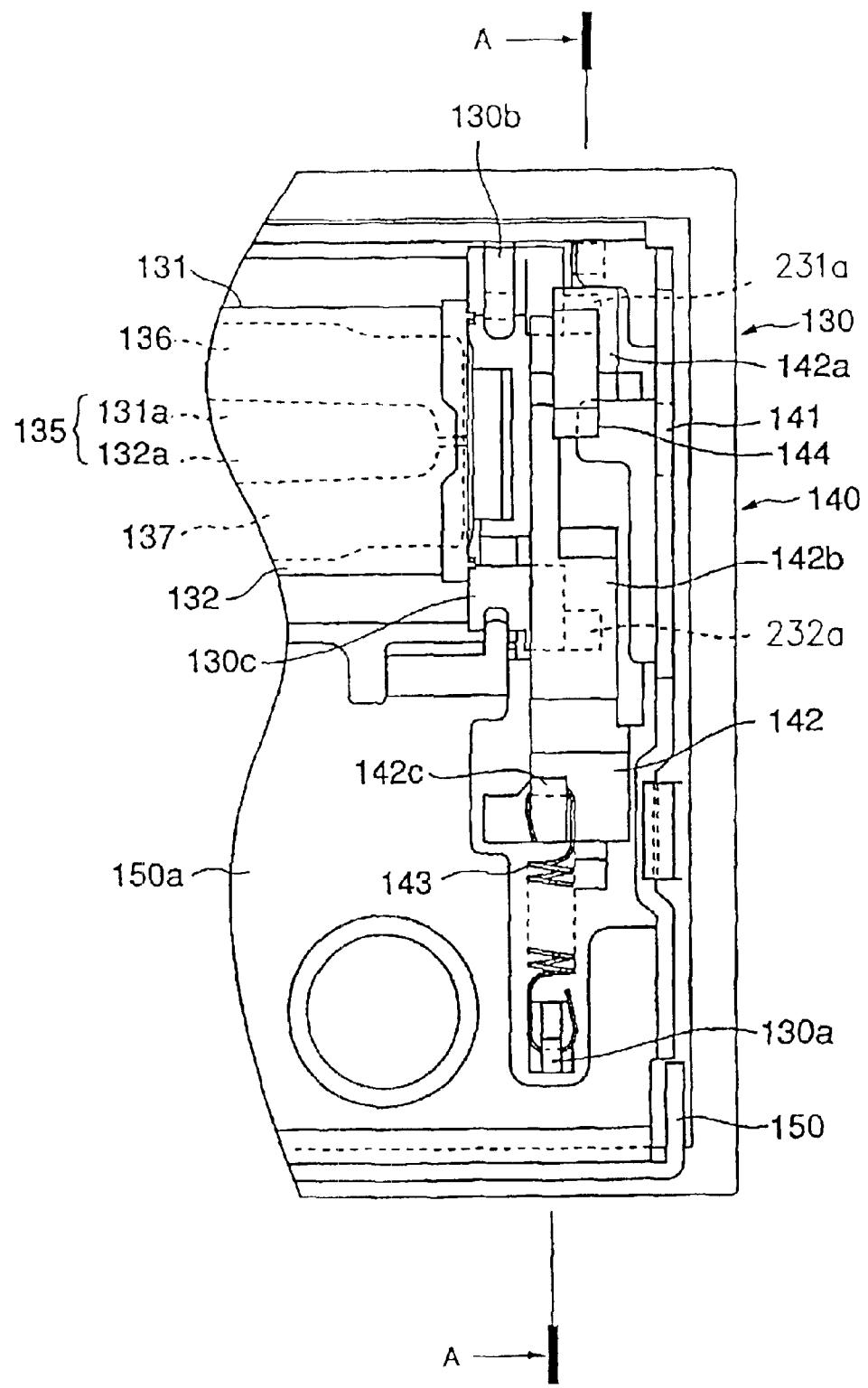
FIG. 16 is a back view showing the front bezel 130 with the door open/close driving mechanism 140.
Figure 17:
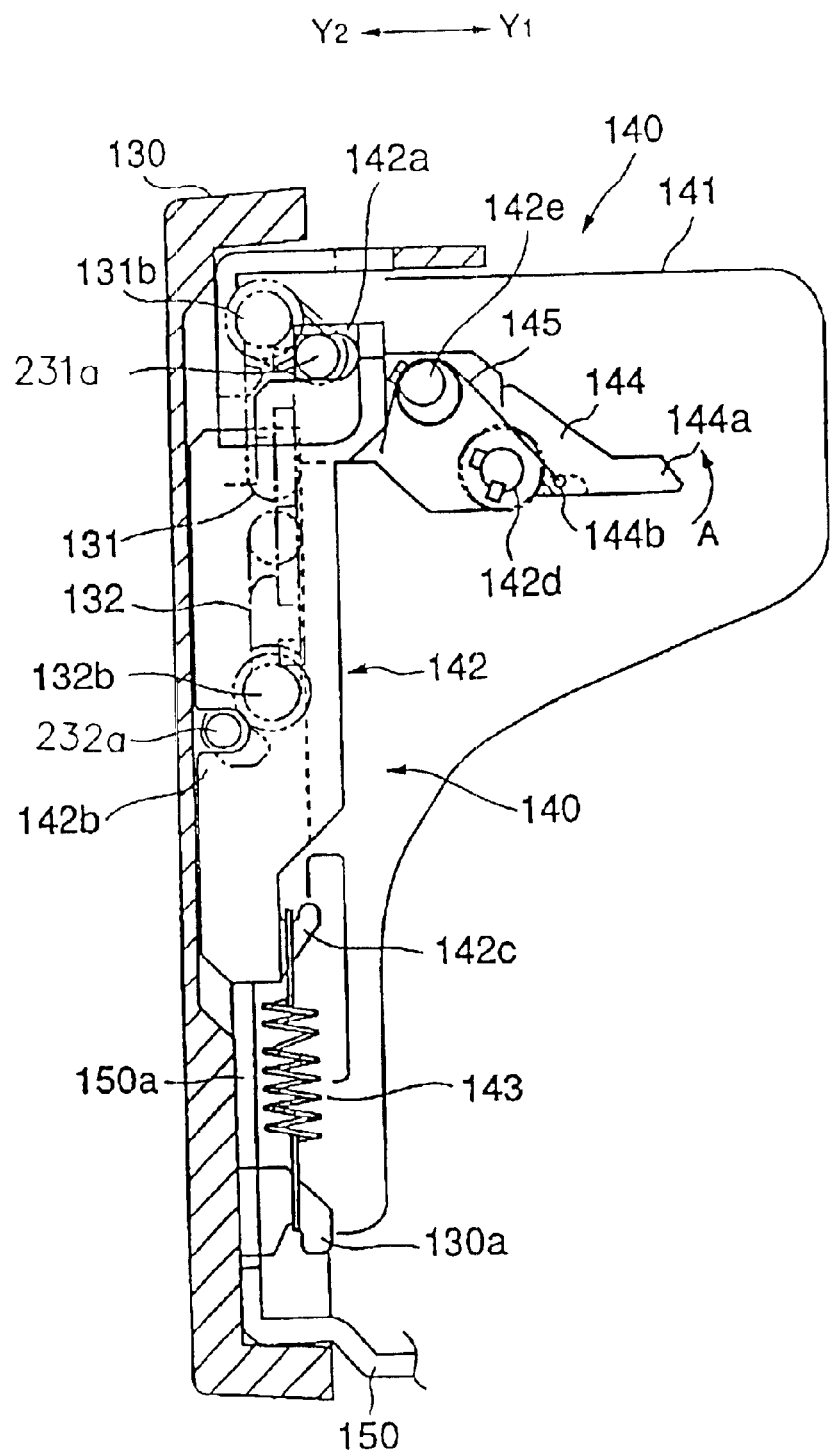
FIG. 17 is a cross-sectional view along the line A—A of FIG. 16.
Figure 18:
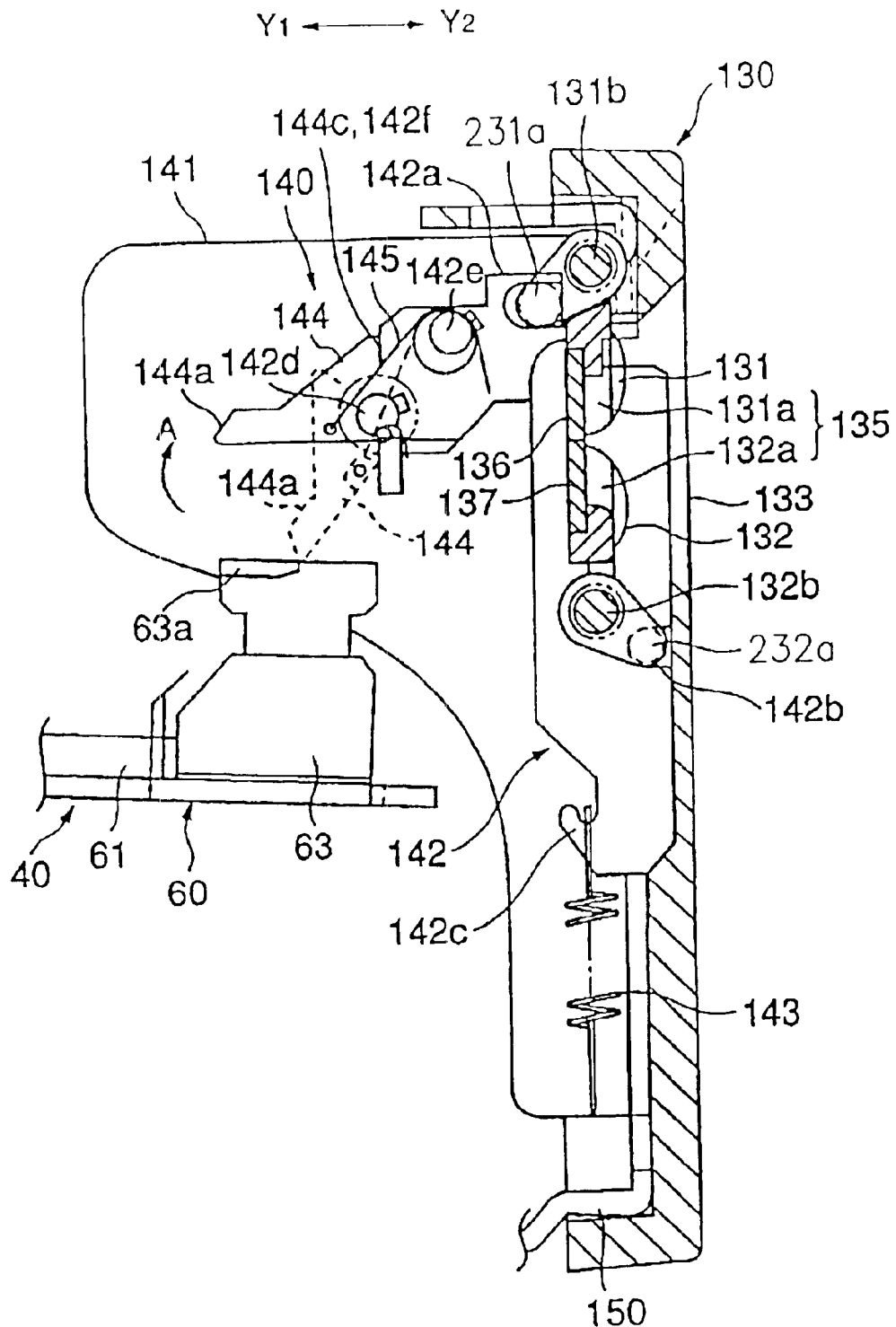
FIG. 18 is a side view showing the door open/close driving mechanism 140.

FIG. 16 is a back view showing the door open/close driving mechanism 140 set on the front bezel 130. FIG. 17 is a cross-sectional view along the line A—A of FIG. 16. FIG. 18 is a side view showing the door open/close driving mechanism 140.

Referring to FIGS. 16 to 18, the door open/close driving mechanism 140 is installed on the right side of the back face of the front bezel 130. The door open/close driving mechanism 140 comprises a bracket 141, a sliding member, a coil spring 143, a rotating member and a torsion spring 145. The bracket 141 protrudes toward the right side of the back face of the front bezel 130. The sliding member 142 is supported on the bracket 141 in the way capable of sliding top and bottom with respect to the bracket 141. The coil spring 143 actuates the sliding member 142 downward. The rotating member 144 is rotatably supported by the shaft 142d, protruding on the upper end of the sliding member 142, and the rotating member 144 is in contact with the front end of the disc lever 60. The torsion spring 145 actuates the rotating member 144 toward the A direction in FIG. 17 (the direction separating from the front end of the disc lever 60).

The sliding member 142 comprises engaging portions 142a and 142b, engaged to the acentric pins 231a, 232a, protruding from the ends of the doors 131, 132, a hook portion 142c, hangs on the coil spring 143, a shaft 142d, rotatably supporting the rotating member 144, and a protrusion pin 142e, supporting the torsion 145. The other end of the coil spring 143 hangs on the hook 103a, protruding toward the lower side of the inner face of the front bezel 130, and actuates the sliding member 142 downward.

The doors 131, 132 comprise shafts 131b, 132b and the acentric pins 231a, 232a, protruding acentriced on the shafts 131b and 132b. The shafts 131b and 132b are rotatably supported on bearings 130b, 130c, protruding toward the inner face of the front bezel 130. With the rising of the sliding member 142, the doors 131, 132 are pressed in the same direction and are rotated inward under the condition of the acentric pins 231a, 232a being engaged to the engaging portions 142a, 142b. In this way, the insertion hole 133 is opened and is capable to eject the disc cartridge 13.

The rotating member 144 is about a triangle. One end of the torsion spring 145 is inserted into and actuates the through hole 144b. Then the tip protrusion 144a extends in the horizontal direction and is rotated in direction A. Before inserting the disc, the protrusion 63a of the disc holder 63 of the front end of the disc lever 60 is disposed above the rotating member 144 (referring to FIG. 20).

Figure 19:
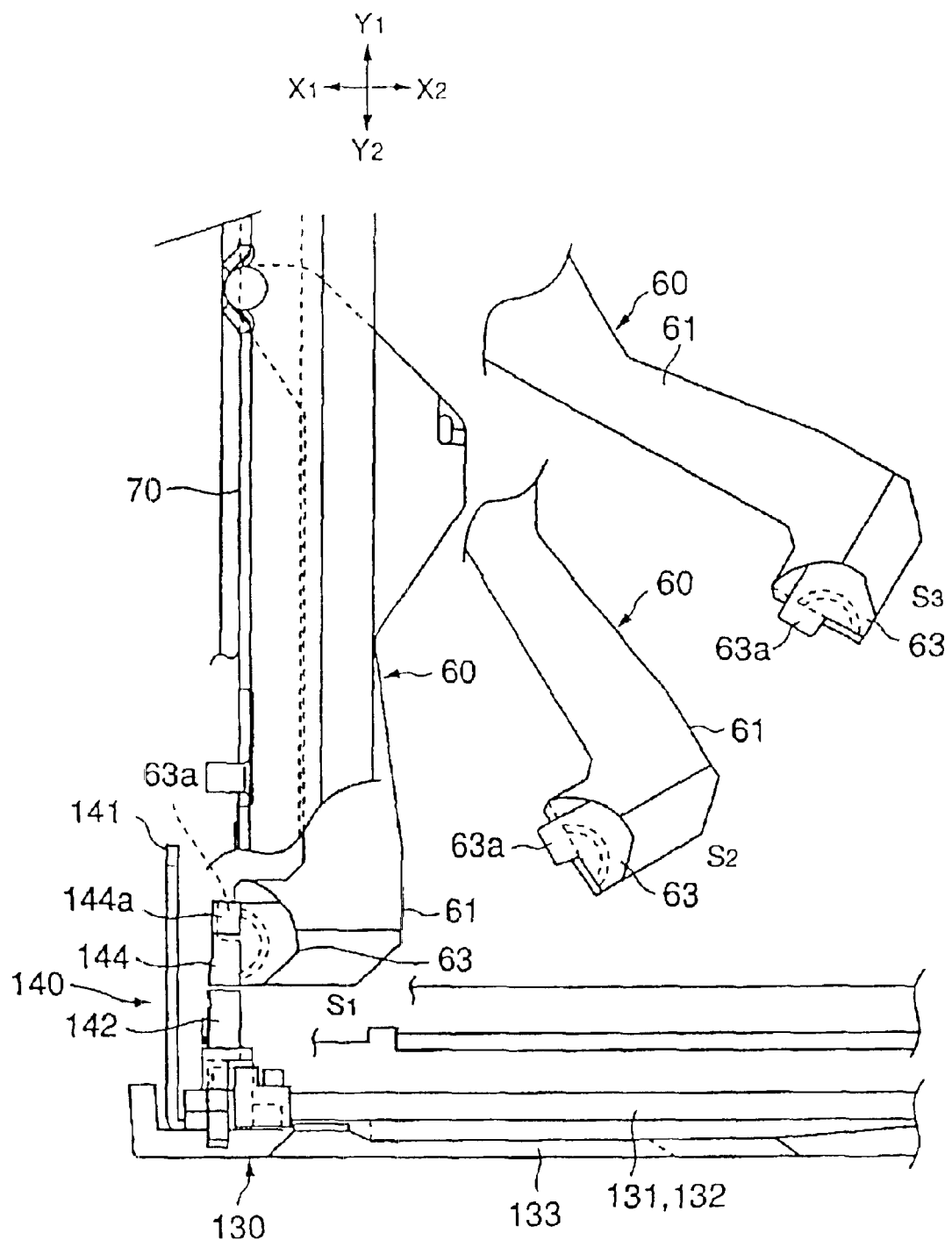
FIG. 19 is a plan view showing the operation positions of the disc lever 60 corresponding to the inserted recording medium.

FIG. 19 is a plan view showing the operation of the disc lever 60 corresponding to the inserted recording medium.

Referring to FIG. 19, when the disc lever 60 keeps being in contact with the side wall of the carrier unit 70 by the resilient force of the disc lever actuating spring 65, the disc lever 60 is at the position not blocking the inserting of the disc 11, 12 or the disc cartridge 13. Then when inserting the disc cartridge 13, the disc lever 60 will be at the position S1, same as the position before inserting the recording medium, in order to stop the side face of the cartridge 13 rotating inward at the position opposite to the disc lever 60.

After inserting the 12 cm disc 12, the disc holder 63 of the disc lever 60 is at the position S2 rotating inward.

After inserting the 8 cm disc 11, the disc holder 63 of the disc lever 60 is at the position S3 rotating inward.

In this way, the disc lever 60 has various rotating positions with different inserted recording media, and the types of the recording media can be sensed. Under the condition of loading the recording medium, when the tip protrusion 144a of the rotating member 144 is disposed above the protrusion 63a installed on the disc holder 63 of the front end of the disc lever 60, it means the disc cartridge 13 has been inserted, and when the tip protrusion 144a is not disposed above the protrusion 63a of the disc lever 60, it means the disc 11 or 12 has been inserted.

Therefore, in the disc device 10, without arranging for a switch to sense the disc cartridge 13, the doors 131, 132 can be opened/closed with respect to the existence or nonexistence of the disc cartridge 13. Therefore, the number of parts do not need to be increased, and the cost can be decreased.

In this embodiment, the disc 11 or 12 can be inserted or ejected through the slit 135 of the doors 131, 132, keeping them closed, without opening the doors 131, 132. Furthermore, when inserting the disc cartridge 13, the end portion of the inserting side of the disc cartridge 13 will press and open the doors 131, 132. On the contrary, when ejecting the disc cartridge 13, the disc cartridge 13 should be ejected after the doors 131, 132 have been opened.

Figure 20:
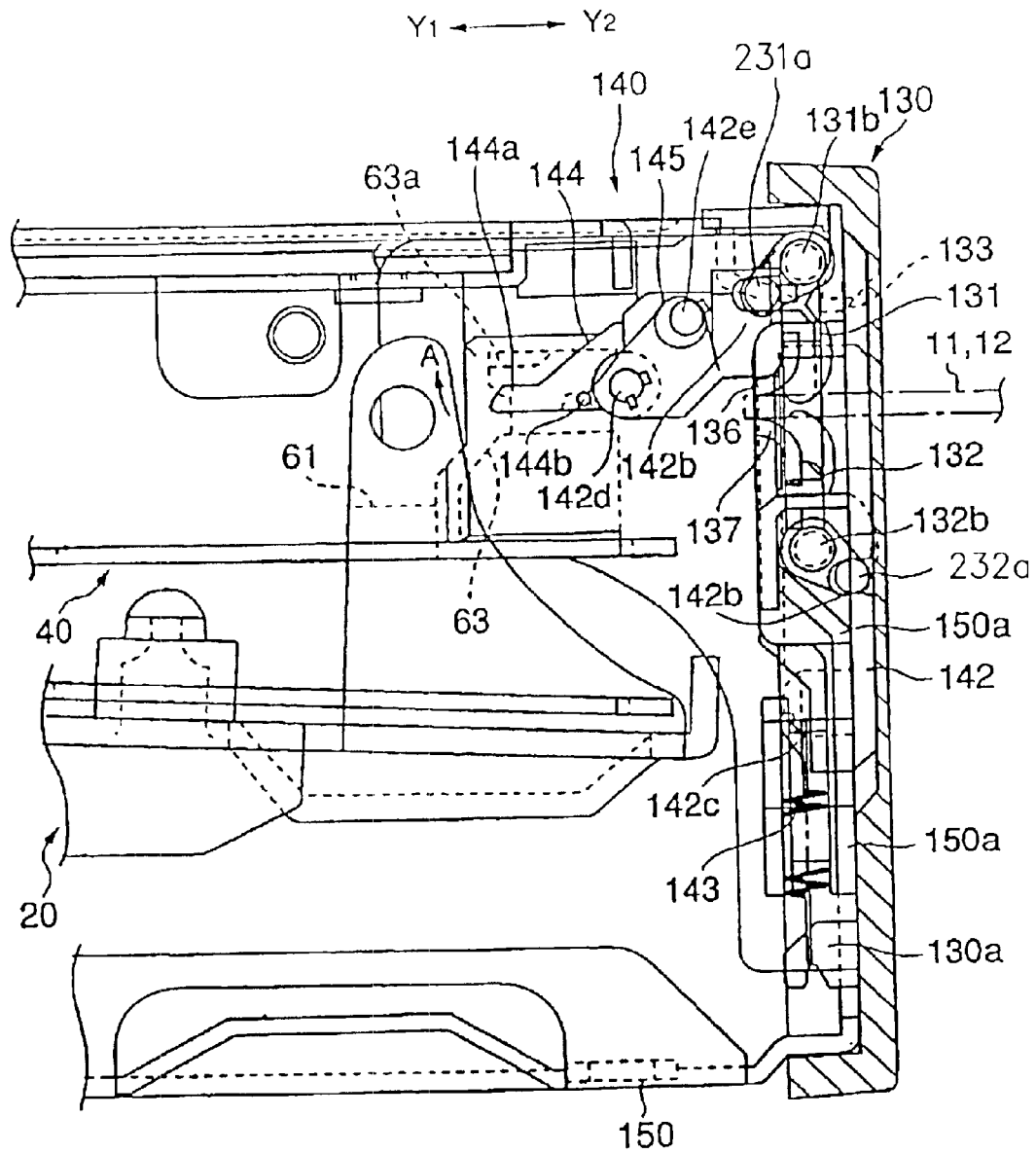
FIG. 20 is a cross-sectional view showing the door open/close driving mechanism before inserting the recording medium.

FIG. 20 is a cross-sectional view showing the operation of the door open/close driving mechanism 140 before inserting the recording medium.

Referring to FIG. 20, the protrusion 63a of the disc holder 63 of the disc lever 60, shown as the dotted line, is disposed above the rotating member 144 (the position S1 in FIG. 19). The rotating member 144 is rotated upward by the torsion spring 145, and then the side face of the rotating member 144 is in contact with the side face of the upper end of the sliding member 142, and the tip protrusion 144c protrudes in a horizontal direction.

When inserting the disc 11 or 12, the elastomers 136, 137, fixed inside the doors 131, 132, are pressed and bent inward by the circumference of the disc 11, 12. Then the disc 11, 12 is easily inserted.

When inserting the disc cartridge 13, because the doors 131, 132 are pressed in the inserting direction, the doors 131, 132 are rotated inward centered on the shafts 131b, 132b for inserting the disc cartridge 13. At this time, the acentric pins 231a, 232a of the doors 131, 132 will press upward the engaging portions 142a, 142b to move the sliding member 142 upward.

A sealed portion 150a, integrally formed with the lower base 150, hangs down inside the front bezel 130 and extends to embay the insertion hole 133. The lower base 150 serves as the earth of the disc device 10. Then when the sealed portion 150a is closer to the fingers of the operator than the front of the front bezel 130, the static electricity can escape toward the earth. For example, the static electricity can be prevented from discharging to the inside of the device through the insertion hole 133 of the front bezel 130, and the electrical parts inside the device can be protected.

Figure 21:
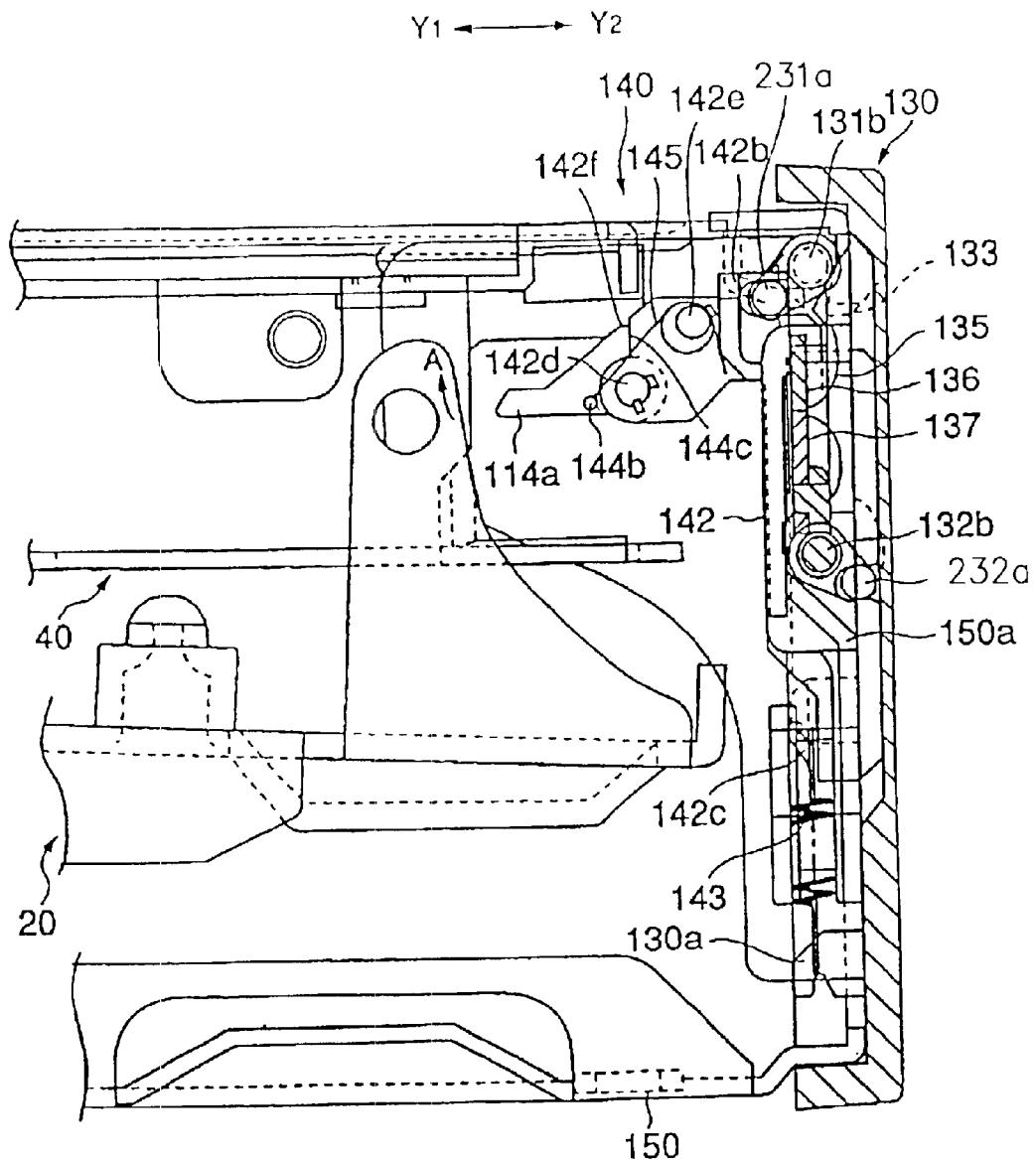
FIG. 21 is a cross-sectional view showing the operation of the door open/close driving mechanism when inserting/ejecting the disc 11, 12.

FIG. 21 is a cross-sectional view showing the operation of the door open/close driving mechanism 140 when inserting/ejecting the disc 11 or 12.

Referring to FIG. 21, when inserting/ejecting the disc 11 or 12, because the disc holder 63 of the disc lever 60 is disposed at the position holding the disc 11 or 12 (the position S2 or S3 in FIG. 19), the protrusion 63a of the disc holder 63 retrocedes from the upper and lower side of the rotating member 144, and the rotating member 144 will be rotated in direction A by the resilient force of the torsion spring 145, and the side face 144c of the rotating member 144 will be in contact with the side face 142f of the upper end of the sliding member 142.

When the sliding member 142 is actuated by the coil spring 143 and moved downward, the doors 131, 132 are kept in shuttered positions. However, the circumference of the disc 11 or 12 is pressed and fixed onto the elastomers 136, 137 inside the doors 131, 132, and the disc 11 or 12 can easily be inserted or ejected.

Figure 22:
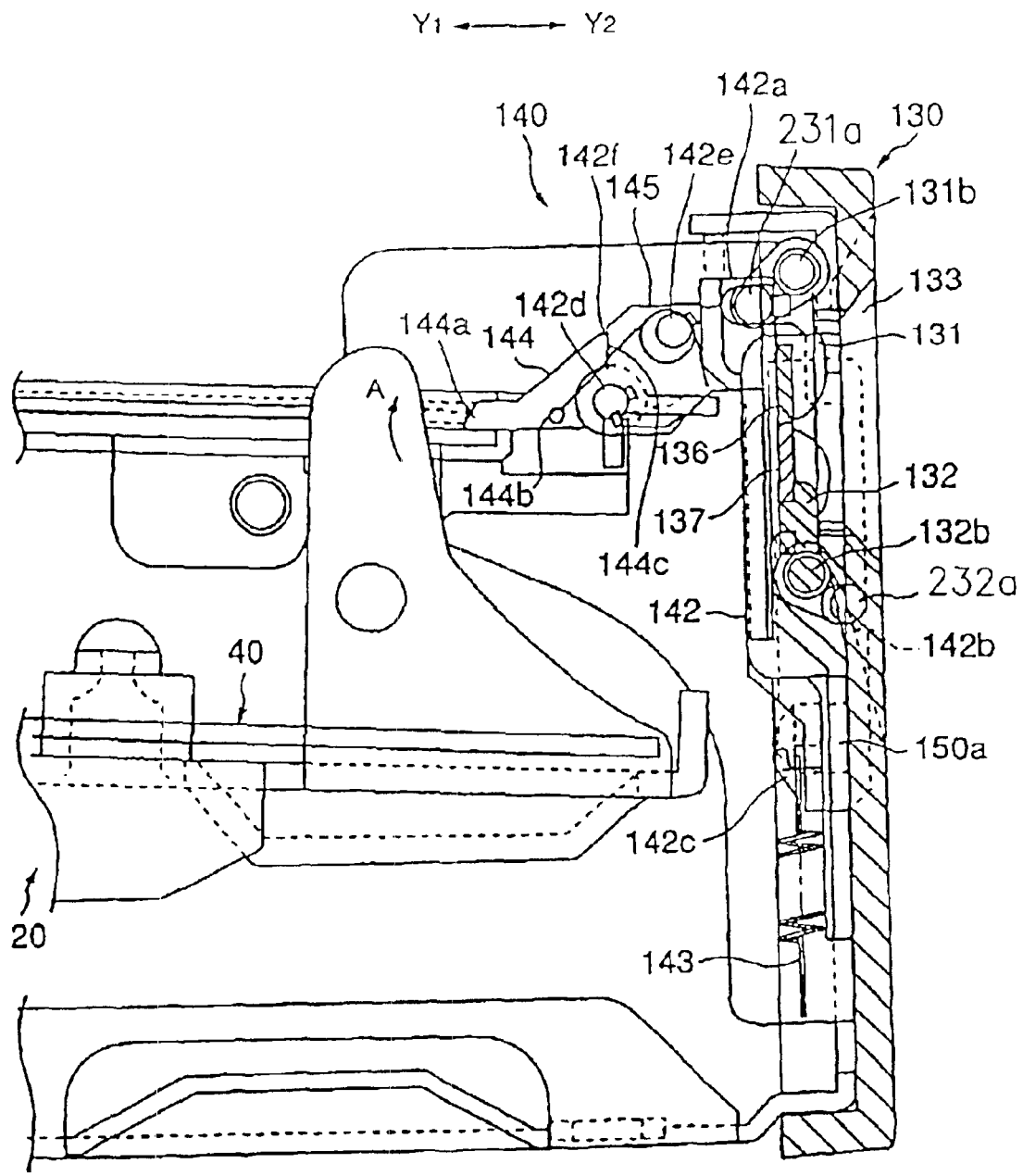
FIG. 22 is a cross-sectional view showing the operation of the disc 11, 12 being loaded into the disc device by carrier unit 70.

FIG. 22 is a cross-sectional view showing when the disc 11 or 12 is loaded into the device by the transporting carrier unit 70.

Referring to FIG. 22, with this loading operation, the holder 40 will descend on the base 20, carrying the turntable 24 and the pick up 26. At this time, same as FIG. 21, the disc holder 63 of the disc lever 60 is positioned separating from the rotating member 144, supporting the disc 11 or 12, and descends, while the rotating member 144 rotates upward by the resilient force of the torsion spring 145 and is in contact with the sliding member 142. Therefore, the sliding member 142 rotates in direction A, and the side face 144c of the rotating member 144 is in contact with the side face 142f of the upper end of the sliding member 142. The sliding member 142 is actuated downward by the coil spring 143 and then moves downward, and the doors 131, 132 keep in shuttered positions.

Figure 23:
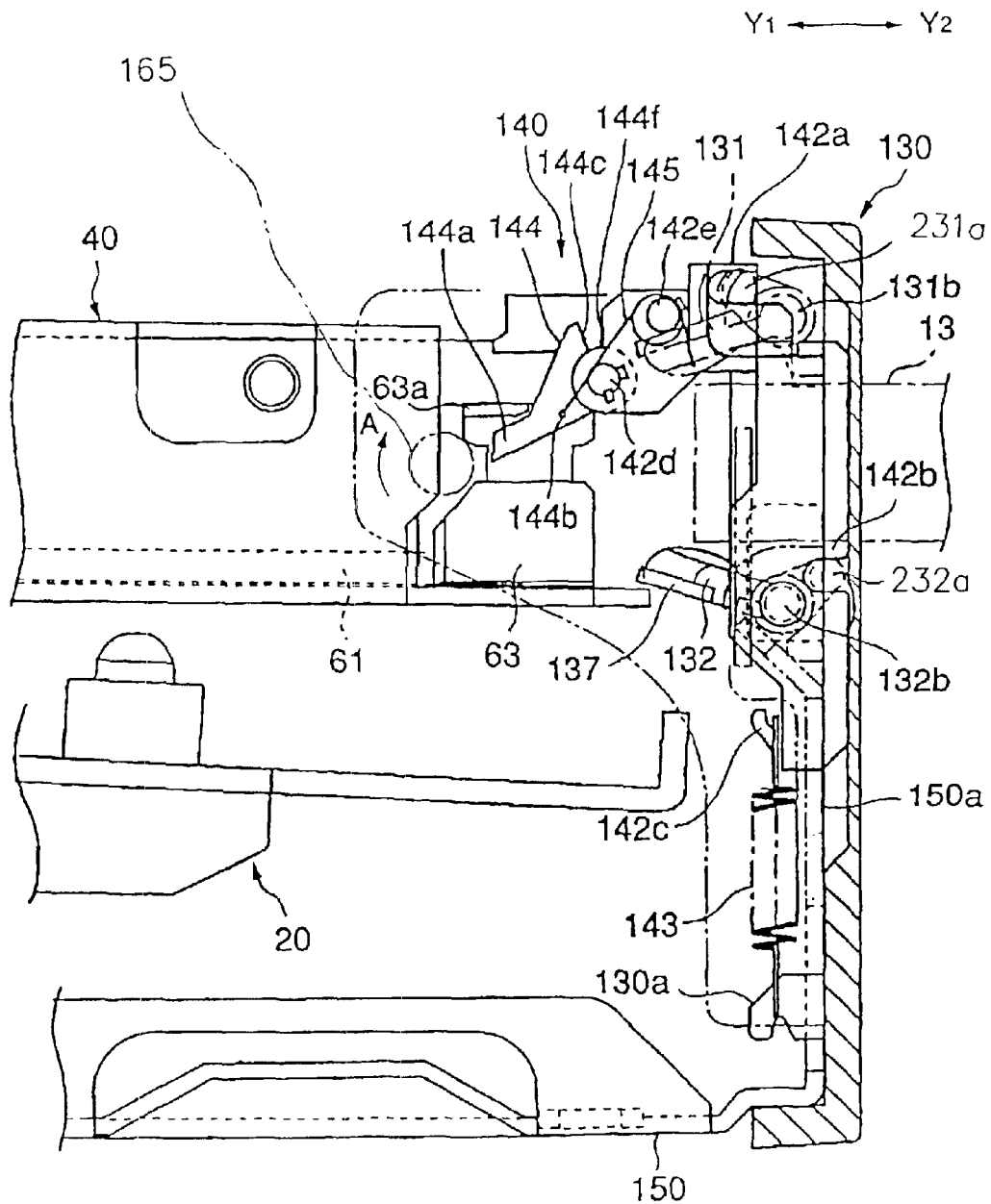
FIG. 23 is a cross-sectional view showing the operation of inserting the disc cartridge 13.

FIG. 23 is a cross-sectional view showing the condition of inserting the disc cartridge 13.

Referring to FIG. 23, when inserting the disc cartridge 13, the side in the inserting direction of the disc cartridge 13 will press the doors 131, 132 in the inserting direction, then the doors 131, 132 will rotate inward centered on the shaft 131b, 132b. In this way, the disc cartridge 13 can easily be inserted. At this time, the acentric pins 231a, 232a of the doors 131, 132 will press upward the engaging portions 142a, 142b of the sliding member 142. Therefore, the sliding member 142 moves upward followed with the doors 131, 132 opening.

When inserting the disc cartridge 13, the sliding member 142 will move upward, and the tip protrusion 144a of the rotating member 144, supported by the sliding member 142, will be in contact with the protrusion 63a of the disc lever 60, and the tip protrusion 144a inclines downward as the sliding member 142 moves upward.

Figure 24:
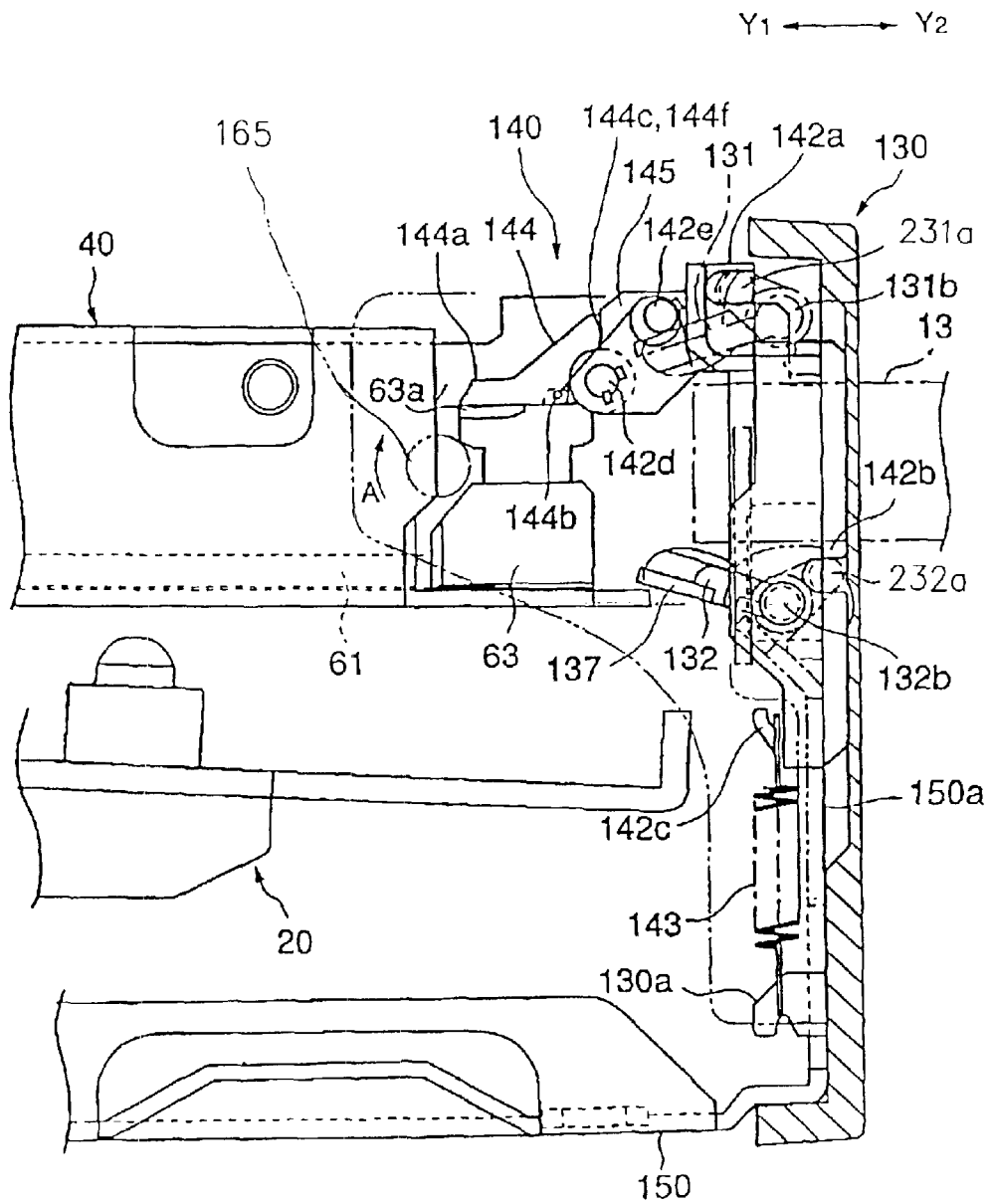
FIG. 24 is a cross-sectional view showing the operation of ejecting (discharging) the disc cartridge 13.

FIG. 24 is a cross-sectional view showing the condition of ejecting (discharging) the disc cartridge 13.

Referring to FIG. 24, when ejecting (discharging) the disc cartridge 13, the disc lever 60 is positioned at the position S1, and the protrusion 63a of the disc lever 60 is positioned under the tip protrusion 144a.

When the holder 40, inserted with the disc cartridge 13, rises from the down-motion position, shown in FIG. 4B, to the up-motion position, shown in FIG. 4A, the protrusion 63a of the disc lever 60 will press the tip protrusion 144a of the rotating member 144, and the sliding member 142, supporting the rotating member 144, will move upward. In this way, the doors 131, 132 will rotate inward centered on the shaft 131b, 132b. Then the insertion hole 133 on the front bezel 130 will be opened.

Figure 25:
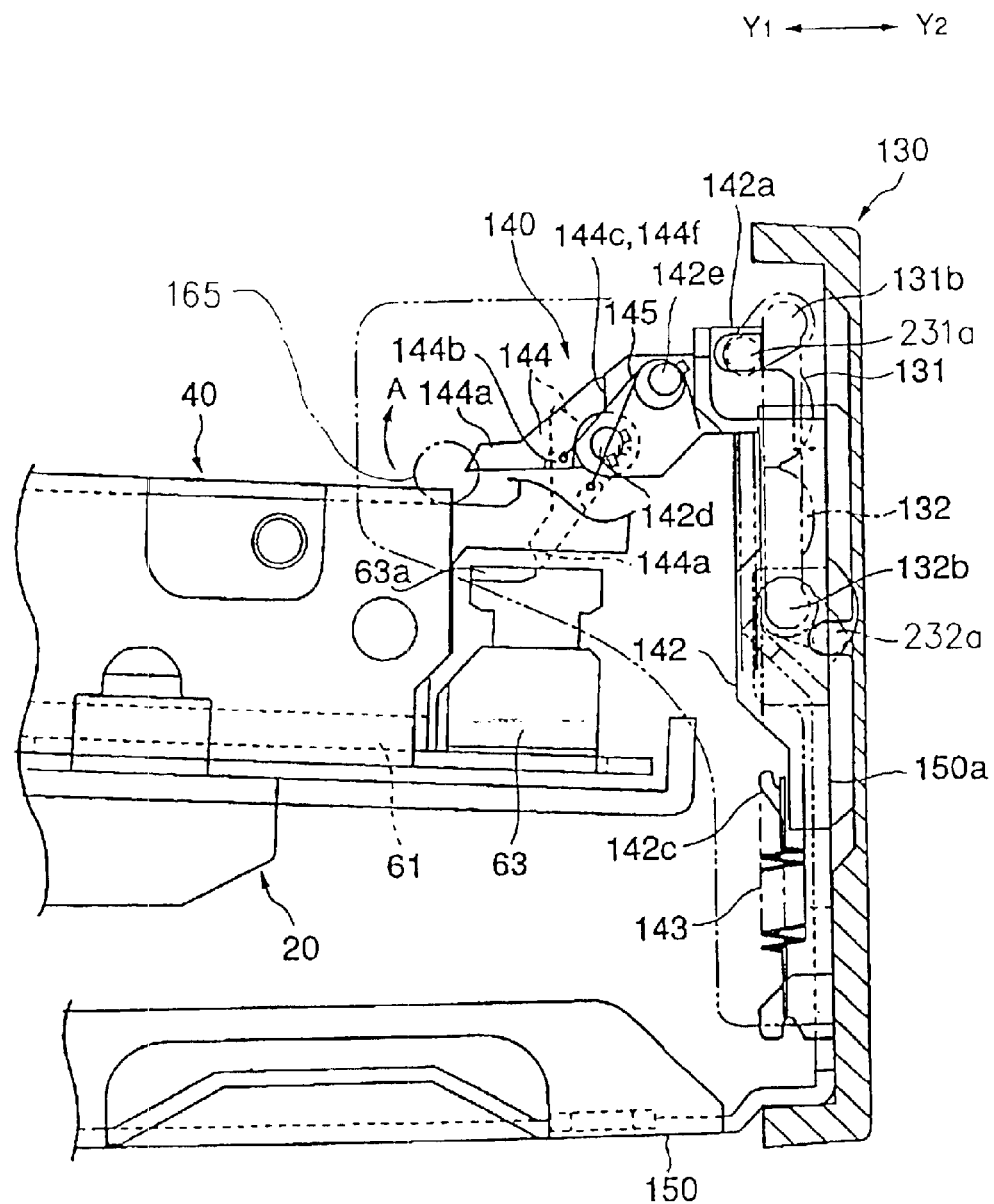
FIG. 25 is a cross-sectional view showing the operation of the disc cartridge 13 being loaded into the disc device by the carrier unit 70.

FIG. 25 is a cross-sectional view showing the operation of the carrier unit 70 when loading the disc cartridge 13.

Referring to FIG. 25, same as FIG. 22, the holder 40 will descend on the base 20 (referring to FIG. 4B), carrying the turntable 24 and the pick up 26, by a loading operation. Same as FIG. 22, the disc holder 63 of disc lever 60 is positioned opposite to the side face of the disc cartridge 13 (the position S1 in FIG. 19). However, the disc holder 63 is positioned lower than it is when ejecting, and the protrusion 63a will press the tip protrusion 144a of the rotating member 144 downward. Then once the rotating member 144, shown in FIG. 23, resists the resilient force of the torsion spring 145 and inclines downward, the tip protrusion 144a of the rotating member 144 will separate from the protrusion 63a of the disc lever 60 and will return upward by the resilient force of the torsion spring 145.

When the sliding member 142 is actuated and moved downward, the doors 131, 132 are kept in shuttered positions.

Then after loading the disc cartridge 13, when the ejecting is performed by an operator, the ejecting operation is shown as FIG. 24. By rising of the holder 40, inserted with the disc cartridge 13 (referring to FIG. 4A), the protrusion 63a of the disc holder 63 of the disc lever 60, which contacts the side face of the disc cartridge 13, will be in contact with the tip protrusion 144a shown in FIG. 24 and will press the tip protrusion 144a of the rotating member 144 upward.

At this time, the rotating member 144 will rotate upward by the resilient force of the torsion spring 145, and the side face 144c of the rotating member 144c will be in contact with the side face 142f of the sliding member 142. In this way, the rotating member 142 rotates being limited by the side face 142f of the upper end of the sliding member 142. Therefore, the rising motion of the holder 40 can be transported by the disc holder 63 of the disc lever 60, and the sliding member 142 will move upward together with the rising motion of the holder 40.

In this way, by the rising motion of the sliding member 142, the engaging portions 142a, 142b, engaged with the acentric pins 231a, 232a, will press upward the acentric pins 231a, 232a and open the doors 131, 132 (referring to FIG. 24).

Therefore, the doors 131, 132 will be opened with the rising motion of the holder 40, inserted with the disc cartridge 13, and the insertion hole 133 will be opened before the disc cartridge 13 is ejected by the carrier unit 70. Then the disc cartridge 13 will be ejected from the insertion hole 133 without being blocked. Therefore, no matter what type or shape the recording medium is (a disc using only or a disc cartridge using only for instance), a recording medium loading device of slot-in type can be applied by the disc device 10.

Then the operation of the disc device 10 with the structure as described above will be explained as follows.

FIG. 2 shows the condition of the disc device 10 when not yet inserting the disc 11, 12 or the disc cartridge 13. At this time, the carrier unit 70 moves only in the Y2 direction in FIG. 2 (the eject position P1, hereinafter).

When the carrier unit 70 is positioned at the eject position P1 (referring to FIG. 2), the lever body 61 of the disc lever 60, shown in FIG. 11A, will be in contact with the graded cam N1 formed inside the carrier unit 70. In this way, the disc lever 60 will resist the resilient force of the disc lever actuating spring 65, and the disc holder 63 will retrocede to a position not blocking the carrier unit 70 from moving.

Then the cartridge lever 77 will move inside the cartridge lever guide grooves 103, 104 through the shaft 105 and can be displaced in the Y1, Y2 directions with respect to the carrier unit 70. Then the disc lever 77 will be actuated in the Y2 direction by the cartridge lever actuating spring 108.

When the carrier unit 70 is positioned at the eject position P1, the fixing claw 106, formed on the cartridge lever 77, will be engaged to the cartridge lever retroceding cam 54, installed on the right rail 50. Then when the carrier unit 70 moves to the eject position P1, the shaft 105 will be positioned in the Y1 direction in the cartridge lever guide grooves 103, 104.

An inclined face is formed on the cartridge lever retroceding cam 54, and the fixing claw 106 of the cartridge lever 77 will be engaged to the incline face. Then when the cartridge lever 77 is pressed by the incline face, and when the fixing claw 106 is pressed by the inclined face due to the resilient force of the cartridge lever actuating spring 108, the fixing claw 106 will displace along the incline face. In this way, the cartridge lever 77 will rotate slightly counterclockwise centered on the shaft 105.

A cover N2 (partially shown in FIG. 2) is set outside the cartridge lever 77 (the side of X2 direction). Therefore, the cartridge lever 77 will be further limited to rotate counterclockwise by the outer face of the cartridge lever 77 being in contact with the cover N2.

Now, focus on the position of the cartridge lever 77 with respect to the carrier unit 70 when the carrier unit 70 is at the eject position P1 (referring to FIG. 2). As described above, when the carrier unit 70 is at the eject position P1, the shaft 105 is restrictively located within the cartridge lever guide grooves 103, 104 in the arrow Y1 direction because the cartridge lever 77 is in contact with the cartridge lever retroceding cam 54 and the cover N2. Therefore, the cartridge lever 77 is also displaced in the arrow Y1 direction with respect to the carrier unit 70. As a result, even though the carrier unit 70 is at the eject position P1 (referring to FIG. 2), the cartridge lever 77 doesn't protrude from the front surface 89 of the carrier unit 70 in the arrow Y2 direction.

For a disc device using a conventional tray, the tray extends forward from the disc device in the ejecting status, increasing the installation space and resulting in tray damage. However, according to the disc device 10 of the invention, even if in the ejecting status, it never protrudes from the front of the disc device 10. Therefore, when the disc device 10 is installed, the installation space can be saved and occurrence of malfunction can be avoided.

On the other hand, the shutter lever 78 is at a position guided in the slit 126 (omitted in FIG. 2) formed on the base cover 120 and rotated clockwise. In this status, the shutter driving pin 113 is located at the starting engaging position that starts to be engaged with the shutter 15 formed on the disc cartridge 13.

As shown in FIG. 4A, when the carrier unit 70 is at the eject position P1, the holder 40 moves to the moving-up position. When the holder 40 is at the moving-up position, the carrier unit 70 faces to the insertion opening 133 of the front bezel 130, allowing the insertion of the discs 11, 12 and the disc cartridge 13.

The recording medium double inserting preventing mechanism 160 for preventing other recording medium from being inserted under the condition of the disc cartridge 13 being loaded inside the device will be explained as follows.

Figure 27:
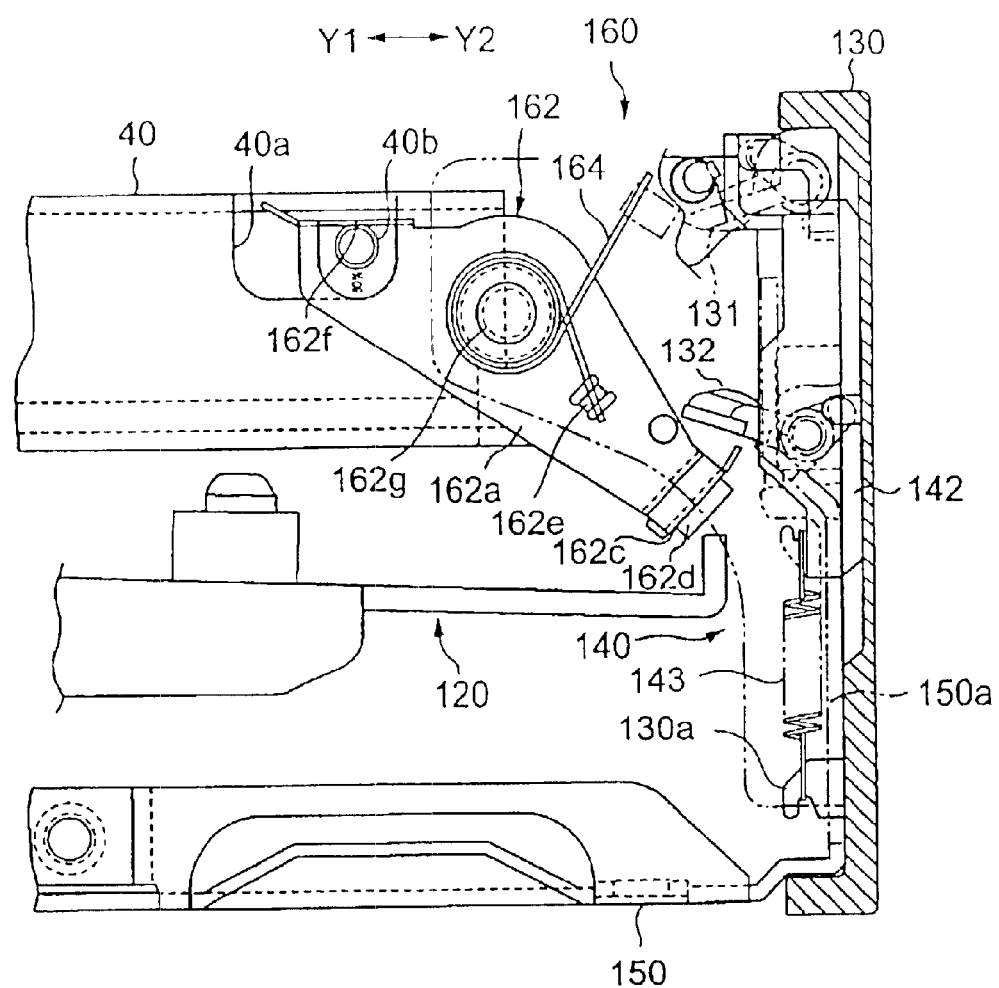
FIG. 27 is a cross-sectional left view showing the recording medium double-inserting preventing mechanism.
Figure 28:
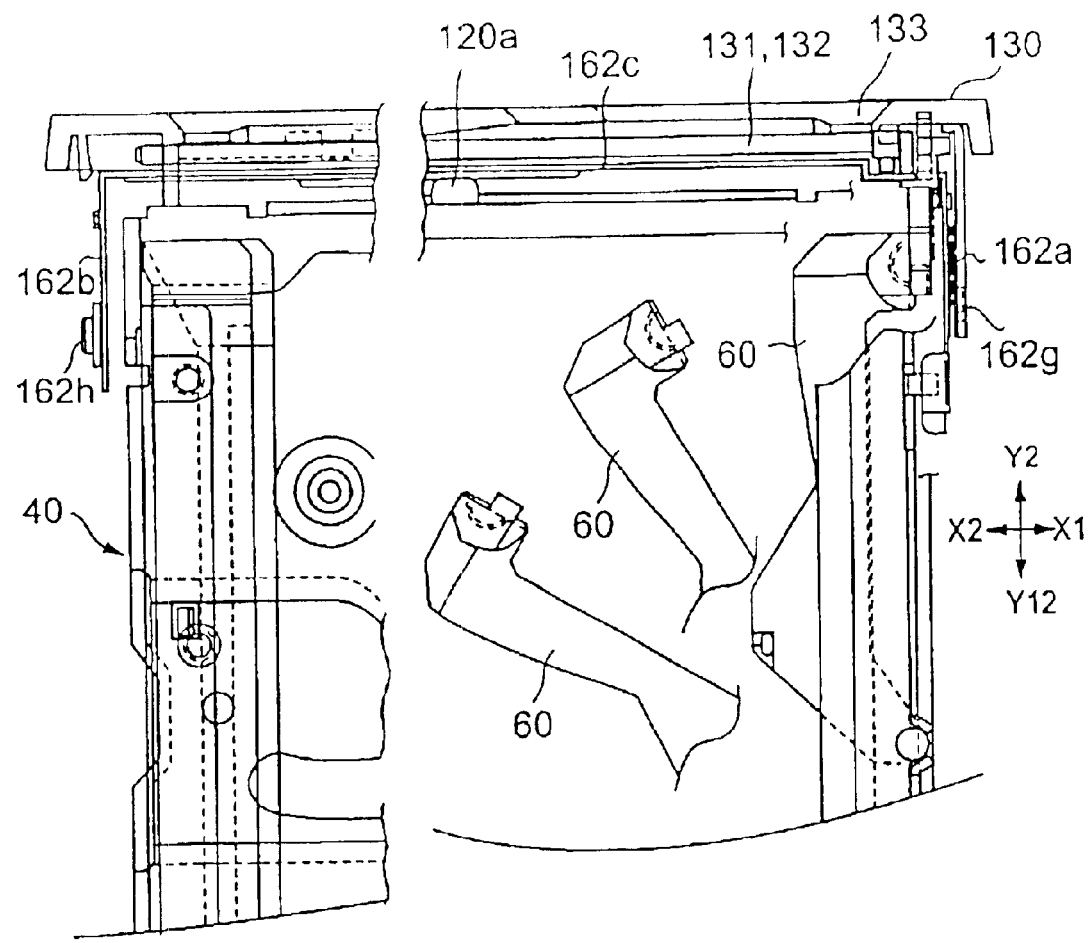
FIG. 28 is a plan view showing the recording medium double-inserting preventing mechanism 160.

FIGS. 26A~26E show the structures of the recording medium double inserting preventing mechanism 160, wherein the FIG. 26A is a plan view, FIG. 26B is a front view, FIG. 26C is a left side view, FIG. 26D is a left side view under retroceding condition and FIG. 26E is a right side view. FIG. 27 is a cross-sectional left view showing the recording medium double inserting preventing mechanism 160. FIG. 28 is a plan view showing the recording medium double inserting mechanism 160.

Referring to FIGS. 26A to 26E, FIG. 27 and FIG. 28, the recording medium double inserting preventing mechanism 160 comprises a recording medium double inserting preventing member 162 and a torsion spring 164. The recording medium double inserting preventing member 162 is rotatably set on the entrance of the holder 40 opposite to the insertion hole 133. The torsion spring 164 actuates the recording medium double inserting preventing member 162 toward a shuttered position.

The recording medium double inserting preventing member 162 comprises: a wrist pair 162a, 162b, shafts 162g, 162h, protruding sideward from the wrist pair 162a, 162b and are rotatably supported on the bracket 165, a crossing portion 162c, crossing between the wrist pair 162a, 162b, a felt 162d, adhered onto the surface of the crossing portion 162c, a spring hook 162e, hanging on one end of the torsion spring 164, and an engaging portion 162f, engaged to the protrusion 40b, which protrudes toward the concave 40a of the side of the holder 40, from the wrist 162a.

When the holder 40 rises to the inserting/ejecting position opposite to the height of the insertion hole 133, the crossing portion 162c of the recording medium double inserting preventing member 162 rotates toward the bottom of the holder 40 to retrocede, and the holder 40 accordingly descends toward the loading position of the recording medium, and the crossing portion 162c will rotate toward the shuttered position opposite to the insertion hole 133. In this way, the doors 131, 132, opening/closing the insertion hole 133, will face to the crossing portion 162c of the recording medium double inserting preventing mechanism 162 and will be stopped from opening inward, and the shuttered condition of the insertion hole 133 will be kept.

Therefore, under the condition of the recording medium being already loaded inside the device, since the doors 131, 132 are in contact with the crossing portion 162c of the recording medium double inserting preventing member 162 and cannot open inward, even though other recording medium is inserted toward the insertion hole 133, the other recording medium can be prevented from being double inserted.

Therefore, under the condition of the recording medium being inserted into the device, even though the 8 cm disc 11 or the 12 cm disc 12 is inserted into the insertion hole 133, the recording medium can be prevented from being double inserted by the front end of the disc being in contact with the felt 162d.

A door open/close driving mechanism 140 for driving the doors 131, 132 to open/close the insertion hole 133 is set on the back side of the front bezel 130. When operating the ejecting of the disc cartridge 13, the door open/close driving mechanism 140 will move together with the rising of the holder 40 before the carrier unit 70 moving in the Y2 direction, and then the doors 131, 132 will be moved to the open position. In this way, the disc cartridge 13 loaded inside of the device can be ejected smoothly.

Figure 29:
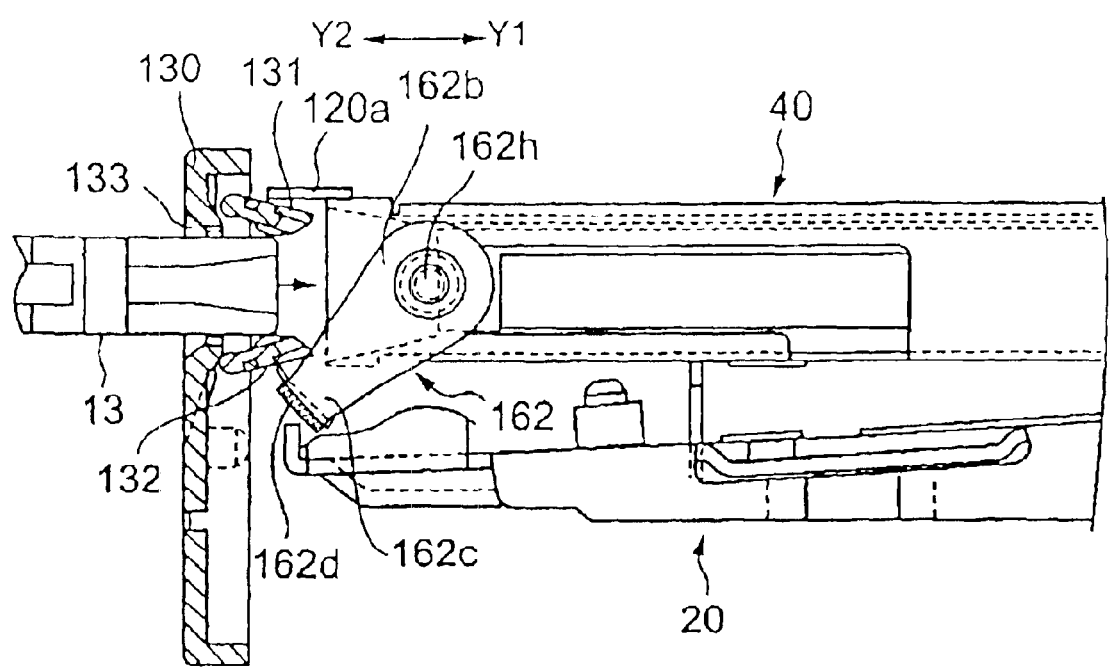
FIG. 29 is a cross-sectional right view showing the operation when inserting the disc cartridge 13.

FIG. 29 is a cross-sectional right view showing the operation when inserting the cartridge.

Referring to FIG. 29, when the holder 40 rises to the inserting/ejecting position, the engaging portion 162f of the recording medium double inserting preventing member 162 will be pressed upward by the protrusion 40b (referring to FIG. 27) at side of the holder 40, and the crossing portion 162c will descend toward the bottom of the holder 40. Therefore, the crossing portion 162c of the recording medium double inserting preventing member 162 will separate from the inside of the doors 131, 132 without obstructing opening the doors 131, 132. Therefore, before inserting the recording medium, the entrance of the holder 40 will rise to the height position (inserting/ejecting position) opposite to the insertion hole 133, and the crossing portion 162c of the recording medium double inserting preventing member 162 will descend downward and separate from the doors 131, 132, and the recording medium is able to be inserted.

When the disc cartridge 13 is inserted into the insertion hole 133, the doors 131, 132 will be pressed inward and rotate in the opening direction. Furthermore, the disc cartridge 13, pressed in the inserting direction, will pass the insertion hole 133 and be inserted onto the holder 40.

Therefore, when the slide motor is driven from the status of the disc device 10 shown in FIG. 3 (also shown in FIG. 4A), and the holder driving slider 30 is moved along the arrow direction of X1 in FIG. 3, the driven pin 47 is moved relatively downward within the tilted cam 32 and the driven pin 48 is also moved relatively downward within the tilted cam 33. Accordingly, the holder 40 having the hanging portion 46 installed thereon is swung counterclockwise centered on the rotational shaft 57 with respect to FIG. 4B. Then, the driven pins 47, 48 reach the lower ends of the tilted cams 32, 33, and the holder 40 is in contact with the base 20 as shown in FIG. 4B.

Figure 30:
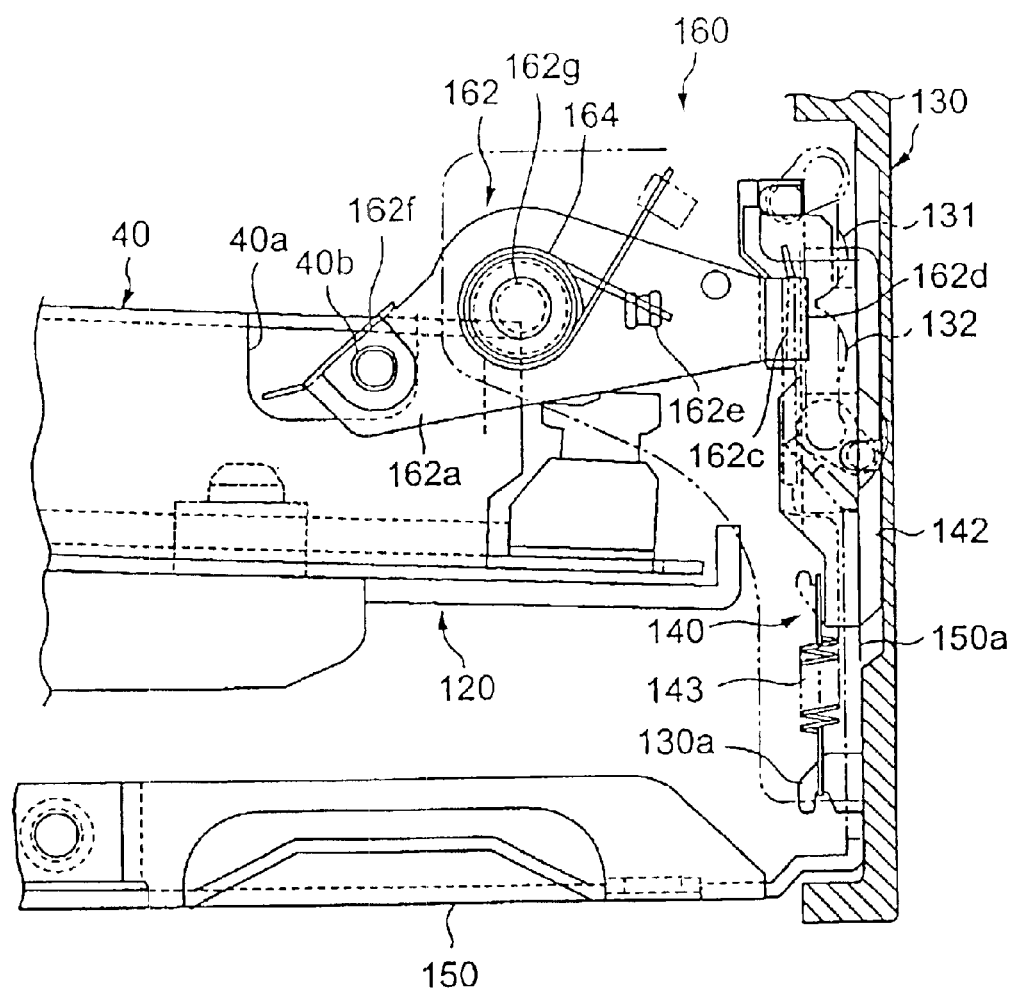
FIG. 30 is a cross-sectional left view showing the operation when loading the recording medium.
Figure 31:
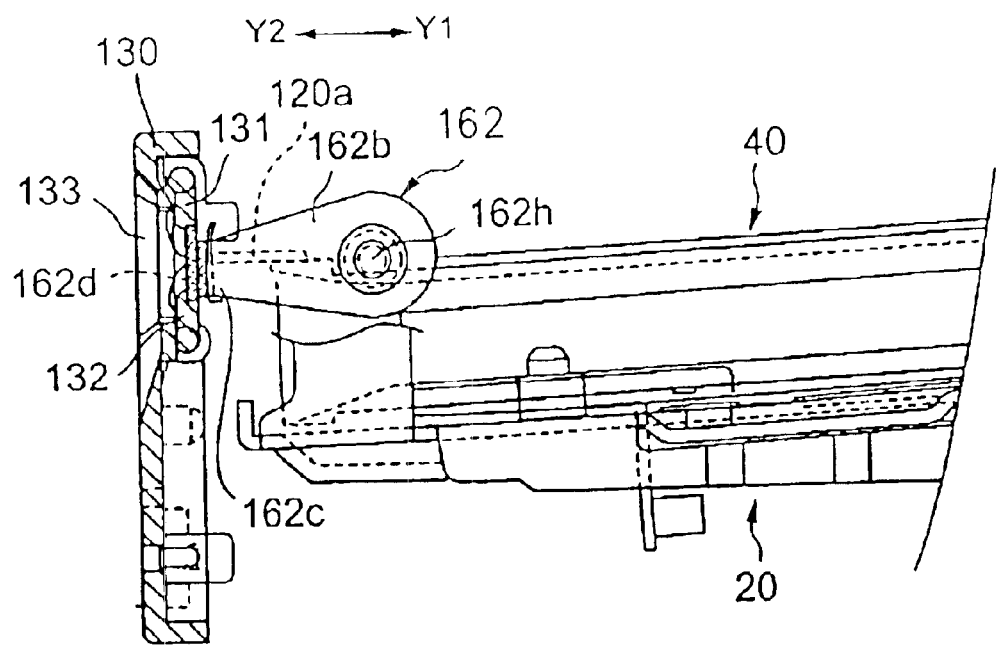
FIG. 31 is a cross-sectional right view showing the operation when loading the recording medium.

FIG. 30 is a cross-sectional left view showing the operation when loading the recording medium. FIG. 31 is a cross-sectional right view showing the operation when loading the recording medium.

Referring to FIGS. 30 and 31, following the descending of the entrance of the holder 40, because the protrusion 40b at the side of the holder 40 is separate from the engaging portion 162f, the recording medium double inserting preventing member 162 will rotate the crossing portion 162c in the rising direction centered on the shafts 162g, 162h by the resilient force of the torsion spring 164. In this way, the crossing portion 162c will move upward to the position opposite to the inside of the doors 131, 132.

Like this, the recording medium double inserting preventing member 162 will move together with the holder 40 descending toward the loading position of the recording medium, and the crossing portion 162c will rotate toward stopping the doors 131, 132 from opening. In this way, the doors 131, 132, open/close the insertion hole 133, will be opposite to the crossing portion 162c and will be stopped from opening inward, and then the shuttered condition of the insertion hole 133 will be maintained.

Therefore, under the condition of loading the recording medium, even inserting other disc cartridge 13 into the insertion hole 133, the doors 131, 132 will be in contact with the crossing portion 162c of the recording medium double inserting preventing member 162, and the doors 131, 132 cannot open inward, thus the disc cartridge is prevented from being double inserted. At this time, the doors 131, 132 will be in contact with the felt 162d adhered onto the front side of the crossing portion 162c. Therefore, even double inserting the disc cartridge 13, damage of the doors 131, 132 can be prevented.

Additionally, even inserting the disc 11, 12 into the slit 135 between the doors 131 and 132, under the condition of already loading the recording medium, the crossing portion 162c of the recording medium double inserting preventing member 162 is opposite to the slit 135, then the disc 11 or 12 can be stopped from being inserted. At this time, the circumference of the disc 11, 12 will be in contact with the felt 162d adhered onto the front side of the crossing portion 162c, and the impedence can be reduced.

As the crossing portion 162c moves upward at the position opposite to the inside of the doors 131, 132, the stopper 120a (referring to FIGS. 29 and 31), protruding forward (Y2 direction) from the central region of the front end of the base cover 120, will close to the inside of the crossing portion 162c. Thus, the crossing portion 162c will generally not be in contact with the front end of the stopper 120a. However, when the disc cartridge 13 has been double inserted, the doors 131, 132 will be in contact with the crossing portion 162c and will be stopped from opening. At this time, if continuously inserting the disc cartridge 13, the crossing portion 162c will be pressed and bent inward.

The crossing portion 162c will be in contact with the stopper 120a, protruding from the base cover 120, only when the crossing portion 162c is bent in order to prevent the crossing portion 162c from deforming inward above the stopper 120a. Therefore, even if the operator doesn't notice that the recording medium has been loaded and then still inserts the disc cartridge 13 or disc 11, 12, the double inserting can be prevented. Then the crossing portion 162c can be prevented from big deformation, and the reliability of the recording medium double inserting preventing mechanism 160 can be increased.

Moreover, as the slide motor is driven from the status shown in FIG. 4B, and the holder driving slider 30 is moved along the arrow direction of X2 in FIG. 3, the driven pins 47, 48 are moved relatively upward within the corresponding tilted cams 32, 33. As a result, the holder 40 is swung clockwise centered on the rotational shaft 57 with respect to FIGS. 4A/4B. Then, the driven pins 47, 48 reach the upper ends of the tilted cams 32, 33, and the holder 40 is separated from the base 20 as shown in FIGS. 3 and 4A.

Referring to FIG. 27 and FIG. 29, when the holder 40 rises to the inserting/ejecting position, the engaging portion 162f of the recording medium double inserting preventing member 162 will be pressed upward by the protrusion 40b of the holder 40, then the crossing portion 162c will descend to the bottom of the holder 40. Therefore, the crossing portion 162c of the recording medium double inserting preventing mechanism 162 will rotate downward, separate from the inside of the doors 131, 132 without obstructing the doors 131, 132 opening.

Under this condition, the disc cartridge 13 or disc 11, 12 inside the holder 40 can be ejected from the insertion hole 133 by the carrier unit 70 moving in the Y2 direction.

In the disc device 10 under ejecting condition, when inserting disc 11, 12 or disc cartridge 13, the disc device 10 starts the transporting operation. The transporting operations of the 8 cm disc 11, 12 cm disc 12 and the disc cartridge 13 will be explained respectively as follows.

Figure 32:
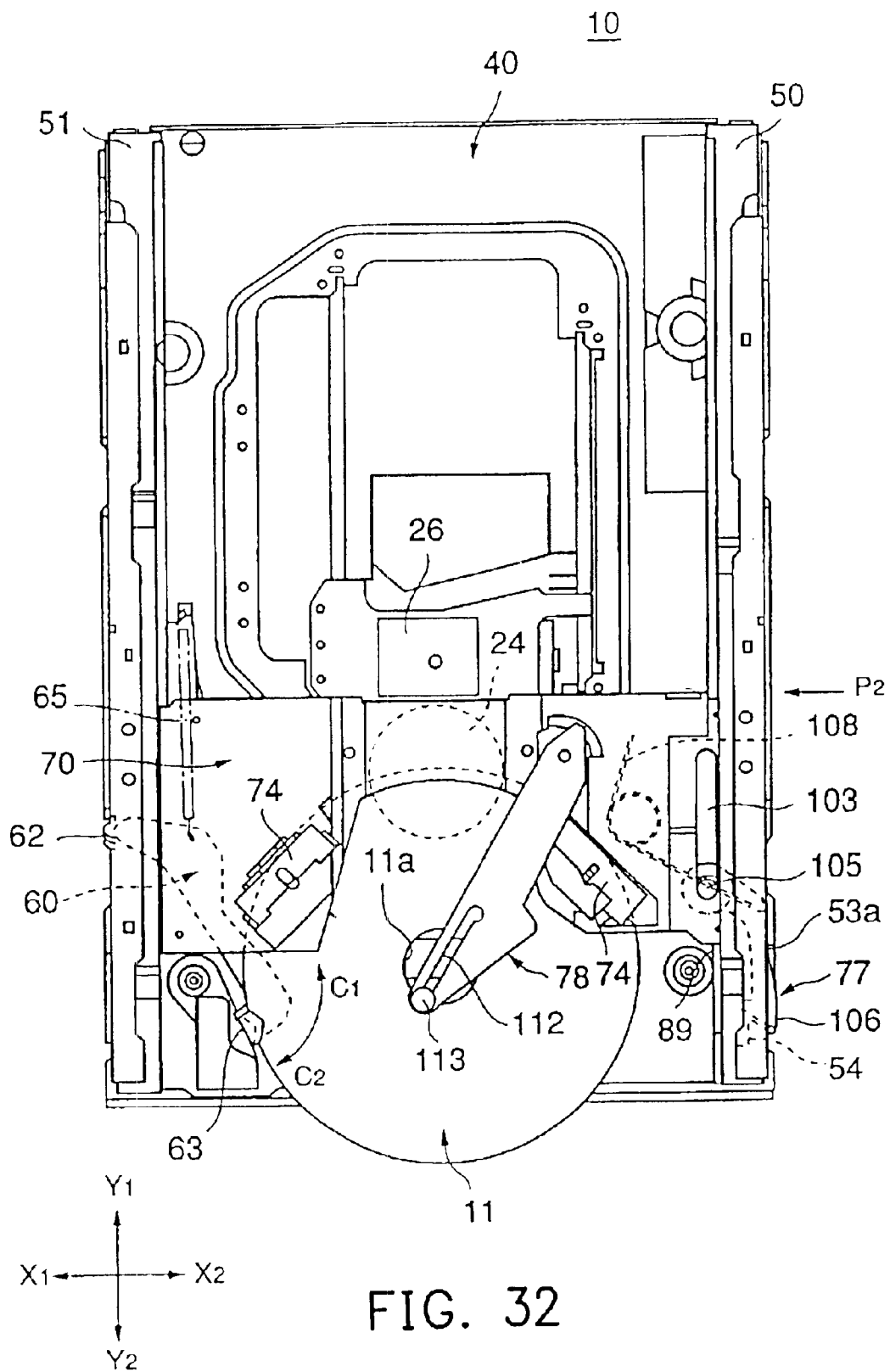
FIG. 32 is a view showing the condition of inserting the 8 cm disc to the loading starting position according to one embodiment of the present invention.
Figure 33:
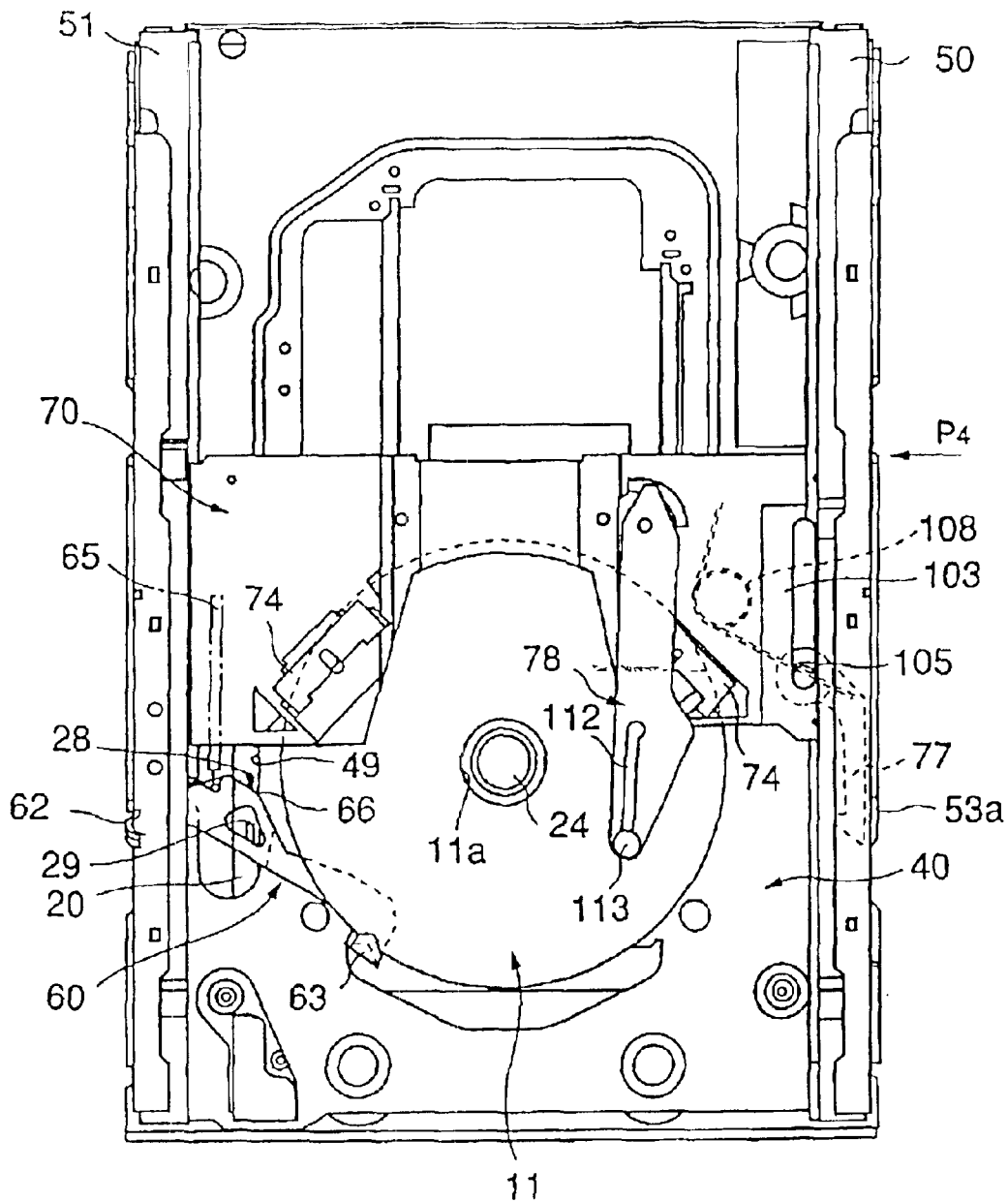
FIG. 33 is a view showing the condition of inserting the 8 cm disc to the loading finish position according to one embodiment of the present invention.

First, FIGS. 32 to 34 explain the transporting operation when inserting the 8 cm disc 11 into the disc device 10.

In the ejecting status of the disc device 10 shown in FIG. 2, as the 8 cm disc 11 is inserted to the carrier unit 70 through the front bezel 130, the 8 cm disc 11 is guided to the disc facing surface 93 and moved in the arrow Y1 direction. Then, referring to FIGS. 7A, 7B, 8A, 8B, 9A and 9B, the 8 cm disc 11 is in contact with the 8 cm-disc curve wall 94 and held by the 8 cm disc tongue piece 86 (the clip disc 74-1~74-4).

In addition, the 8 cm disc detecting switch 96 is operated due to the press of the 8 cm disc 11 by means of the 8 cm disc 11 being in contact with the 8 cm-disc curve wall 94. Thereby, the control device can detect that the 8 cm disc 11 is held by the carrier unit 70.

When the status that the 8 cm disc 11 is held on the carrier unit 70 is detected, the control device begins to apply a voltage to the loading motor 100, and thereby the gear 102 is rotated through the gear group 101. At this time, during which the carrier unit 70 moves from the position shown in FIG. 2 to a predetermined distance in the arrow Y1 direction, the control device executes a control such that the driving voltage applied to the loading motor 100 is about half (E/2) of the normal driving voltage (E volts).

Figure 26:
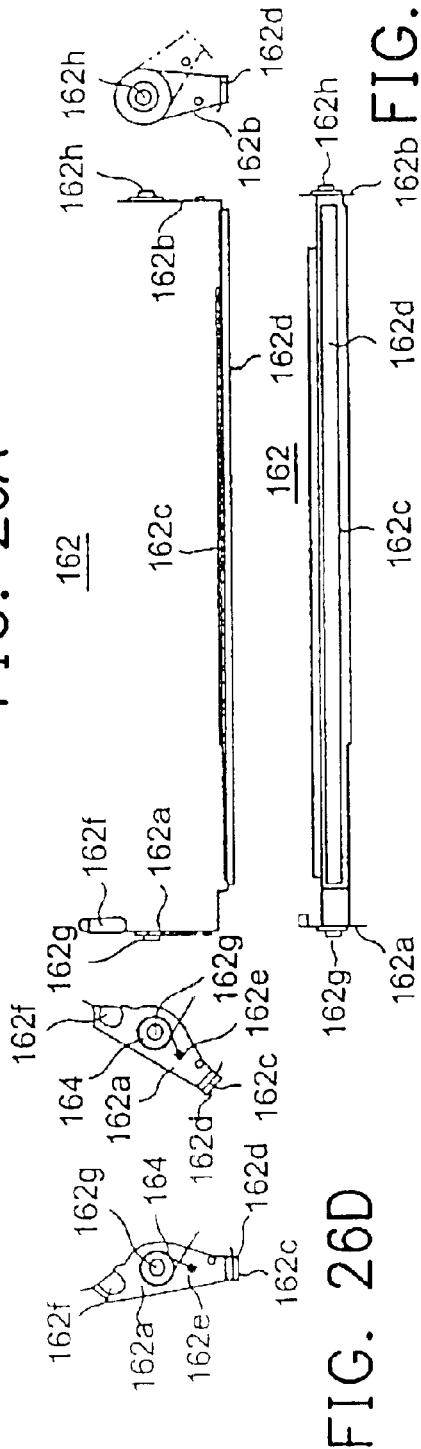

Concretely, during the time the carrier unit 70 moves from the eject position P1 shown in FIG. 2 to the position shown in FIG. 26, a voltage of about half (E/2) of the normal driving voltage (E) is applied to the loading motor 100. In addition, the 8 cm disc loading start position (8L start position for short) is referred to as the position of the carrier unit 70 in FIG. 25, which is further indicated by P2 in FIG. 25.

As described above, because the driving force generated by the loading motor 100 decreases when the voltage applied to the loading motor 100 decreases, the carrier unit 70 cannot move under such a condition. However, an inserting force, which is applied by an operator for inserting the 8 cm disc 11 to the disc device 10, is applied to the carrier unit 70 when the 8 cm disc 11 is inserted, by which the carrier unit 70 begins to move toward the arrow Y1 direction.

Accordingly, the insertion force of the operator assists the driving force of the loading motor 100 in the operation where the operator inserts the 8 cm disc 11 to the first loading start position P2. Therefore, the 8 cm disc 11 can be inserted using the small insertion force applied by the operator, and thereby the operation property can be improved when the 8 cm disc 11 is inserted.

In addition, the cartridge 77 extends out of the front surface 89 of the carrier unit 70 in the arrow Y2 direction when the carrier unit 70 moves to the 8L start position P2 shown in FIG. 32. However, the cartridge lever 77 does not protrude out of the disc device 10 because the carrier unit 70 moves within the disc device 10.

When it is detected that the carrier unit 70 has moved to the 8L start position P2 (referring to FIG. 32), the control device applies a normal voltage (E) to the loading motor 100. Therefore, the carrier unit 70 begins to move in the arrow Y1 direction due to the driving force of the loading motor 100. Then, when the carrier unit 70 moves to a position where a center hole 11a formed on the center of the 8 cm disc 11 is coincident with the turntable 24 as shown in FIG. 33, the control device temporarily stops the transportation of the 8 cm disc 11.

Furthermore, in the following description, the position that center hole 11a of the 8 cm disc 11 is coincident with the turntable 24 is referred to as the 8 cm disc loading finish position (8L finish position for short), indicated by P4 in FIG. 33. Additionally, at this time, the position of the 8 cm disc 11 is referred to as the 8 cm disc loading position.

When the carrier unit 70 is moved from the 8L start position P2 to the 8L finish position P4, a status is maintained that the rear portion in the insertion direction of the 8 cm disc 11 is constantly held by the disc lever 60.

Namely, the disc lever 60 is freely rotated centered on the rotational shaft 62 and constantly actuated in the counter-clockwise direction (the direction indicated by the arrow C1 in FIG. 32) by the rotational shaft 62. Therefore, the 8 cm disc 11 is transported in the arrow Y1 direction and then the disc lever 60 is rotated, thereby the disc lever 60 is constantly maintained to engage with the rear portion in the insertion direction of the 8 cm disc 11. Therefore, the 8 cm disc 11 is firmly held by the carrier unit 70 and the disc lever 60 and then stably transported.

In addition, referring to FIG. 32, because the shaft 105 is restrictively moved to the position in the arrow Y2 direction with in the cartridge lever guide grooves 103, 104 and further due to the fact that the carrier unit 70 is moved in the arrow Y1 direction, the cartridge lever 77 is moved in the arrow Y1 direction together with the carrier unit 70.

At this time, the fixing claw 106 is detached from the cartridge lever retroceding cam 54, rotated clockwise by the actuating force of the cartridge lever actuating spring 108 and then moved in the arrow Y1 direction. Accordingly, the cartridge lever 77 is rotated clockwise centered on the shaft 105 along the right rail 50 and the side surface of the cartridge lever 77 is detached from the edge 53a. The cartridge lever 77 is along the right rail 50, extending along the arrow Y1, Y2 directions in FIG. 33.

When the 8 cm disc 11 is transported to the 8L finish position where the center hole 11a is coincident with the turntable 24, the control device drives the clamping motor 68 to make the holder driving slider 30 move in the arrow X1 direction as shown in FIG. 3. Thereby, the holder 40 is moved centered on the rotational shaft 57 from the moving-up position shown in FIG. 4A to the moving-down position shown in FIG. 4B, and then the 8 cm disc 11 is moved down and held by the turntable 24. Additionally, as described above, the damper 58 assembled on the holder 40 is absorbed by the turntable 24 due to the absorption force of the clamp magnet, and therefore the 8 cm disc 11 is clamped between the damper 58 and the turntable 24.

The 8 cm disc 11 becomes rotatable by the disc motor 25. However, the 8 cm disc 11 cannot be rotated in the status held by the carrier unit 70 and the disc lever 60. Therefore, the carrier unit and disc lever 60 are retroceded from the position holding the 8 cm disc 11 after the 8 cm disc 11 has been clamped.

The operation retroceding from the position where the disc lever 60 holds the 8 cm disc 11 is described in detail as follows.

As described above, the first and the second disc lever driving cams 28, 29 are installed on the base 20 in a standing manner. The first disc lever driving cam 28 is installed to a position corresponding to the position of the disc lever 60 when the carrier unit 70 moves to the 8L finish position P4.

Namely, the disc lever 60 is rotated centered on the rotational shaft 62 when the carrier unit 70 moves in the arrow Y1 direction and the 8 cm disc 11 is transported in the same direction. Then, the engaging portion 66 of the disc lever 60 is opposite to the first disc lever driving cam 28 when the 8 cm disc 11 is moved to the 8L finish position P4 in FIG. 33 and then the disc lever 60 is rotated to the position as shown in FIG. 33.

Accordingly, due to the fact that the holder 40 is moved from the moving-up position to the moving-down position, the first disc lever driving cam 28 is engaged with the engaging portion 66 of the disc lever 60 and then the disc lever 60 is rotated in the arrow C2 direction shown in FIG. 34. As a result, the disc holder 63 installed on the disc lever 60 is detached from the 8 cm disc 11, as shown in FIG. 34.

At this time, as shown in FIG. 4A, the rotation of the disc lever 60 can be smoothly rotated because a taper surface is formed on the first disc lever driving cam 28.

Next, the operation of the carrier unit 70 that retrocedes from a position holding the 8 cm disc 11 is described as follows.

As described above, when the carrier unit 70 is transported to the 8L finish position P4 (referring to FIG. 33), the 8 cm disc 11 is clamped between the damper 58 and the turntable 24. Namely, in such a situation, it is impossible that the 8 cm disc 11 can be moved in the arrow Y1, Y2 directions.

When the control device detects that the 8 cm disc 11 is clamped by a detecting switch (not shown), the loading motor 100 is driven to cause the carrier unit 70 to move to the position shown in FIG. 34. Furthermore, in the following description, the position of the carrier unit 70 shown in FIG. 34 is referred to as the 8 cm disc retrocede position (8L retrocede position for short), indicated by P5 in the drawing.

As described above, at the status wherein the 8 cm disc 11 is clamped, by means of the carrier unit 70 being moved from the 8L finish position P4 (referring to FIG. 33) to the 8L retrocede position P5 (referring to FIG. 34), each clip disc 74-1~74-4 is detached from the 8 cm disc 11. As a result, the 8 cm disc 11 held by the carrier unit 70 is also released.

Moreover, when the 8 cm disc 11 is ejected from the disc device 10, the operation is reverse to the loading operation described above, which detailed description is omitted The normal voltage (E) is also applied to the loading motor from the 8L start position P2 shown in FIG. 32 to the eject position P1 shown in FIG. 2 when the 8 cm disc 11 is ejected. Therefore, the operation that the operator takes the 8 cm disc 11 out of the carrier unit 70 is in a status wherein the carrier unit 70 is at the eject position shown in FIG. 2. The taking-out operation of the 8 cm disc 11 can be easily processed because the 8 cm disc 11 is greatly drawn out of the front bezel 130 in such a status.

Next, with FIGS. 35 to 37, the transporting operation when the 12 cm disc 12 has been inserted into the disc device 10 will be described in detail below.

Under the eject condition shown in FIG. 2, when the 12 cm disc 12 is inserted to the disc device 10 through the front bezel 130, the 12 cm disc 12 is guided to the disc facing surface 93 and moved in the arrow Y1 direction to be in contact with the 12 cm-disc curve wall 95, and then held by the 12 cm disc tongue piece 86 (clip discs 74-1~74-4).

In addition, the 12 cm disc detecting switch 97 is pressed by the 12 cm disc 12 because the 12 cm disc 12 is contact with the 12 cm-disc curve wall 95. Therefore, the control device can detect that the 12 cm disc is held by the carrier unit 70.

When it is detected that the 12 cm disc is held by the carrier unit 70, the control device starts to apply voltage to the loading motor 100. The control device also applies a voltage about half (E/2) of the normal driving voltage (E) to the loading motor 100 while the carrier unit 70 is moved from the position in FIG. 2 to the position in FIG. 35 when the 12 cm disc 12 is inserted, by which the operational property during disc insertion can be improved.

Figure 35:
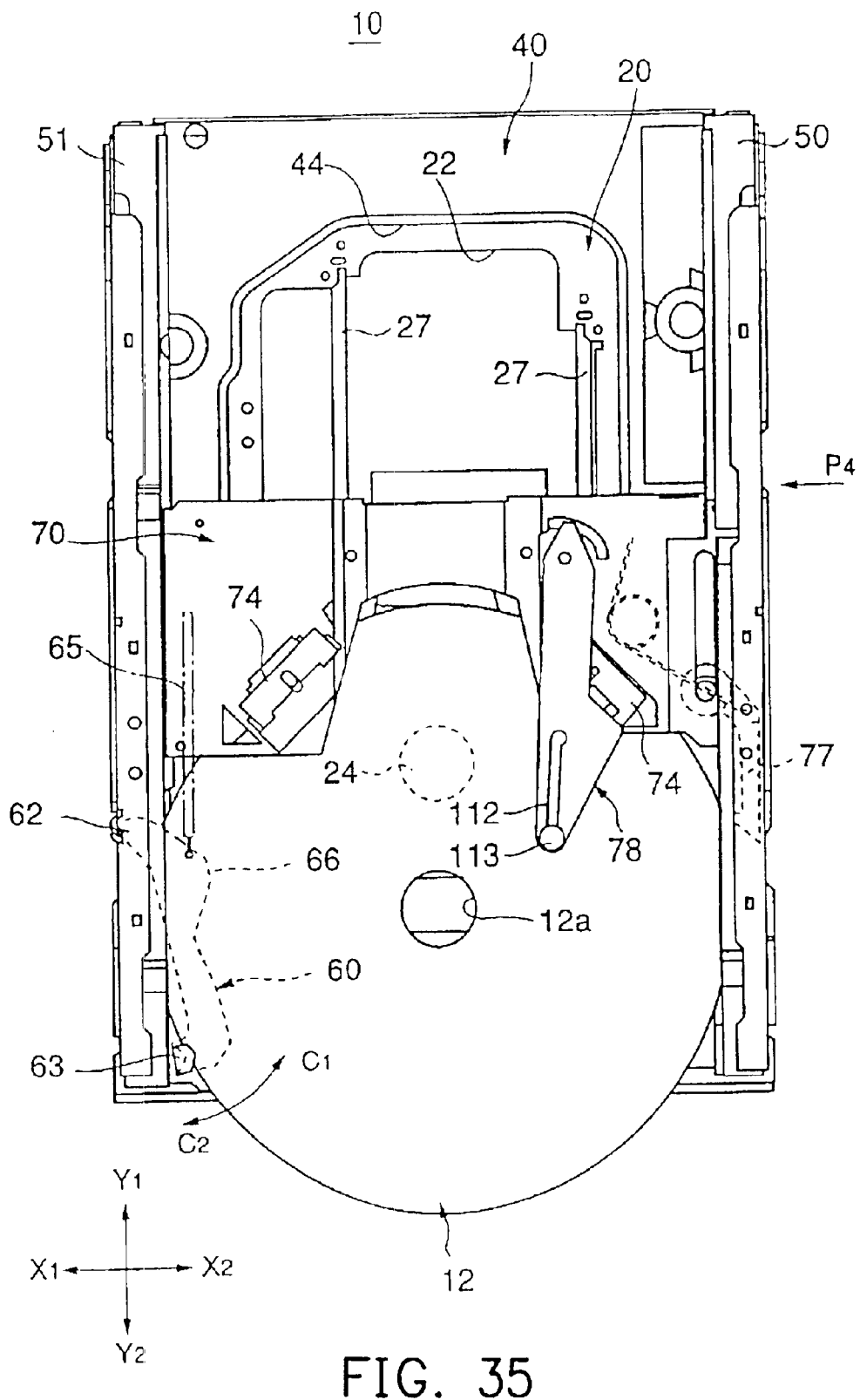
FIG. 35 is a view showing the condition of inserting the 12 cm disc to the loading starting position according to one embodiment of the present invention.
Figure 36:
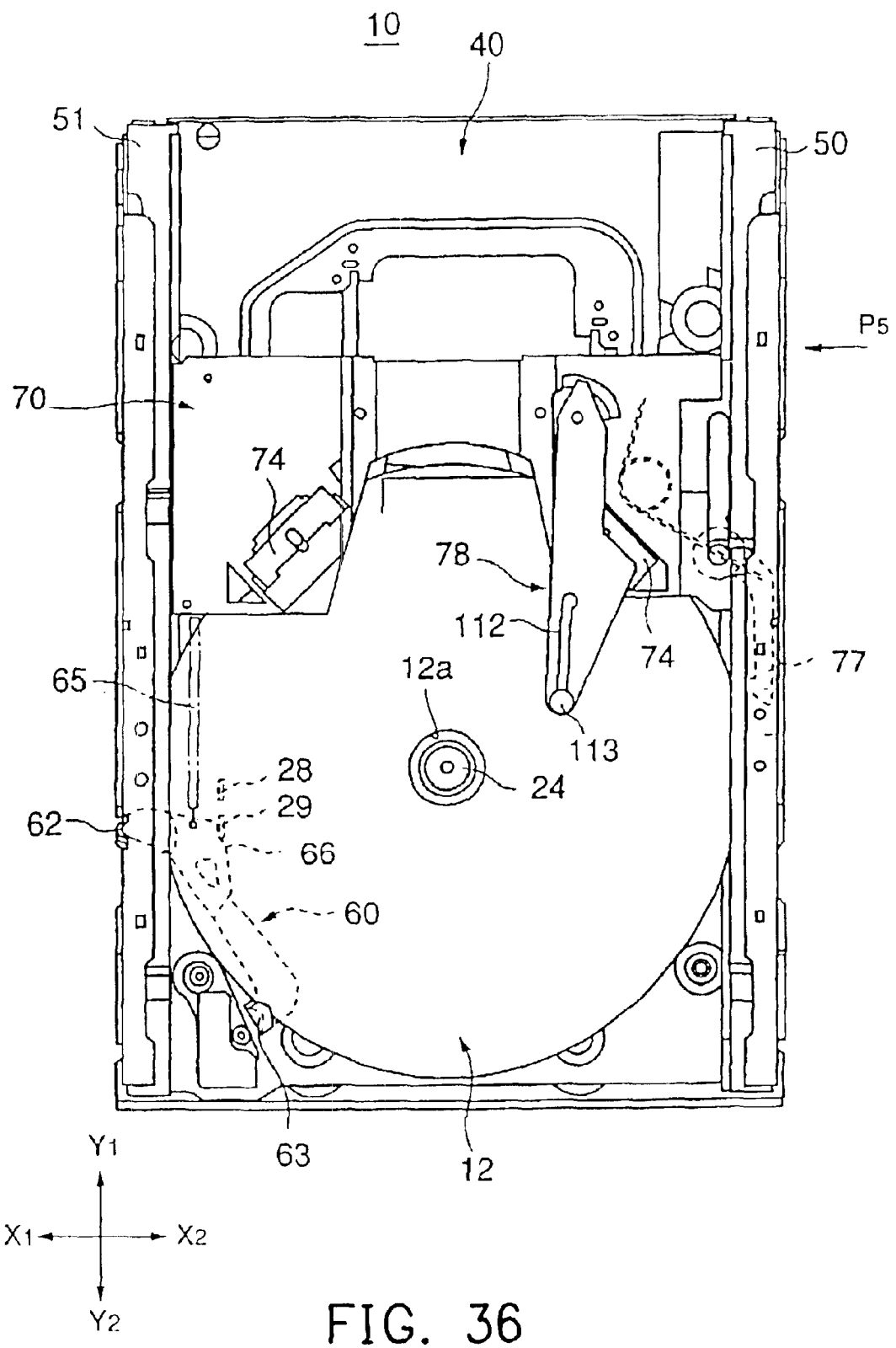
FIG. 36 is a view showing the condition of inserting the 12 cm disc to the loading finish position according to one embodiment of the present invention.

In the following description, the position of the carrier unit 70 shown in FIG. 35 is referred to the 12 cm disc loading start position (12L start position for short), indicating by P4 in the drawing. Additionally, the 12L start position P4 is set to the same position as the 8L finish position P4 in FIG. 33 when the 8 cm disc 11 is transported.

On the other hand, the graded cam N1 is moved in the arrow Y1 direction because the carrier unit 70 is moved from the eject position P1 to the 12L start position P4. Therefore, the lever body 61 of the disc lever 60 slides in contact with the graded cam N1 by the actuating force of the disc lever actuating spring 65 and then is rotated counterclockwise (the arrow C1 direction in FIG. 35). Then, the disc holder 63 formed on the disc lever 60 and is engaged with the rear portion in the insertion direction of the 12 cm disc 12 as shown in FIG. 35. After the lever body 61 detaches from the graded cam N1, the disc lever 60 uses the actuating force of the disc lever actuating spring 65 to press the 12 cm disc 12.

The 12 cm disc 12 is firmly held because the front portion in the insertion direction is held by the clip disc 74-1~74-4 and the rear portion in the insertion direction is held by the disc lever 60. Because both the front and the rear portions in the insertion direction are held, even if the 12 cm disc 12 is not enfolded by a cartridge, the 12 cm disc 12 can be prevented from detaching from the carrier unit 70 and can be stably transported.

On the other hand, the cartridge lever 77 is actuated by the cartridge lever actuating spring 108 and by means of the carrier unit 70 being moved from the eject position P1 to the 12L start position P4, and then the shaft 105 is moved in the arrow Y2 direction within the cartridge lever guide grooves 103, 104.

The cartridge lever 77 is relatively moved in the arrow Y2 direction with respect to the carrier unit 70. Additionally, the 12L start position P4 when the 12 cm disc 12 is inserted is set to a position separated by a predetermined distance from the 8L start position P2 when the 8 cm disc 11 is inserted in the previous description.

Accompanying the move toward the 12L start position P4 of the carrier unit 70, the fixing claw 106 of the cartridge lever 77 is detached from the cartridge lever retroceding cam 54 and rotated clockwise by the actuating force of the cartridge lever actuating spring 108 to move in the arrow Y1 direction. Thereby, the cartridge lever 77 is rotated clockwise centered on the shaft 105 along the right rail 50. As shown in FIG. 35, the cartridge lever 77 is arranged along the right rail 50, extending in the arrow Y1, Y2 directions.

On the other hand, when the carrier unit 70 is moved to the 12L start position P4, the control device applies a normal voltage (E) to the loading motor 100. Therefore, the carrier unit 70 begins to individually move in the arrow Y1 direction. Then, when the carrier unit 70 is transported to a position that a center hole 12a formed on the center of the 12 cm disc 12 is coincident with the turntable 24 as shown in FIG. 35, the control device temporarily stops the transportation of the 12 cm disc 12.

Furthermore, in the following description, the position that center hole 12a of the 12 cm disc 12 is coincident with the turntable 24 is referred to as the 12 cm disc loading finish position (12L finish position for short), indicating by P5 in FIG. 36. Additionally, at this time, the position of the 12 cm disc is referred to as the loading position.

When the carrier unit 70 is moved from the 12L start position P4 to the 12L finish position P5, which is similar to the 8 cm disc transfer, a status is maintained that the rear portion in the insertion direction of the 8 cm disc 11 is constantly engaged with the disc lever 60. Therefore, the 12 cm disc 12 is firmly held by the carrier unit 70 and the disc lever 60 and then stably transported when the disc 12 is transported between the 12L start position P4 and the 12L finish position P5.

In addition, according to the embodiment of the invention, because the disc lever 60 is rotatably installed on the holder 40, the rear portion in the insertion direction of the 8 cm disc 11 and the 12 cm disc 12, though having different diameters, can be held by one disc lever 60. Therefore, the part number of the disc device 10 can be reduced and the structure is simplified.

When the 12 cm disc is transported to a position where the center hole 12a is coincident with the turntable 24, the control drives the slide motor. Then the holder driving slider 30 is moved in the arrow X1 direction as shown in FIG. 3. Thereby, the holder 40 is moved centered on the rotational shaft 57 from the moving-up position shown in FIG. 4A to the moving-down position shown in FIG. 4B, and then the 12 cm disc 12 is moved down and held by the turntable 24, and additionally clamped between the damper 58 and the turntable 24.

Therefore, 12 cm disc 12 becomes rotatable by the disc motor 25. However, the 12 cm disc 12 cannot be rotated in the status held by the carrier unit 70 and the disc lever 60. Therefore, the carrier unit 70 and the disc lever 60 are retroceded from the position holding the 12 cm disc 12 after the 12 cm disc has been clamped.

The operation retroceding from the position that the disc lever 60 holds the 12 cm disc 12 is described in detail as follows.

As described above, the first and the second disc lever driving cams 28, 29 are installed on the base 20 in a standing manner. The second disc lever driving cam 29 is installed to a position corresponding to the position of the disc lever 60 when the carrier unit 70 moves to the 12L finish position P5.

Namely, the disc lever 60 is rotated centered on the rotational shaft 62 when the carrier unit 70 moves in the arrow Y1 direction and the 12 cm disc 12 transported in the same direction. Then, the engaging portion 66 of the disc lever 60 is opposite to the second disc lever driving cam 29 when the 12 cm disc 12 is moved to the 12L finish position P5 in FIG. 36 and then the disc lever 60 is rotated to the position as shown in FIG. 36.

Figure 37:
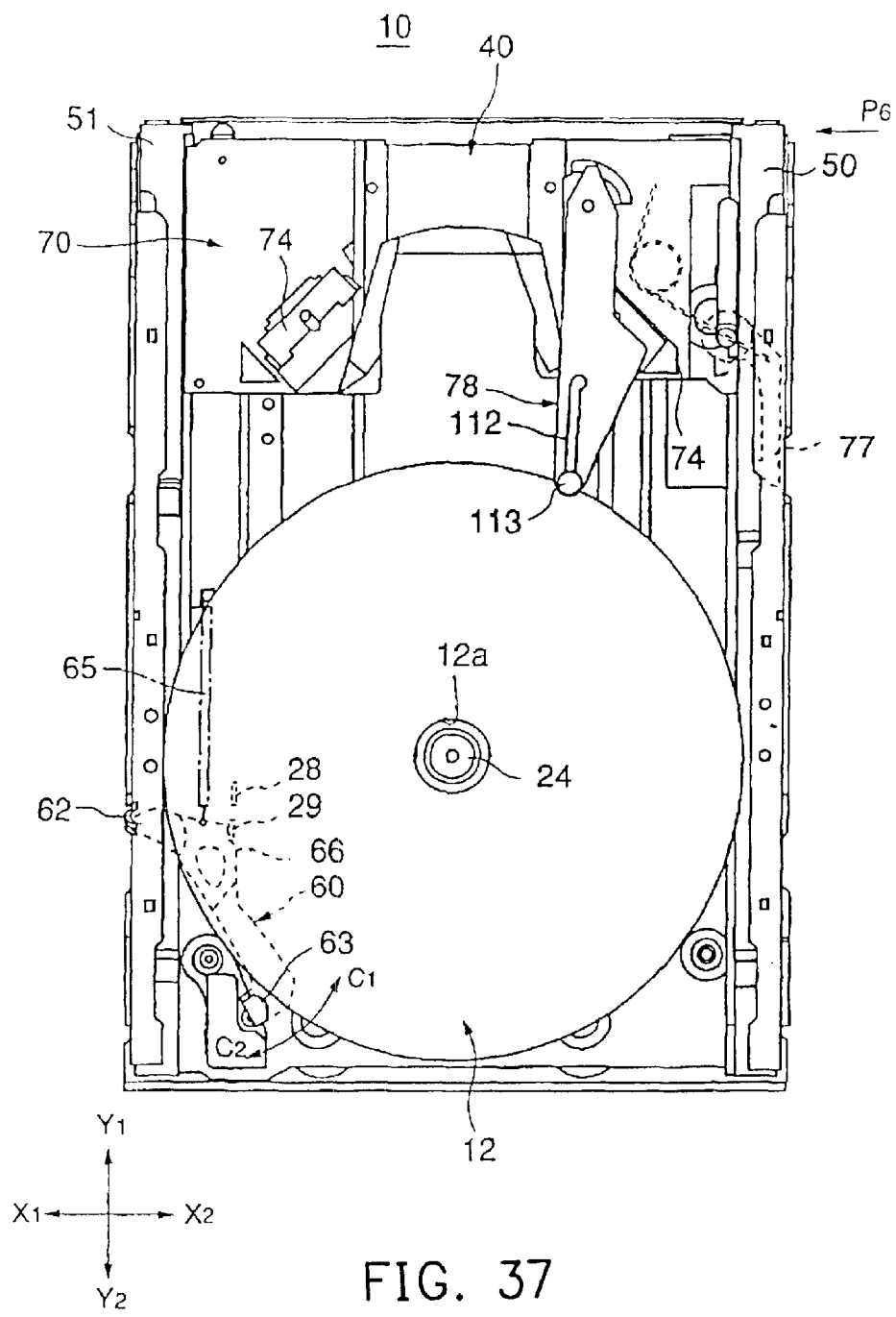
FIG. 37 is a view showing the condition of recording/reproducing the 12 cm disc according to one embodiment of the present invention.

Accordingly, due to the fact that the holder 40 is moved from the moving-up position to the moving-down position, the second disc lever driving cam 29 is engaged with the engaging portion 66 of the disc lever 60 and then the disc lever 60 is rotated in the arrow C2 direction shown in FIG. 37. As a result, the disc holder 63 installed on the disc lever 60 is detached from the 12 cm disc 12, as shown in FIG. 37. At this time, the actuating rotation of the disc lever 60 can smoothly rotate because a taper surface is formed on the second disc lever driving cam 29.

The operation of the carrier unit 70 retroceding from supporting the 12 cm disc 12 will be explained as follows.

As described above, when the carrier unit 70 is transported to the 12L finish position P5, the 12 cm disc 12 is clamped between the damper 58 and the turntable 24. and it is impossible for the 12 cm disc 12 to be moved in the arrow Y1, Y2 directions.

When the control device detects that the 12 cm disc 12 is clamped with a detecting switch (not shown), by which the loading motor 100 is driven to cause the carrier unit 70 to move to the position shown in FIG. 37. Furthermore, in the following description, the position of the carrier unit 70 shown in FIG. 37 is referred to as the 12 cm disc retrocede position (12L retrocede position for short), indicated by P6 in the drawing.

As described above, at the status wherein the 12 cm disc 12 is clamped, by means of the carrier unit 70 being moved from the 12L finish position P5 to the 12L retrocede position P6, each clip disc 74-1~74-1 is detached from the 12 cm disc 12. As a result, the 12 cm disc 12 held by the carrier unit 70 is also released, and then the reproducing or recording process can be performed to the 12 cm disc 12.

Moreover, when the 12 cm disc 12 is ejected from the disc device 10, the operation is reverse to the loading operation described above, of which detailed description is omitted. But, for improving the operation of taking off the 12 cm disc 12, the normal voltage (E) is also applied to the loading motor from the 12L start position P4 shown in FIG. 15 to the eject position P1 shown in FIG. 2 when the 12 cm disc 12 is ejected.

Next, with FIGS. 38 and 39, the tranportation operation when the disc cartridge 13 is inserted in the disc device 10 will be described in detail below.

In the eject status of the disc device in FIG. 2, the front end of the disc cartridge 13 is first in contact with the front surface 89 of the carrier unit 70 when the disc cartridge 13 is inserted through the insertion hole 133 of the front bezel 130.

Because the disc cartridge detecting switch 98 is installed on the front surface 89 (referring to FIGS. 10A, 10B), the disc cartridge detecting switch 98 is pressed caused by the disc cartridge 13 being in contact with the front surface 89 of the carrier unit 70. Thereby, the control device can detect that the disc cartridge 13 is inserted to the disc device 10.

In addition, in the status wherein the disc cartridge 13 is in contact with the carrier unit 70, the shutter driving pin 113 installed on the shutter lever 78 is engaged with the end of the shutter 15 installed on the disc cartridge 13.

When it is detected that the disc cartridge 13 is inserted in the disc device 10, the control device applies voltage to the loading motor 100. At this time, the control device also applies a voltage about half (E/2) of the normal driving voltage (E) to the loading motor 100 during which the carrier unit 70 is moved from the position in FIG. 2 to the position in FIG. 38 when the disc cartridge 13 is inserted, by which the operational property during disc insertion can be improved. Namely, the carrier unit 70 is assisted by the driving force of the loading motor 100, and the carrier unit 70 is pressed in the Y1 direction by inserting the disc cartridge 13. Therefore, the operator can use a relatively small force to insert the disc cartridge 13

Figure 38:
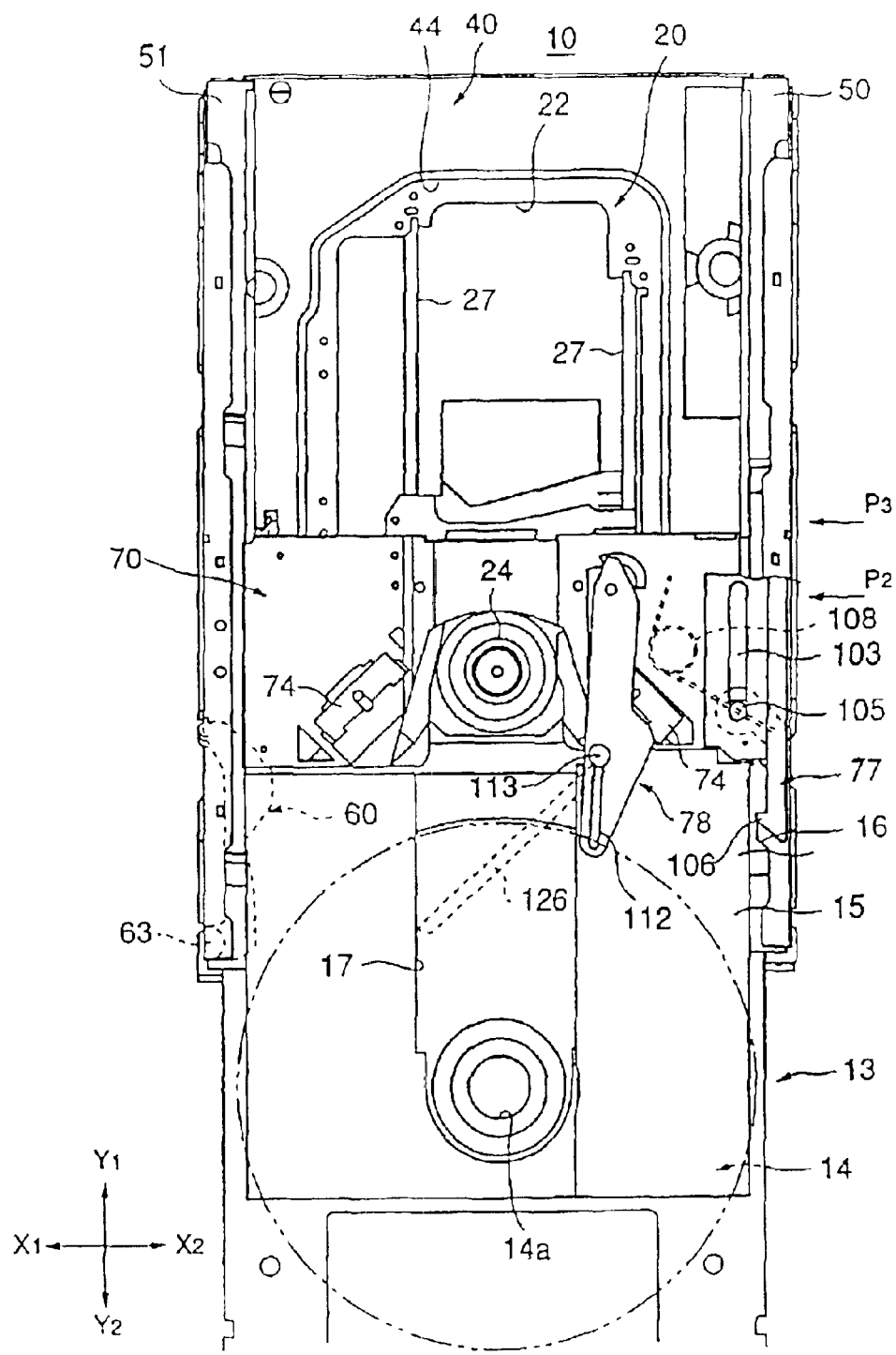
FIG. 38 is a view showing the condition of inserting the disc cartridge to the loading starting position according to one embodiment of the present invention.
Figure 39:
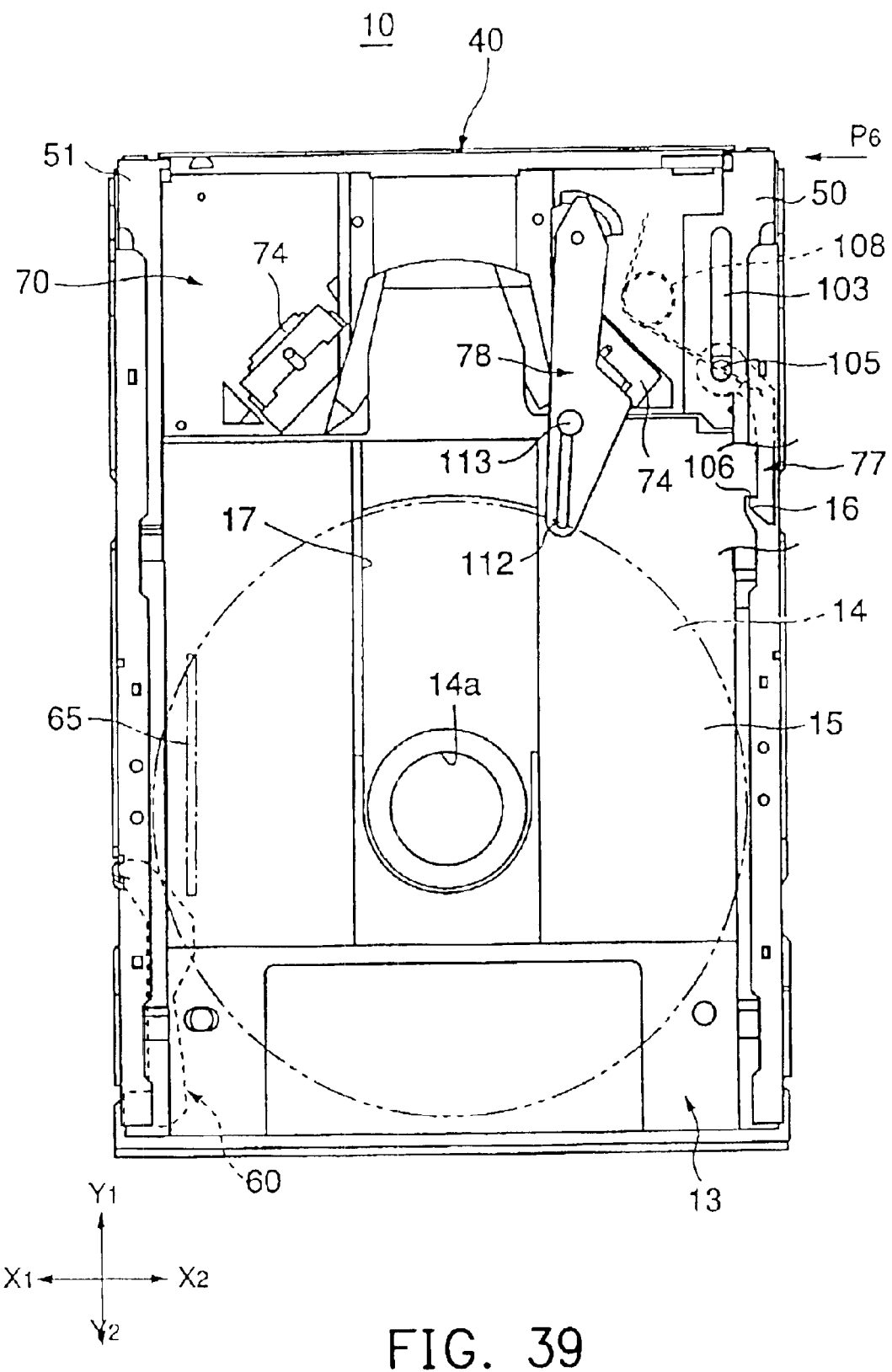
FIG. 39 is a view showing the condition of recording/reproducing the disc inside the disc cartridge according to one embodiment of the present invention.

In the following description, the position of the carrier unit 70 shown in FIG. 38 is referred to as the disc cartridge loading start position (DL start position for short), indicated by P3 in the drawing.

Therefore, the disc lever 60 is retroceded to a position preventing the insertion of the disc cartridge from disturbance when the carrier unit 70 is moved from the eject position P1 to the DL start position P3 (referring to FIG. 3).

Namely, the disc lever 60 is detached from the graded cam N1 formed inside the carrier unit 70 because the carrier unit 70 is moved from the eject position P1 to the DL start position P3. However, as described above, because the disc cartridge 13 is in contact with the front surface 89 of the carrier unit 70, the disc holder 63 is continuously in contact with the side surface of disc cartridge 13 even if the lever body 61 is detached from the cam N1. Therefore, the disc lever 60 is maintained at a position that the carrier unit 70 is at the eject position P1, and then the disc lever 60 does not bar the insertion of the disc cartridge 13.

On the other hand, when the carrier unit 70 begins to move in the arrow Y1 direction from the eject position P1 to the position indicated by P2 (the same position of the 8L start position in FIG. 32) in FIG. 38, the cartridge lever 77 is relatively moved in the arrow Y2 direction with respect to the carrier unit 70. Additionally, the shaft 105 of the cartridge lever 77 is restrictively moved to the Y2 position within the cartridge lever guide grooves 103, 104 at the time point that the carrier unit 70 is moved to the position P2.

The fixing claw 106 of the cartridge lever 77 is maintained in contact with cartridge lever retrocede cam 54 during the move of the carrier unit 70 from the eject position P1 to the position P2, and thereby the position of the cartridge lever 77 with respect to the holder 40 is not changed. However, as described above, the cartridge lever 77 is extended from the front surface 89 of the carrier unit 70 in the Y2 direction because the cartridge lever 77 is moved in the arrow Y2 direction with respect to the carrier unit 70.

When the carrier unit 70 is moved from the position P2 to the DL start position P3 (referring to FIG. 38), because the shaft 105 is restricted in the arrow Y2 direction by the cartridge lever guide grooves 103, 104 at the time point that the carrier unit 70 is moved to the position P3, the cartridge lever 77 is moved in the arrow Y1 direction together with the carrier unit 70.

Thereby, the fixing claw 106 is detached from the cartridge lever retroceding cam 54 and the cartridge lever 77 is rotated clockwise and moved in the arrow Y1 direction by the actuated force of the cartridge lever actuating spring 108. Therefore, the cartridge lever 77 is actuated by the cartridge lever actuating spring 108 along the right rail 50 and then rotated clockwise centered on the shaft 105. Additionally, an engaging recess 16 is formed on the side surface of the disc cartridge 13, located in the moving trajectory of the fixing claw 106 of the cartridge lever 77.

Accordingly, as shown in FIG. 18, the fixing claw 106 is engaged with the engaging recess 16 of the disc cartridge 13 by the rotation of the cartridge lever 77. Then, accompanied with the carrier unit 70 and in the status wherein the side surface of the cartridge lever 77 is detached from the edge 53a, the cartridge lever 77 is maintained in a status wherein the fixing claw 106 is engaged with engaging recess 16, and is arranged along the right rail 50, which is extending in the arrow Y1, Y2 directions.

Moreover, the shutter lever 78 is rotated counterclockwise due to the move of the carrier unit 70. The shutter driving pin 113 is guided to move within the shape of the slit 126 due to the insertion of the carrier unit 70 because the shutter driving pin 113 installed on the shutter 78 is engaged with the slit 126.

Thereby, as shown in FIG. 38, the shutter lever 78 is rotated counterclockwise and then the shutter 15, engaged with the shutter driving pin 113, is opened. At the time point that the shutter is fully opened, the shutter driving pin 113 is maintained in the straight portion of the slit 126.

The cartridge lever 77 of the carrier unit 70 will support the disc cartridge 13 and move the disc cartridge 13 to the loading position or eject the disc cartridge 13 positioned at the loading position toward the inserting position. The shutter driving pin 113 of the shutter lever 78 is set on the carrier unit 70 in a way capable of swinging. When the shuttering driving pin 113 is being engaged to the slit 126 of the base cover 120 while the shutter driving pin 113 is moving toward the loading position from the inserting position, the shutter driving pin 133 will be engaged to the shutter 15 of the cartridge 13 and open/close the shutter 15 of the disc cartridge 13.

When the carrier unit 70 is moved to the DL start position P3, the control device applies the normal voltage (E) to the loading motor 100. Thereby, even though the operator does not press the disc cartridge 13, the carrier unit 70 begins to move in the arrow Y1 direction by only the driving force of the loading motor 100. Accordingly, the disc cartridge 13 engaged with the cartridge lever 77 is also transported in the arrow Y1 direction. Then the carrier unit 70 is transported to a position that a center hole 14a of a DVD-RAM 14 inside the disc cartridge 13 shown in FIG. 39 is coincident with the turntable 24.

Moreover, in the following description, the position of the carrier unit 70, wherein the center hole 14a of the DVD-RAM 14 is coincident with the turntable 24, is the disc cartridge loading finish position (DL finish position for short), indicated by P6 in FIG. 39. Additionally, the DL finish position P6 is set to the same position as the 12L retrocede position P6 in FIG. 37. At this time, the position of the disc cartridge 13 is referred to as the loading position.

When the carrier unit 70 is moved from the DL start position P3 to the DL finish position P6 (referring to FIG. 39), the disc lever 60 is in contact with the side surface of the disc cartridge 13 and maintained at the retrocede position without impeding the transfer of the disc cartridge 13.

When the disc cartridge 13 is transported to the DL finish position P6, the control device drives the slide motor (not shown) and causes the holder driving slider 30 to move in the arrow X1 direction (referring to FIG. 3). Thereby, the holder 40 is rotated centered on the rotational shaft 57 from the moving-up position shown in FIG. 4A to the moving-down position shown in FIG. 4B. As a result, the disc cartridge 13 is also moved downward.

Therefore, the DVD-RAM 14 inside the disc cartridge 13 is held by the turntable 24, and is clamped between the turntable 24 and the damper 58. Accordingly, the DVD-RAM 14 becomes rotatable by the disc motor 25, and then it is possible to perform the reproducing/recording process to the DVD-RAM 14.

Furthermore, when the disc cartridge 13 is ejected from the disc device 10, the operation is reverse to the loading operation described above, of which detailed description is omitted. However, in order to improve the operational property for taking out the disc cartridge 13 when the disc cartridge 13 is ejected, the normal voltage (E) is applied to the loading motor 100 during the whole interval from the DL finish position P6 to the eject position P1.

In the disc device of the present invention, when ejecting a cartridge by ejecting the transporting mechanism, the transporting mechanism will move the door to an open position before moving the cartridge in an ejecting direction. The inserting/ejecting is smooth not only for a disc recording medium but also for a cartridge. Therefore, the slot-in type recording medium loading mechanism can be used no matter which type or shape the recording medium is.

Additionally, the disc device of the present invention has a disc holding unit, rotating to a disc holding position, supporting the circumference of the disc recording medium, inserted through the opening. When the disc holding unit is pressed to a retroceding position by inserting a cartridge, the door is moved to the open position through the disc holding unit. Therefore, there is no need to set an additional cartridge detecting switch, the door can be opened or closed with respect to the existence or nonexistence of the cartridge. Therefore, the number of parts is not need to be increased, and the cost can be controlled down.

Furthermore, in the disc device of the present invention, when inserting a disc recording medium through a slit formed on the door, the disc holding unit will support the circumference of the disc recording medium and rotate at the same time. The disc holding unit allows the disc recording medium to be ejected from the slit of the door when the door is kept at a shuttered position during an ejecting operation. The inserting/ejecting is smooth not only for a disc recording medium but also for a cartridge.

Moreover, in the disc device of the present invention, the shuttering unit supports reversing the moving direction of the holder, and the crossing portion crosses between the entrance of the holder and the insertion hole. When the holder is at the first position of inserting/ejecting recording medium, the crossing portion separates from the insertion hole. When the holder moves toward the second position of loading the recording medium, the crossing portion will move together with the holder to a position opposite to the insertion hole to prevent other recording medium from being inserted. Therefore, the shuttering unit can be moveably disposed within the height range of the holder, and then the disc device can be made slimmer.

Furthermore, the shuttering unit of the present invention has a wrist pair, a crossing portion and a contact portion. The wrist pair is rotatably supported opposite to the two side faces of the holder. The crossing portion crosses between the front ends of the wrist pair. The engaging portion is set on the other sides of the wrist pair and is engaged to the holder. The shuttering unit rotates as the holder moves toward the second position. In this way, the crossing portion will move to a position opposite to the insertion hole to prevent other recording medium from being inserted. Therefore, the shuttering unit can be moveable disposed within the height range of the holder, and then the disc device can be made slimmer.

While the present invention has been described with preferred embodiments, this description is not intended to limit our invention. Various modifications of the embodiments will be apparent to those skilled in the art. It is therefore contemplated that the appended claims will cover any such modifications or embodiments as fall within the true scope of the invention.

What is claimed is:

1. A disc device, having an opening, wherein a cartridge receiving a disc recording medium or a disc recording medium without a cartridge is selectively inserted into or ejected from the opening, the disc device further comprising:

a door, having a slit for passing the disc recording medium without a cartridge before inserting the cartridge, keeping the opening in a shuttered position, and during the insertion of the cartridge, the door moving to open the opening to allow the cartridge to be inserted;

a transporting mechanism, moving the disc recording medium without a cartridge or the cartridge, inserted through the opening, to a predetermined loading position, and ejecting the loaded disc recording medium without a cartridge or the cartridge through the slit or the opening by an ejecting operation;

an open/close driving mechanism, moving the door to an open position before transporting the cartridge in an ejecting direction when ejecting the cartridge by the transporting mechanisms;

a disc holding unit, rotating toward a disc holding position, supporting a circumference of the disc recording medium without a cartridge inserted through the opening, and when the disc holding unit is pressed towards a retroceding position by inserting the cartridge, the open/close driving mechanism will move the door to the open position through the disc holding unit.

2. The disc device according to claim 1, wherein the disc holding unit will support the circumference of the disc recording medium without a cartridge and rotate at the same time when the disc recording medium without a cartridge is inserted through the slit formed on the door, and the open/close driving mechanism will keep the door in a shuttered position and let the disc recording medium without a cartridge be ejected from the slit of the door by the ejecting operation.

3. The disc device, having an insertion hole for inserting a recording medium, comprising:

a holder, moving between a first position and a second position, wherein the first position is opposite to a position for inserting the recording medium, and the second position is a position for loading the recording medium; and a shuttering unit, closing the insertion hole from inside to prevent other recording medium from being inserted when the holder, loaded with the recording medium, moves toward the second position, wherein the shuttering unit further comprises a crossing portion, crossing between an entrance of the holder and the insertion hole, and the crossing portion is supported to reverse the moving direction of the holder, and when the holder is at the first position of inserting/ejecting the recording medium, the crossing portion will separate from the insertion hole, and when the holder moves toward the second position of loading the recording medium, the crossing portion will move together with the holder to a position opposite to the insertion hole to prevent other recording medium from being inserted.

4. The disc device according to claim 3, wherein the shuttering unit further comprises:

a wrist pair, rotatably installed to a position opposite to two side faces of the holder;

a crossing portion, crossing between tip ends of the wrist pair; and an engaging portion, installed on the other ends of the wrist pair, engaged with the holder, wherein the shuttering unit rotates as the holder moves toward the second position, and in this way, moving the crossing portion to a position opposite to the insertion hole to prevent other recording medium from being inserted.

* * * * *